United States Patent
Ren et al.

(10) Patent No.: US 12,405,702 B2
(45) Date of Patent: Sep. 2, 2025

(54) CURSOR DISPLAY METHOD AND ELECTRONIC DEVICE

(71) Applicant: Honor Device Co., Ltd., Shenzhen (CN)

(72) Inventors: Jie Ren, Shenzhen (CN); Liwei Huang, Shenzhen (CN); Wenjie Chen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/549,078

(22) PCT Filed: Apr. 28, 2022

(86) PCT No.: PCT/CN2022/089752
§ 371 (c)(1),
(2) Date: Sep. 5, 2023

(87) PCT Pub. No.: WO2023/005306
PCT Pub. Date: Feb. 2, 2023

(65) Prior Publication Data
US 2024/0168601 A1    May 23, 2024

(30) Foreign Application Priority Data
Jul. 26, 2021   (CN) .......................... 202110844411.9

(51) Int. Cl.
*G06F 3/04812*   (2022.01)
(52) U.S. Cl.
CPC ................................ *G06F 3/04812* (2013.01)

(58) Field of Classification Search
CPC ................................................... G06F 3/04812
See application file for complete search history.

(56) References Cited

U.S. PATENT DOCUMENTS

| | | | |
|---|---|---|---|
| 10,156,974 B2 | 12/2018 | Miyazaki et al. | |
| 2002/0130838 A1 | 9/2002 | Feierbach | |
| 2004/0180709 A1* | 9/2004 | Takahashi | A63F 13/812 463/3 |
| 2007/0015534 A1* | 1/2007 | Shimizu | G06F 3/04892 455/550.1 |
| 2009/0083672 A1* | 3/2009 | Fitzmaurice | G06F 16/954 715/851 |
| 2009/0327955 A1* | 12/2009 | Mouilleseaux | G06F 3/04812 715/810 |
| 2013/0093674 A1* | 4/2013 | Fei | G06F 3/033 345/158 |

(Continued)

FOREIGN PATENT DOCUMENTS

| | | |
|---|---|---|
| CN | 102346640 A | 2/2012 |
| CN | 103577041 A | 2/2014 |

(Continued)

*Primary Examiner* — Tadesse Hailu
(74) *Attorney, Agent, or Firm* — Conley Rose, P.C.

(57) ABSTRACT

A cursor display method and an electronic device. The method includes an electronic device moving a cursor on a display interface in response to a received user operation. In addition, in a cursor movement process, a cursor center point gradually shifts from a center position of the cursor along an opposite direction of a moving direction of the cursor with movement of the cursor, to achieve a dynamic cursor dragging effect on the display interface.

20 Claims, 31 Drawing Sheets

(56) References Cited

U.S. PATENT DOCUMENTS

| | | |
|---|---|---|
| 2013/0125067 A1 | 5/2013 | Moon et al. |
| 2014/0047392 A1 | 2/2014 | Kim et al. |
| 2014/0118254 A1* | 5/2014 | Fei ................... G06F 3/04883 |
| | | 345/157 |
| 2014/0344731 A1 | 11/2014 | Holz |
| 2015/0185877 A1 | 7/2015 | Watanabe et al. |
| 2016/0188148 A1* | 6/2016 | Lee .................... H04N 21/482 |
| | | 715/786 |
| 2016/0196018 A1* | 7/2016 | Lee .................. H04N 21/4821 |
| | | 715/768 |
| 2016/0224127 A1* | 8/2016 | Zhou ................ G06F 3/04812 |
| 2016/0231898 A1* | 8/2016 | Lee ..................... G06F 3/0346 |
| 2016/0231977 A1* | 8/2016 | Yamada ................ B60K 35/00 |
| 2020/0341629 A1 | 10/2020 | Lee |
| 2021/0240332 A1* | 8/2021 | Walkin .............. G06F 3/04842 |

FOREIGN PATENT DOCUMENTS

| | | |
|---|---|---|
| CN | 113515202 A | 10/2021 |
| JP | 2019075033 A | 5/2019 |

\* cited by examiner

CURSOR DISPLAY METHOD AND ELECTRONIC DEVICE

CROSS-REFERENCE TO RELATED APPLICATIONS

This is a national stage of International Application No. PCT/CN2022/089752, filed on Apr. 28, 2022, which claims priority to Chinese Patent Application No. 202110844411.9, filed with the China National Intellectual Property Administration on Jul. 26, 2021, both of which are incorporated herein by reference in their entireties.

TECHNICAL FIELD

This application relates to the field of terminal devices, and in particular, to a cursor display method and an electronic device.

BACKGROUND

At present, a control mode of a tablet computer is usually designed based on a finger operation, to be specific, the tablet computer may perform a corresponding action in response to a received operation of touching a display screen of the tablet computer by a user. This finger touch solution cannot be applied when the tablet computer is connected to other external devices such as a mouse or a touchpad.

SUMMARY

To resolve the foregoing technical problem, this application provides a cursor display method and an electronic device. In this method, the electronic device may change an appearance of a cursor in a cursor movement process to achieve a dynamic cursor dragging effect, thereby improving user experience.

According to a first aspect, this application provides an electronic device. The electronic device includes: a memory and a processor, where the memory is coupled to the processor. The memory stores program instructions. When executed by the processor, the program instructions cause the electronic device to perform the following steps: displaying, by the electronic device, a cursor on a display interface, where the cursor includes a cursor center point, and the cursor center point is at a geometric center of the cursor: moving, by the electronic device, the cursor from a first position to a second position on the display interface in response to a received user operation: and in a process in which the cursor moves to the second position, gradually shifting, by the electronic device, the cursor center point from the geometric center of the cursor along an opposite direction of a moving direction of the cursor to a third position within an edge of the cursor. In this way, the electronic device may display the cursor on the display interface, so that a user determines an operating position of an external device such as a mouse or a keyboard on the display interface through a position of the cursor. For example, the electronic device may change an appearance of the cursor in a cursor movement process, to achieve a dynamic cursor dragging effect. For example, the electronic device may change a position, in the cursor, of the cursor center point in the cursor in a cursor movement process, to achieve a dynamic cursor dragging effect, thereby improving a visual effect and user experience.

For example, in a process in which the cursor starts to move from a resting state, the cursor center point may gradually shift along the opposite direction of the moving direction, to achieve the cursor dragging effect.

According to the first aspect, when executed by the processor, the program instructions cause the electronic device to perform the following step: in a process in which the cursor accelerates to the second position at a first acceleration, gradually shifting, by the electronic device, the cursor center point from the geometric center of the cursor along the opposite direction of the moving direction of the cursor to the third position. In this way, in an accelerated movement process of the cursor, the cursor center point gradually shifts along the opposite direction of the moving direction, to achieve the dragging effect.

For example, the cursor may start to accelerate from the resting state. For example, the cursor may alternatively start to accelerate from a uniform movement state. For example, the cursor may alternatively change from decelerating to accelerating.

According to any one of the first aspect or the foregoing implementations of the first aspect, when executed by the processor, the program instructions cause the electronic device to perform the following step: in a process in which the cursor moves from the second position to a fourth position on the display interface, gradually shifting, by the electronic device, the cursor center point from the third position to the geometric center of the cursor until the cursor center point overlaps the geometric center of the cursor, where the cursor continuously moves from the first position to the fourth position. In this way, in the movement process, the cursor may gradually return to the center of the cursor from a shifted position. For example, in a movement process from a point C to a point E in FIG. 6, the cursor center point gradually returns to the center of the cursor from a farthest shifted position.

According to any one of the first aspect or the foregoing implementations of the first aspect, when executed by the processor, the program instructions cause the electronic device to perform the following step: in a process in which the cursor moves to the fourth position by changing from accelerated movement to first uniform movement, gradually shifting, by the electronic device, the cursor center point from the third position to the geometric center of the cursor until the cursor center point overlaps the geometric center of the cursor. In this way, in a uniform cursor dragging process, the cursor center point may gradually return to the center of the cursor, to implement synchronous dragging of the cursor center point and the cursor.

According to any one of the first aspect or the foregoing implementations of the first aspect, a speed of the first uniform movement is a first speed.

According to any one of the first aspect or the foregoing implementations of the first aspect, when executed by the processor, the program instructions cause the electronic device to perform the following step: after a speed of the cursor becomes a second speed, gradually shifting, by the electronic device, the cursor center point from the third position to the geometric center of the cursor until the cursor center point overlaps the geometric center of the cursor. In this way, the electronic device may preset a speed threshold. When the speed of the cursor during the accelerated movement reaches a preset speed, for example, the second speed, the cursor center point may gradually return to the center of the cursor.

According to any one of the first aspect or the foregoing implementations of the first aspect, when executed by the processor, the program instructions cause the electronic device to perform the following step: in a process in which the cursor moves from the fourth position to a fifth position on the display interface, gradually shifting the cursor center point from the geometric center of the cursor along the moving direction of the cursor to a sixth position within the edge of the cursor, where the cursor continuously moves from the first position to the fifth position. An offset between the sixth position and the geometric center of the cursor is the same as or different from an offset between the third position and the geometric center of the cursor. In this way, in the cursor movement process, the cursor center point may further gradually shift along the moving direction. For example, in a movement process from a point G to a point I in FIG. 6, the cursor center point gradually shifts from the center of the cursor along the moving direction.

According to any one of the first aspect or the foregoing implementations of the first aspect, when executed by the processor, the program instructions cause the electronic device to perform the following step: in a process in which the cursor decelerates to the fifth position, gradually shifting the cursor center point from the geometric center of the cursor along the moving direction of the cursor to the sixth position. In this way, the cursor center point is shifted along the moving direction, to present that the cursor is currently decelerating, to achieve dynamic cursor dragging effects in different scenarios.

According to any one of the first aspect or the foregoing implementations of the first aspect, when executed by the processor, the program instructions cause the electronic device to perform the following step: in a process in which the cursor moves from the fifth position to a seventh position on the display interface, gradually shifting the cursor center point from the sixth position to the geometric center of the cursor until the cursor center point overlaps the geometric center of the cursor, where the cursor continuously moves from the first position to the seventh position. For example, from the point I to a point K in FIG. 6, the cursor center point may gradually return to the center of the cursor.

According to any one of the first aspect or the foregoing implementations of the first aspect, when executed by the processor, the program instructions cause the electronic device to perform the following step: in a process in which the cursor decelerates to the seventh position, gradually shifting the cursor center point from the sixth position to the geometric center of the cursor until the cursor center point overlaps the geometric center of the cursor.

For example, in a process in which the cursor moves to the seventh position by changing from decelerated movement to uniform movement, the cursor center point gradually shifts from the sixth position to the geometric center of the cursor until the cursor center point overlaps the geometric center of the cursor. For example, the cursor may be in the uniform movement after reaching the seventh position. For example, the cursor may be resting at the seventh position. For example:

According to any one of the first aspect or the foregoing implementations of the first aspect, when executed by the processor, the program instructions cause the electronic device to perform the following step: after a speed of the cursor becomes a third speed, gradually shifting the cursor center point from the sixth position to the geometric center of the cursor until the cursor center point overlaps the geometric center of the cursor. In this way, the electronic device may preset a speed threshold. When the speed of the cursor during the decelerated movement reaches a preset speed, for example, the third speed, the cursor center point may gradually return to the center of the cursor.

According to any one of the first aspect or the foregoing implementations of the first aspect, when executed by the processor, the program instructions cause the electronic device to perform the following step: in a process in which the cursor accelerates from the fourth position at a second acceleration, gradually shifting the cursor center point from the geometric center of the cursor along the opposite direction of the moving direction of the cursor to an eighth position within the edge of the cursor, where the second acceleration is greater than the first acceleration, and an offset between the eighth position and the geometric center of the cursor is greater than an offset between the third position and the geometric center of the cursor. In this way, as the acceleration varies, the offset of the cursor center point may also vary, to achieve different dragging effects in different dragging scenarios.

According to any one of the first aspect or the foregoing implementations of the first aspect, an offset between the cursor center point and the geometric center of the cursor is less than a preset value. In this way, the preset value is set to ensure that the cursor center point is always within the edge of the cursor.

According to any one of the first aspect or the foregoing implementations of the first aspect, the cursor is in a rounded rectangle, the cursor center point is in a circle, and the preset value is a difference between a radius of the cursor and a radius of the cursor center point.

According to a second aspect, this application provides an electronic device. The electronic device includes: a memory and a processor, where the memory is coupled to the processor. The memory stores program instructions. When executed by the processor, the program instructions cause the electronic device to perform the following steps: displaying a cursor on a display interface, where flatness of the cursor is zero: moving the cursor from a first position to a second position on the display interface in response to a received user operation: and gradually increasing the flatness of the cursor to first flatness in a process in which the cursor moves to the second position. In this way, the electronic device may change an appearance of the cursor in a cursor movement process, to achieve a cursor dragging effect. For example, the electronic device may adjust the flatness of the cursor as the cursor moves, to achieve the dragging effect when the cursor moves.

According to the second aspect, when executed by the processor, the program instructions cause the electronic device to perform the following step: gradually increasing the flatness of the cursor to the first flatness in a process in which the cursor accelerates to the second position at a first acceleration. In this way, in an accelerated movement process of the cursor, the flatness of the cursor becomes larger, in other words, the cursor becomes flatter, to achieve the dragging effect.

For example, the cursor may start to accelerate from a resting state. For example, the cursor may alternatively start to accelerate from a uniform movement state. For example, the cursor may alternatively change from decelerating to accelerating.

According to any one of the second aspect or the foregoing implementations of the second aspect, when executed by the processor, the program instructions cause the electronic device to perform the following step: gradually decreasing the flatness of the cursor from the first flatness to zero in a process in which the cursor moves from the second position to a third position on the display interface, where the cursor continuously moves from the first position to the third position. In this way, in the movement process, the cursor may gradually recover to the initial flatness.

According to any one of the second aspect or the foregoing implementations of the second aspect, when executed by the processor, the program instructions cause the electronic device to perform the following step: gradually decreasing the flatness of the cursor from the first flatness to zero in a process in which the cursor moves to the third position by changing from accelerated movement to first uniform movement. In this way, in a uniform cursor dragging process, the cursor may gradually recover to the initial flatness.

According to any one of the second aspect or the foregoing implementations of the second aspect, a speed of the first uniform movement is a first speed.

According to any one of the second aspect or the foregoing implementations of the second aspect, when executed by the processor, the program instructions cause the electronic device to perform the following step: gradually decreasing the flatness of the cursor from the first flatness to zero after a speed of the cursor becomes a second speed. In this way, the electronic device may preset a speed threshold. When the speed of the cursor during the accelerated movement reaches a preset speed, for example, the second speed, the cursor gradually recovers to the initial flatness.

According to any one of the second aspect or the foregoing implementations of the second aspect, when executed by the processor, the program instructions cause the electronic device to perform the following step: gradually increasing the flatness of the cursor to second flatness in a process in which the cursor moves from the third position to a fourth position on the display interface, where the cursor continuously moves from the first position to the fourth position: and the second flatness is the same as or different from the first flatness. In this way, as a moving status of the cursor varies, a flatness change degree of the cursor may also vary.

According to any one of the second aspect or the foregoing implementations of the second aspect, when executed by the processor, the program instructions cause the electronic device to perform the following step: gradually increasing the flatness of the cursor to the second flatness in a process in which the cursor decelerates to the fourth position. In this way, the flatness of the cursor may be gradually increased in a deceleration process of the cursor, to present a decelerated movement scenario of the cursor.

According to any one of the second aspect or the foregoing implementations of the second aspect, when executed by the processor, the program instructions cause the electronic device to perform the following step: gradually decreasing the flatness of the cursor to zero in a process in which the cursor moves from the fourth position to a fifth position on the display interface.

According to any one of the second aspect or the foregoing implementations of the second aspect, when executed by the processor, the program instructions cause the electronic device to perform the following step: gradually decreasing the flatness of the cursor to zero in a process in which the cursor decelerates to a sixth position.

According to any one of the second aspect or the foregoing implementations of the second aspect, when executed by the processor, the program instructions cause the electronic device to perform the following step: gradually decreasing the flatness of the cursor to zero after a speed of the cursor becomes a third speed.

According to any one of the second aspect or the foregoing implementations of the second aspect, when executed by the processor, the program instructions cause the electronic device to perform the following step: gradually increasing the flatness of the cursor to third flatness in a process in which the cursor accelerates from the third position at a second acceleration, where the second acceleration is greater than the first acceleration, and the third flatness is greater than the first flatness.

According to any one of the second aspect or the foregoing implementations of the second aspect, the cursor is in a rounded rectangle.

According to a third aspect, this application provides an electronic device. The electronic device includes: a memory and a processor, where the memory is coupled to the processor. The memory stores program instructions. When executed by the processor, the program instructions cause the electronic device to perform the following steps: displaying a cursor on a display interface, where the cursor includes a cursor center point, the cursor center point is at a geometric center of the cursor, and flatness of the cursor is zero: moving the cursor from a first position to a second position on the display interface in response to a received user operation: and in a process in which the cursor moves to the second position, gradually shifting the cursor center point from the geometric center of the cursor along an opposite direction of a moving direction of the cursor to a third position within an edge of the cursor, and gradually increasing the flatness of the cursor to first flatness. In this way, the electronic device may change an appearance of the cursor in a cursor movement process, to achieve a cursor dragging effect. For example, the electronic device may adjust the flatness of the cursor and a position of the cursor center point in the cursor as the cursor moves, to achieve the dragging effect when the cursor moves.

According to the third aspect, when executed by the processor, the program instructions cause the electronic device to perform the following step: in a process in which the cursor accelerates to the second position at a first acceleration, gradually shifting the cursor center point from the geometric center of the cursor along the opposite direction of the moving direction of the cursor to the third position, and gradually decreasing the flatness of the cursor from the first flatness to zero.

According to any one of the third aspect or the foregoing implementations of the third aspect, when executed by the processor, the program instructions cause the electronic device to perform the following step: in a process in which the cursor moves from the second position to a fourth position on the display interface, gradually shifting the cursor center point from the third position to the geometric center of the cursor until the cursor center point overlaps the geometric center of the cursor: and gradually decreasing the flatness of the cursor from the first flatness to zero, where the cursor continuously moves from the first position to the fourth position.

According to any one of the third aspect or the foregoing implementations of the third aspect, when executed by the processor, the program instructions cause the electronic device to perform the following step: in a process in which the cursor moves to the fourth position by changing from accelerated movement to first uniform movement, gradually shifting the cursor center point from the third position to the geometric center of the cursor until the cursor center point overlaps the geometric center of the cursor, and gradually decreasing the flatness of the cursor from the first flatness to zero.

According to any one of the third aspect or the foregoing implementations of the third aspect, a speed of the first uniform movement is a first speed.

According to any one of the third aspect or the foregoing implementations of the third aspect, when executed by the processor, the program instructions cause the electronic device to perform the following step: after a speed of the cursor becomes a second speed, gradually shifting the cursor center point from the third position to the geometric center of the cursor until the cursor center point overlaps the geometric center of the cursor, and gradually decreasing the flatness of the cursor from the first flatness to zero.

According to any one of the third aspect or the foregoing implementations of the third aspect, when executed by the processor, the program instructions cause the electronic device to perform the following step: in a process in which the cursor moves from the fourth position to a fifth position on the display interface, gradually shifting the cursor center point from the geometric center of the cursor along the moving direction of the cursor to a sixth position within the edge of the cursor, and gradually increasing the flatness of the cursor to second flatness, where the cursor continuously moves from the first position to the fifth position: an offset between the sixth position and the geometric center of the cursor is the same as or different from an offset between the third position and the geometric center of the cursor: and the second flatness is the same as or different from the first flatness.

According to any one of the third aspect or the foregoing implementations of the third aspect, when executed by the processor, the program instructions cause the electronic device to perform the following step: in a process in which the cursor decelerates to the fifth position, gradually shifting the cursor center point from the geometric center of the cursor along the moving direction of the cursor to the sixth position, and gradually increasing the flatness of the cursor to the second flatness.

According to any one of the third aspect or the foregoing implementations of the third aspect, when executed by the processor, the program instructions cause the electronic device to perform the following step: in a process in which the cursor moves from the fifth position to a seventh position on the display interface, gradually shifting the cursor center point from the sixth position to the geometric center of the cursor until the cursor center point overlaps the geometric center of the cursor, and gradually decreasing the flatness of the cursor to zero, where the cursor continuously moves from the first position to the seventh position.

According to any one of the third aspect or the foregoing implementations of the third aspect, when executed by the processor, the program instructions cause the electronic device to perform the following step: in a process in which the cursor decelerates to the seventh position, gradually shifting the cursor center point from the sixth position to the geometric center of the cursor until the cursor center point overlaps the geometric center of the cursor, and gradually decreasing the flatness of the cursor to zero.

According to any one of the third aspect or the foregoing implementations of the third aspect, when executed by the processor, the program instructions cause the electronic device to perform the following step: after a speed of the cursor becomes a third speed, gradually shifting the cursor center point from the sixth position to the geometric center of the cursor until the cursor center point overlaps the geometric center of the cursor, and gradually decreasing the flatness of the cursor to zero.

According to any one of the third aspect or the foregoing implementations of the third aspect, when executed by the processor, the program instructions cause the electronic device to perform the following step: in a process in which the cursor accelerates from the fourth position at a second acceleration, gradually shifting the cursor center point from the geometric center of the cursor along the opposite direction of the moving direction of the cursor to an eighth position within the edge of the cursor, and gradually increasing the flatness of the cursor to third flatness, where the second acceleration is greater than the first acceleration, and an offset between the eighth position and the geometric center of the cursor is greater than an offset between the third position and the geometric center of the cursor: and the third flatness is greater than the first flatness.

According to any one of the third aspect or the foregoing implementations of the third aspect, an offset between the cursor center point and the geometric center of the cursor is less than a preset value.

According to any one of the third aspect or the foregoing implementations of the third aspect, the cursor is in a rounded rectangle, the cursor center point is in a circle, and the preset value is a difference between a radius of the cursor and a radius of the cursor center point.

According to a fourth aspect, this application provides a cursor display method. The method is applied to an electronic device, and includes: displaying a cursor on a display interface, where the cursor includes a cursor center point, and the cursor center point is at a geometric center of the cursor: moving the cursor from a first position to a second position on the display interface in response to a received user operation: and in a process in which the cursor moves to the second position, gradually shifting the cursor center point from the geometric center of the cursor along an opposite direction of a moving direction of the cursor to a third position within an edge of the cursor.

According to the fourth aspect, the gradually shifting the cursor center point from the geometric center of the cursor along an opposite direction of a moving direction of the cursor to a third position within an edge of the cursor includes: in a process in which the cursor accelerates to the second position at a first acceleration, gradually shifting the cursor center point from the geometric center of the cursor along the opposite direction of the moving direction of the cursor to the third position.

According to any one of the fourth aspect or the foregoing implementations of the fourth aspect, the method further includes: in a process in which the cursor moves from the second position to a fourth position on the display interface, gradually shifting the cursor center point from the third position to the geometric center of the cursor until the cursor center point overlaps the geometric center of the cursor, where the cursor continuously moves from the first position to the fourth position.

According to any one of the fourth aspect or the foregoing implementations of the fourth aspect, the gradually shifting the cursor center point from the third position to the geometric center of the cursor until the cursor center point overlaps the geometric center of the cursor includes: in a process in which the cursor moves to the fourth position by changing from accelerated movement to first uniform movement, gradually shifting the cursor center point from the third position to the geometric center of the cursor until the cursor center point overlaps the geometric center of the cursor.

According to any one of the fourth aspect or the foregoing implementations of the fourth aspect, a speed of the first uniform movement is a first speed.

According to any one of the fourth aspect or the foregoing implementations of the fourth aspect, the gradually shifting the cursor center point from the third position to the geometric center of the cursor until the cursor center point overlaps the geometric center of the cursor includes: after a speed of the cursor becomes a second speed, gradually shifting the cursor center point from the third position to the geometric center of the cursor until the cursor center point overlaps the geometric center of the cursor.

According to any one of the fourth aspect or the foregoing implementations of the fourth aspect, the method further includes: in a process in which the cursor moves from the fourth position to a fifth position on the display interface, gradually shifting the cursor center point from the geometric center of the cursor along the moving direction of the cursor to a sixth position within the edge of the cursor, where the cursor continuously moves from the first position to the fifth position: and an offset between the sixth position and the geometric center of the cursor is the same as or different from an offset between the third position and the geometric center of the cursor.

According to any one of the fourth aspect or the foregoing implementations of the fourth aspect, the gradually shifting the cursor center point from the geometric center of the cursor along the moving direction of the cursor to a sixth position within the edge of the cursor includes: in a process in which the cursor decelerates to the fifth position, gradually shifting the cursor center point from the geometric center of the cursor along the moving direction of the cursor to the sixth position.

According to any one of the fourth aspect or the foregoing implementations of the fourth aspect, the method further includes: in a process in which the cursor moves from the fifth position to a seventh position on the display interface, gradually shifting the cursor center point from the sixth position to the geometric center of the cursor until the cursor center point overlaps the geometric center of the cursor, where the cursor continuously moves from the first position to the seventh position.

According to any one of the fourth aspect or the foregoing implementations of the fourth aspect, the gradually shifting the cursor center point from the sixth position to the geometric center of the cursor until the cursor center point overlaps the geometric center of the cursor includes: in a process in which the cursor decelerates to the seventh position, gradually shifting the cursor center point from the sixth position to the geometric center of the cursor until the cursor center point overlaps the geometric center of the cursor.

According to any one of the fourth aspect or the foregoing implementations of the fourth aspect, the gradually shifting the cursor center point from the sixth position to the geometric center of the cursor until the cursor center point overlaps the geometric center of the cursor includes: after a speed of the cursor becomes a third speed, gradually shifting the cursor center point from the sixth position to the geometric center of the cursor until the cursor center point overlaps the geometric center of the cursor.

According to any one of the fourth aspect or the foregoing implementations of the fourth aspect, the method further includes: in a process in which the cursor accelerates from the fourth position at a second acceleration, gradually shifting the cursor center point from the geometric center of the cursor along the opposite direction of the moving direction of the cursor to an eighth position within the edge of the cursor, where the second acceleration is greater than the first acceleration, and an offset between the eighth position and the geometric center of the cursor is greater than an offset between the third position and the geometric center of the cursor.

According to any one of the fourth aspect or the foregoing implementations of the fourth aspect, an offset between the cursor center point and the geometric center of the cursor is less than a preset value.

According to any one of the fourth aspect or the foregoing implementations of the fourth aspect, the cursor is in a rounded rectangle, the cursor center point is in a circle, and the preset value is a difference between a radius of the cursor and a radius of the cursor center point.

According to a fifth aspect, this application provides a cursor display method. The method is applied to an electronic device, and includes: displaying a cursor on a display interface, where flatness of the cursor is zero: moving the cursor from a first position to a second position on the display interface in response to a received user operation: and gradually increasing the flatness of the cursor to first flatness in a process in which the cursor moves to the second position.

According to the fifth aspect, the gradually increasing the flatness of the cursor to first flatness includes: gradually increasing the flatness of the cursor to the first flatness in a process in which the cursor accelerates to the second position at a first acceleration.

According to any one of the fifth aspect or the foregoing implementations of the fifth aspect, the method further includes: gradually decreasing the flatness of the cursor from the first flatness to zero in a process in which the cursor moves from the second position to a third position on the display interface, where the cursor continuously moves from the first position to the third position.

According to any one of the fifth aspect or the foregoing implementations of the fifth aspect, the gradually decreasing the flatness of the cursor from the first flatness to zero includes: gradually decreasing the flatness of the cursor from the first flatness to zero in a process in which the cursor moves to the third position by changing from accelerated movement to first uniform movement.

According to any one of the fifth aspect or the foregoing implementations of the fifth aspect, a speed of the first uniform movement is a first speed.

According to any one of the fifth aspect or the foregoing implementations of the fifth aspect, the gradually decreasing the flatness of the cursor from the first flatness to zero includes: gradually decreasing the flatness of the cursor from the first flatness to zero after a speed of the cursor becomes a second speed.

According to any one of the fifth aspect or the foregoing implementations of the fifth aspect, the method further includes: gradually increasing the flatness of the cursor to second flatness in a process in which the cursor moves from the third position to a fourth position on the display interface, where the cursor continuously moves from the first position to the fourth position: and the second flatness is the same as or different from the first flatness.

According to any one of the fifth aspect or the foregoing implementations of the fifth aspect, the gradually increasing the flatness of the cursor to second flatness includes: gradually increasing the flatness of the cursor to the second flatness in a process in which the cursor decelerates to the fourth position.

According to any one of the fifth aspect or the foregoing implementations of the fifth aspect, the method further includes: gradually decreasing the flatness of the cursor to zero in a process in which the cursor moves from the fourth position to a fifth position on the display interface.

According to any one of the fifth aspect or the foregoing implementations of the fifth aspect, the gradually decreasing the flatness of the cursor to zero includes: gradually decreasing the flatness of the cursor to zero in a process in which the cursor decelerates to a sixth position.

According to any one of the fifth aspect or the foregoing implementations of the fifth aspect, the gradually decreasing the flatness of the cursor to zero includes: gradually decreasing the flatness of the cursor to zero after a speed of the cursor becomes a third speed.

According to any one of the fifth aspect or the foregoing implementations of the fifth aspect, the method further includes: gradually increasing the flatness of the cursor to third flatness in a process in which the cursor accelerates from the third position at a second acceleration, where the second acceleration is greater than the first acceleration, and the third flatness is greater than the first flatness.

According to any one of the fifth aspect or the foregoing implementations of the fifth aspect, the cursor is in a rounded rectangle.

According to a sixth aspect, this application provides a cursor display method. The method is applied to an electronic device, and includes: displaying a cursor on a display interface, where the cursor includes a cursor center point, the cursor center point is at a geometric center of the cursor, and flatness of the cursor is zero: moving the cursor from a first position to a second position on the display interface in response to a received user operation: and in a process in which the cursor moves to the second position, gradually shifting the cursor center point from the geometric center of the cursor along an opposite direction of a moving direction of the cursor to a third position within an edge of the cursor, and gradually increasing the flatness of the cursor to first flatness.

According to the sixth aspect, the gradually shifting the cursor center point from the geometric center of the cursor along an opposite direction of a moving direction of the cursor to a third position within an edge of the cursor, and gradually increasing the flatness of the cursor to first flatness includes: in a process in which the cursor accelerates to the second position at a first acceleration, gradually shifting the cursor center point from the geometric center of the cursor along the opposite direction of the moving direction of the cursor to the third position, and gradually decreasing the flatness of the cursor from the first flatness to zero.

According to any one of the sixth aspect or the foregoing implementations of the sixth aspect, the method further includes: in a process in which the cursor moves from the second position to a fourth position on the display interface, gradually shifting the cursor center point from the third position to the geometric center of the cursor until the cursor center point overlaps the geometric center of the cursor: and gradually decreasing the flatness of the cursor from the first flatness to zero, where the cursor continuously moves from the first position to the fourth position.

According to any one of the sixth aspect or the foregoing implementations of the sixth aspect, the gradually shifting the cursor center point from the third position to the geometric center of the cursor until the cursor center point overlaps the geometric center of the cursor: and gradually decreasing the flatness of the cursor from the first flatness to zero includes: in a process in which the cursor moves to the fourth position by changing from accelerated movement to first uniform movement, gradually shifting the cursor center point from the third position to the geometric center of the cursor until the cursor center point overlaps the geometric center of the cursor, and gradually decreasing the flatness of the cursor from the first flatness to zero.

According to any one of the sixth aspect or the foregoing implementations of the sixth aspect, a speed of the first uniform movement is a first speed.

According to any one of the sixth aspect or the foregoing implementations of the sixth aspect, the gradually shifting the cursor center point from the third position to the geometric center of the cursor until the cursor center point overlaps the geometric center of the cursor: and gradually decreasing the flatness of the cursor from the first flatness to zero includes: after a speed of the cursor becomes a second speed, gradually shifting the cursor center point from the third position to the geometric center of the cursor until the cursor center point overlaps the geometric center of the cursor, and gradually decreasing the flatness of the cursor from the first flatness to zero.

According to any one of the sixth aspect or the foregoing implementations of the sixth aspect, the method further includes: in a process in which the cursor moves from the fourth position to a fifth position on the display interface, gradually shifting the cursor center point from the geometric center of the cursor along the moving direction of the cursor to a sixth position within the edge of the cursor, and gradually increasing the flatness of the cursor to second flatness, where the cursor continuously moves from the first position to the fifth position: an offset between the sixth position and the geometric center of the cursor is the same as or different from an offset between the third position and the geometric center of the cursor: and the second flatness is the same as or different from the first flatness.

According to any one of the sixth aspect or the foregoing implementations of the sixth aspect, the gradually shifting the cursor center point from the geometric center of the cursor along the moving direction of the cursor to a sixth position within the edge of the cursor, and gradually increasing the flatness of the cursor to second flatness includes: in a process in which the cursor decelerates to the fifth position, gradually shifting the cursor center point from the geometric center of the cursor along the moving direction of the cursor to the sixth position, and gradually increasing the flatness of the cursor to the second flatness.

According to any one of the sixth aspect or the foregoing implementations of the sixth aspect, the method further includes: in a process in which the cursor moves from the fifth position to a seventh position on the display interface, gradually shifting the cursor center point from the sixth position to the geometric center of the cursor until the cursor center point overlaps the geometric center of the cursor, and gradually decreasing the flatness of the cursor to zero, where the cursor continuously moves from the first position to the seventh position.

According to any one of the sixth aspect or the foregoing implementations of the sixth aspect, the gradually shifting the cursor center point from the sixth position to the geometric center of the cursor until the cursor center point overlaps the geometric center of the cursor, and gradually decreasing the flatness of the cursor to zero includes: in a process in which the cursor decelerates to the seventh position, gradually shifting the cursor center point from the sixth position to the geometric center of the cursor until the cursor center point overlaps the geometric center of the cursor, and gradually decreasing the flatness of the cursor to zero.

According to any one of the sixth aspect or the foregoing implementations of the sixth aspect, the gradually shifting the cursor center point from the sixth position to the geometric center of the cursor until the cursor center point overlaps the geometric center of the cursor, and gradually decreasing the flatness of the cursor to zero includes: after a speed of the cursor becomes a third speed, gradually shifting the cursor center point from the sixth position to the geometric center of the cursor until the cursor center point overlaps the geometric center of the cursor, and gradually decreasing the flatness of the cursor to zero.

According to any one of the sixth aspect or the foregoing implementations of the sixth aspect, the method further includes: in a process in which the cursor accelerates from the fourth position at a second acceleration, gradually shifting the cursor center point from the geometric center of the cursor along the opposite direction of the moving direction of the cursor to an eighth position within the edge of the cursor, and gradually increasing the flatness of the cursor to third flatness, where the second acceleration is greater than the first acceleration, and an offset between the eighth position and the geometric center of the cursor is greater than an offset between the third position and the geometric center of the cursor: and the third flatness is greater than the first flatness.

According to any one of the sixth aspect or the foregoing implementations of the sixth aspect, an offset between the cursor center point and the geometric center of the cursor is less than a preset value.

According to any one of the sixth aspect or the foregoing implementations of the sixth aspect, the cursor is in a rounded rectangle, the cursor center point is in a circle, and the preset value is a difference between a radius of the cursor and a radius of the cursor center point.

According to a seventh aspect, this application provides a chip. The chip includes one or more interface circuits and one or more processors. The interface circuit is configured to receive a signal from a memory of an electronic device and send the signal to the processor, where the signal includes computer instructions stored in the memory. When the processor executes the computer instructions, the electronic device is caused to execute instructions for the method according to the fourth aspect or any possible implementation of the fourth aspect, instructions for the method according to the fifth aspect or any possible implementation of the fifth aspect, or instructions for the method according to the sixth aspect or any possible implementation of the sixth aspect.

According to an eighth aspect, this application provides a computer-readable medium, configured to store a computer program. The computer program includes instructions for performing the method according to the fourth aspect or any possible implementation of the fourth aspect, instructions for performing the method according to the fifth aspect or any possible implementation of the fifth aspect, or instructions for performing the method according to the sixth aspect or any possible implementation of the sixth aspect.

According to a ninth aspect, this application provides a computer program. The computer program includes instructions for performing the method according to the fourth aspect or any possible implementation of the fourth aspect, instructions for performing the method according to the fifth aspect or any possible implementation of the fifth aspect, or instructions for performing the method according to the sixth aspect or any possible implementation of the sixth aspect.

DESCRIPTION OF EMBODIMENTS

The technical solutions in embodiments of this application are clearly described below with reference to the accompanying drawings in the embodiments of this application. It is clear that the described embodiments are merely some rather than all of the embodiments of this application. All other embodiments obtained by a person of ordinary skill in the art based on the embodiments of this application without making creative efforts shall fall within the protection scope of this application.

The term "and/or" used herein describes only an association relationship between associated objects and represents that three relationships may exist. For example, A and/or B may represent the following three cases: Only A exists, both A and B exist, and only B exists.

In the specification and claims in the embodiments of this application, the terms "first", "second", and the like are intended to distinguish between different objects but do not indicate a particular order of the objects. For example, a first target object and a second target object are intended to distinguish between different target objects, but do not indicate a particular order of the target objects.

In the embodiments of this application, the word "example" or "for example" represents giving an example, an illustration, or a description. Any embodiment or design scheme described by using "example" or "for example" in the embodiments of this application should not be explained as being more preferred or having more advantages than another embodiment or design scheme. In particular, the terms such as "example" or "for example" used herein are intended to present a related concept in a specific manner.

In the descriptions of the embodiments of this application, unless otherwise stated, "a plurality of" means two or more. For example, a plurality of processing units refer to two or more processing units: and a plurality of systems refer to two or more systems.

Figure 1:
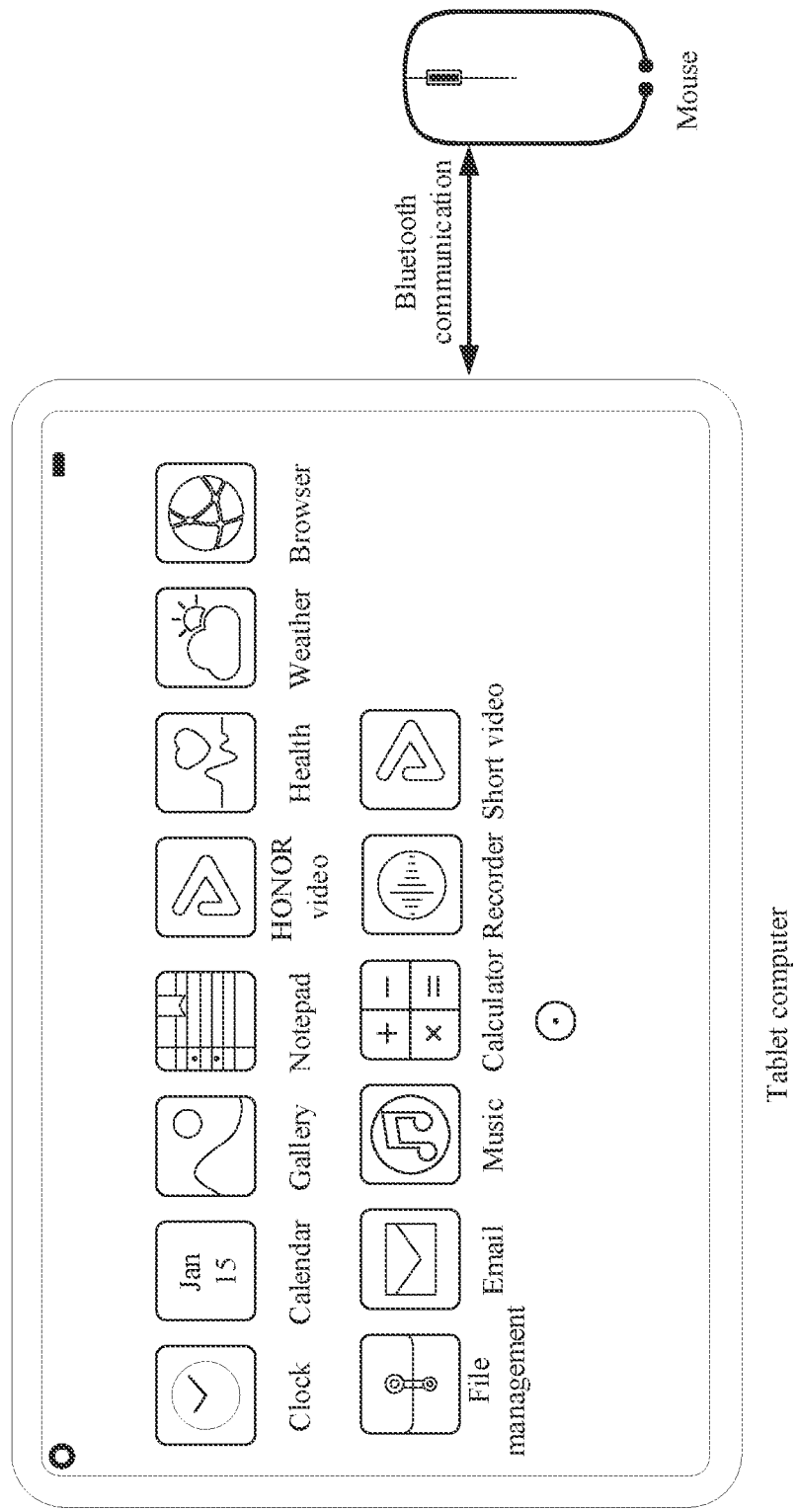
FIG. 1 is an example of a schematic diagram of an application scenario.

Before the technical solutions in the embodiments of this application are described, an application scenario in the embodiments of this application is first described with reference to the accompanying drawings. FIG. 1 is a schematic diagram of an application scenario according to an embodiment of this application. The application scenario includes a tablet computer and a mouse. Optionally, the tablet computer and the mouse perform data exchange through a Bluetooth connection. For example, in this embodiment of this application, after the tablet computer is connected to the mouse, a cursor may be displayed on a display interface of the tablet computer. A user may move the mouse by using a position of the cursor displayed on the tablet computer, to control the cursor to move on the tablet computer. It should be noted that the embodiments of this application only use, as an example, a cursor display manner on the tablet computer that is used when the tablet computer is connected to the mouse. In another embodiment, the cursor display manner in the embodiments of this application may also be applied to another application scenario, for example, a scenario in which the tablet computer is connected to an external device such as a touchpad or a keyboard. This is not limited in this application. It should be further noted that, the embodiments of this application use the cursor display manner on the tablet computer as an example for description. In another embodiment, the cursor display manner in the embodiments of this application may also be applied to another electronic device, for example, a mobile phone, a television, or a vehicle-mounted device. This is not limited in this application.

Figure 2:
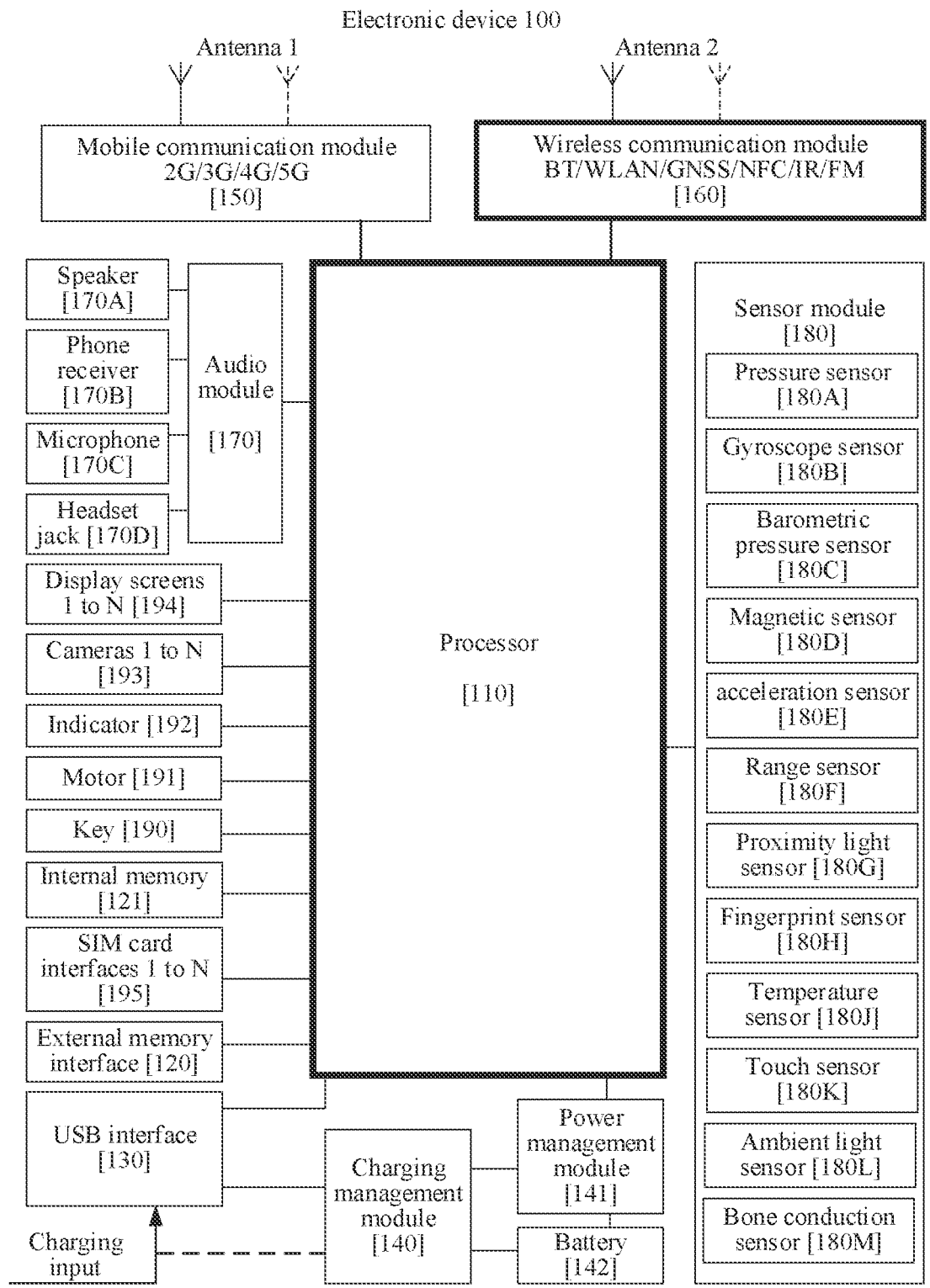
FIG. 2 is an example of a schematic diagram of a hardware structure of an electronic device.

FIG. 2 is a schematic structural diagram of an electronic device 100. It should be understood that the electronic device 100 shown in FIG. 2 is only an example of the electronic device, and the electronic device 100 may have more or fewer components than those shown in the figure, may combine two or more components, or may have a different component configuration. The components shown in FIG. 2 may be implemented by hardware that includes one or more signal processors and/or application-specific integrated circuits, software, or a combination of hardware and software.

The electronic device 100 may include: a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, a proximity light sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate components, or may be integrated into one or more processors.

The controller may be a nerve center and a command center of the electronic device 100. The controller may generate an operation control signal according to instruction operation code and a time-sequence signal, and control obtaining and execution of instructions.

A memory may also be disposed in the processor 110, and is configured to store instructions and data. In some embodiments, the memory in the processor 110 is a cache memory: The memory may store instructions or data recently used or cyclically used by the processor 110. If the processor 110 needs to use the instructions or the data again, the processor 110 may directly call the instructions or the data from the memory. This avoids repeated access, and reduces waiting duration of the processor 110, thereby improving system efficiency.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The USB interface 130 is an interface that complies with the USB standard specification, and may be specifically a mini USB interface, a micro USB interface, a USB Type C interface, or the like. The USB interface 130 may be configured to connect to a charger to charge the electronic device 100, or may be used for data transmission between the electronic device 100 and a peripheral device. The USB interface 130 may also be configured to connect to a headset to play audio through the headset. The interface may further be configured to connect to another electronic device such as an AR device.

It may be understood that a schematic interface connection relationship between the modules in the embodiments of this application is merely an example for description, and constitutes no limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from the charger. The charger may be a wireless charger or a wired charger. In some embodiments of wired charging, the charging management module 140 may receive charging input of the wired charger through the USB interface 130. In some embodiments of wireless charging, the charging management module 140 may receive wireless charging input by using a wireless charging coil of the electronic device 100. While the charging management module 140 charges the battery 142, the power management module 141 may further supply power to the electronic device.

The power management module 141 is configured to connect to the battery 142, the charging management module 140, and the processor 110. The power management module 141 receives input from the battery 142 and/or the charging management module 140, and supplies power to the processor 110, the internal memory 121, an external memory; the display screen 194, the camera 193, the wireless communication module 160, and the like. The power management module 141 may further be configured to monitor parameters such as a battery capacity, a quantity of battery cycles, and a battery health status (power leakage and impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may further be multiplexed to improve utilization of the antennas. For example, the antenna 1 may be multiplexed into a diversity antenna of a wireless local area network. In some other embodiments, the antennas may be used with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (low noise amplifier, LNA), and the like. The mobile communication module 150 may receive an electromagnetic wave via the antenna 1, perform processing such as filtering and amplification on the received electromagnetic wave, and send the electromagnetic wave to the modem processor for demodulation. The mobile communication module 150 may further amplify a signal modulated by the modem processor, convert the signal into an electromagnetic wave via the antenna 1, and radiate the electromagnetic wave. In some embodiments, at least a part of functional modules of the mobile communication module 150 may be disposed in the processor 110. In some embodiments, at least a part of functional modules of the mobile communication module 150 may be disposed in a same component as at least a part of modules of the processor 110.

The modem processor may include a modulator and a demodulator. The modulator is configured to modulate a low frequency baseband signal to be sent into a medium and high frequency signal. The demodulator is configured to demodulate a received electromagnetic wave signal into a low frequency baseband signal. Then, the demodulator transfers the low frequency baseband signal obtained through demodulation to the baseband processor for processing. The low frequency baseband signal is processed by the baseband processor and then transferred to the application processor. The application processor outputs a sound signal through an audio device (which is not limited to the speaker 170A, the phone receiver 170B, and the like), or displays an image or a video through the display screen 194. In some embodiments, the modem processor may be an independent component. In some other embodiments, the modem processor may be independent of the processor 110, and is disposed in a same component as the mobile communication module 150 or another functional module.

The wireless communication module 160 may provide a solution to wireless communication applied to the electronic device 100, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology: The wireless communication module 160 may be one or more components into which at least one communication processing module is integrated. The wireless communication module 160 receives an electromagnetic wave via the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, convert the to-be-sent signal into an electromagnetic wave via the antenna 2, and radiate the electromagnetic wave. In this embodiment of this application, the wireless communication module 160 in the tablet computer may support Bluetooth communication between the tablet computer and the mouse.

In some embodiments, the antenna 1 and the mobile communication module 150 of the electronic device 100 are coupled, and the antenna 2 and the wireless communication module 160 of the electronic device 100 are coupled, so that the electronic device 100 can communicate with a network and another device by using a wireless communications technology: The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology; and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display screen 194, the application processor, and the like. The GPU is a microprocessor for image processing and connects the display screen 194 and the application processor. The GPU is configured to perform mathematical and geometric calculation and render graphics. The processor 110 may include one or more GPUs that execute program instructions to generate or change display information.

The display screen 194 is configured to display an image, a video, and the like. The display screen 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), and the like. In some embodiments, the electronic device 100 may include one or N display screens 194, where N is a positive integer greater than 1.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is turned on. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may also perform algorithm optimization on noise, brightness, and a skin tone of the image. The ISP may also optimize parameters such as exposure and a color temperature of a photographed scene. In some embodiments, the ISP may be arranged in the camera 193.

The camera 193 is configured to capture a still image or video. An optical image is generated for an object by using the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in standard formats such as an RGB format and a YUV format. In some embodiments, the electronic device 100 may include one or N cameras 193, where N is a positive integer greater than 1.

The external memory interface 120 may be configured to connect to an external storage card such as a micro SD card, to expand a storage capability of the electronic device 100. The external storage card communicates with the processor 110 through the external memory interface 120, to implement a data storage function, for example, store files such as music and a video into the external storage card.

The internal memory 121 may be configured to store computer-executable program code. The executable program code includes instructions. The processor 110 runs the instructions stored in the internal memory 121, to implement various functional applications and data processing of the electronic device 100. For example, in this embodiment of this application, the processor 110 may implement a cursor display method in the embodiments of this application by running the instructions stored in the internal memory 121. The internal memory 121 may include a program storage area and a data storage area. The program storage area may store an operating system, an application required by at least one function (such as a sound playback function and an image display function), and the like. The data storage area may store data (such as audio data and an address book) and the like created when the electronic device 100 is used. In addition, the internal memory 121 may include a high-speed random access memory, and may also include a non-volatile memory, for example, at least one magnetic disk storage component, a flash memory component, or a universal flash storage (universal flash storage, UFS).

The electronic device 100 may implement an audio function such as music playing or recording by using the audio module 170, the speaker 170A, the phone receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may further be configured to encode and decode an audio signal. In some embodiments, the audio module 170 may be disposed in the processor 110, or a part of functional modules in the audio module 170 may be disposed in the processor 110.

A software system of the electronic device 100 may use a layered architecture, an event-driven architecture, a micro core architecture, a micro service architecture, or a cloud architecture. In the embodiments of this application, the software structure of the electronic device 100 is illustrated by using an Android system with a layered architecture as an example.

Figure 3:
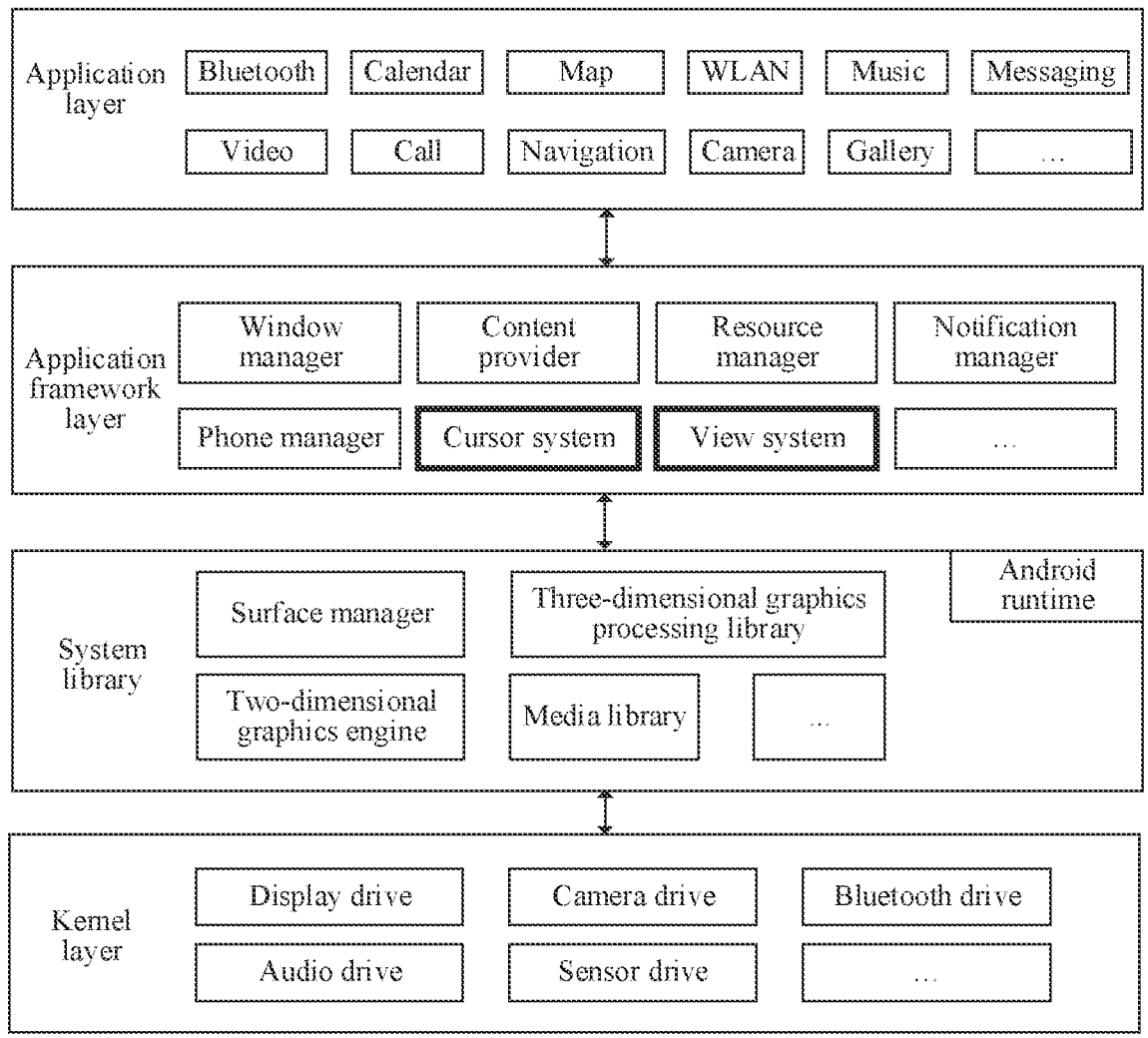
FIG. 3 is an example of a schematic diagram of a software structure of an electronic device.

FIG. 3 is a block diagram of the software structure of the electronic device 100 according to an embodiment of this application.

In a layered architecture of the electronic device 100, software is divided into several layers, and each layer has a clear role and task. The layers communicate with each other through a software interface. In some embodiments, the Android system is divided into four layers, which are an application layer, an application framework layer, an Android runtime (Android runtime) and system library, and a kernel layer from top to bottom.

The application layer may include a series of application packages.

As shown in FIG. 3, the application packages may include applications such as camera, gallery, calendar, phone, map, navigation, WLAN, Bluetooth, music, video, and short message.

The application framework layer provides an application programming interface (application programming interface, API) and a programming framework for the application at the application layer. The application framework layer includes some predefined functions.

As shown in FIG. 3, the application framework layer may include a window manager, a content provider, a view system, a phone manager, a resource manager, a notification manager, a notification manager, a cursor system, and the like.

The window manager is configured to manage a window program. The window manager may obtain a size of the display screen, determine whether there is a status bar, perform screen locking, take a screenshot, and so on.

The content provider is configured to store and obtain data, and make the data accessible to an application. The data may include a video, an image, audio, calls that are made and answered, a browsing history and a bookmark, an address book, and the like.

The view system includes visual controls such as a control for displaying a text and a control for display an image. The view system may be configured to construct an application program. A display interface may include one or more views. For example, a display interface including a short message notification icon may include a view for displaying a text and a view for displaying a picture. For example, in the embodiments of this application, the view system may further be configured to draw a cursor in the visual control, for example, the following bottom navigation control.

The cursor system is configured to draw and display the drawn cursor in the embodiments of this application. The cursor system may display the cursor at a corresponding position on the display screen of the electronic device 100 based on movement of an external device, for example, a mouse.

The phone manager is configured to provide a communication function for the electronic device 100, for example, call status management (including pick-up and hang-up).

The resource manager provides various resources such as a localized character string, an icon, an image, a layout file, and a video file for an application.

The notification manager enables an application to display notification information in the status bar, where the notification information may be used to convey a message of a notification type, and may disappear automatically after a short stay without user interaction. For example, the notification manager is configured to provide a notification of download completion, a message prompt, and the like. The notification manager may alternatively be a notification that appears on a top status bar of the system in a form of a graph or a scroll bar text, for example, a notification of an application running on the background, or may be a notification that appears on the screen in a form of a dialog window: For example, text information is prompted on the status bar, a prompt tone is made, the electronic device vibrates, or an indicator light blinks.

The Android runtime includes a core library and a virtual machine. The Android runtime is responsible for scheduling and managing the Android system.

The core library includes two parts: a performance function that the Java language needs to invoke and a core library of Android.

The application layer and the application framework layer are run in the virtual machine. The virtual machine executes Java files of the application layer and the application framework layer as binary files. The virtual machine is used to execute functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem, and provide fusion of 2D and 3D layers to a plurality of applications.

The media library supports playback and recording in a plurality of common audio and video formats, and also supports still image files and the like. The media library may support a plurality of audio and video encoding formats, for example, MPEG 4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display drive, a camera drive, an audio drive, and a sensor drive.

It may be understood that the components included in the system framework layer, the system library; and the runtime layer shown in FIG. 3 do not constitute a specific limitation on the electronic device 100. In some other embodiments of this application, the electronic device 100 may include more or fewer components than those shown in the figure, some components may be combined, some components may be divided, or different component arrangements may be used.

Figure 4A:
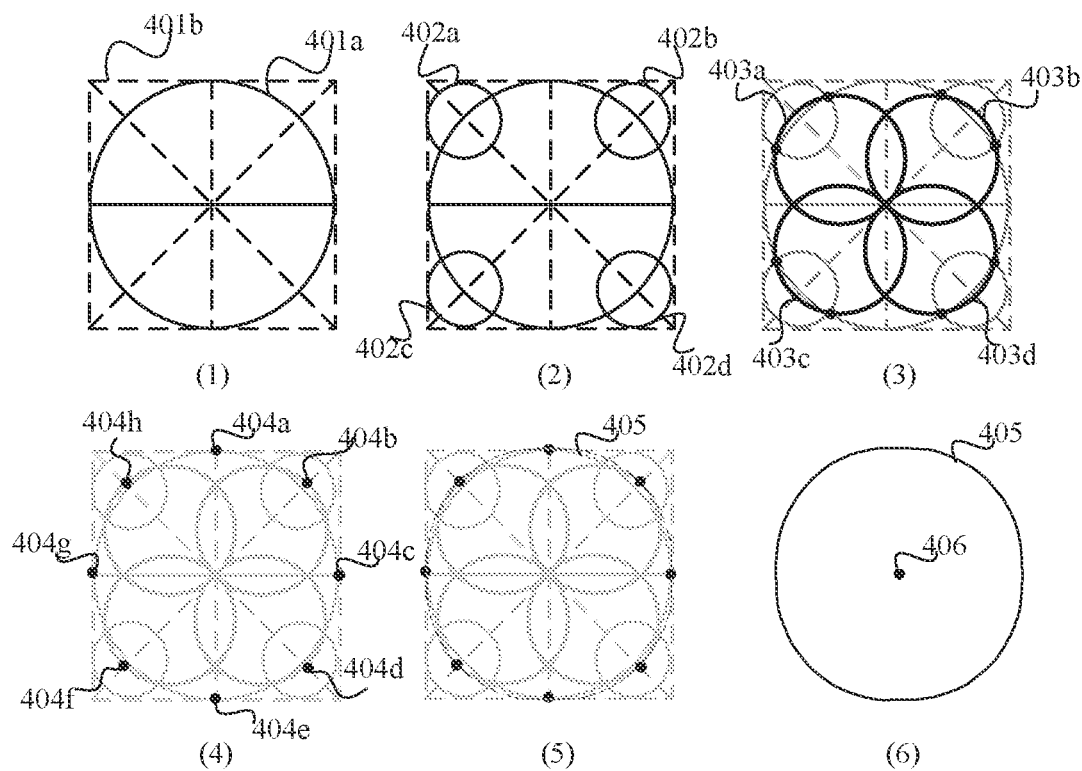
FIG. 4a is an example of a schematic diagram of cursor drawing.

For example, in the embodiments of this application, the tablet computer (for example, the cursor system shown in FIG. 3) may draw a cursor, and display the drawn cursor on the display interface of the tablet computer. FIG. 4a is an example of a schematic diagram of cursor drawing. Refer to (1) in FIG. 4a. For example, the cursor system draws a circle 401a based on a square 401b. A geometric center of the circle 401 overlaps a geometric center of the square 401b. In other words, an intersection point of diagonals of the square is a center of the circle 401. Refer to (2) in FIG. 4a. For example, the cursor system may draw circles 402a to 402d based on intersection points of the circle 401a and the two diagonals of the square 401b. The four intersection points of the circle 401a and the diagonals of the square 401b are respectively four centers of the circles 402a to 402d. In addition, a distance between the intersection point and a border, of the square 401, closest to the intersection point is a radius of the circle. Refer to (3) in FIG. 4a. For example, the cursor system may draw a circle 403a based on the center of the circle 401a and intersection points of the circle 401a and the circle 402a. The center of the circle 401a and the two intersection points of the circle 401a and the circle 402a are all at an edge of the circle 403a. The cursor system draws circles 403b to 403d based on the foregoing manner. Refer to (4) in FIG. 4a. For example, intersection points obtained by the cursor system that are of the diagonals of the square 401b and the circles 403a to 403d include: 404b, 404d, 404f, and 404h. Intersection points obtained by the cursor system that are of the circle 401a and the square 401b include: 404a, 404c, 404e, and 404g. Refer to (5) in FIG. 4a. For example, the cursor system draws a cursor 405 based on 401a and the obtained intersection points 404a to 404h by changing a curvature of the circle 401a. For example, the cursor 405 drawn by the cursor system is shown in (6) in FIG. 4a. Optionally, the cursor 405 may be referred to as a rounded rectangle. Refer to (6) in FIG. 4a. For example, the cursor 405 further includes a cursor center 406. Optionally, when the form of the cursor does not change, the cursor center 406 may represent a point position of the cursor, where the point position may also be understood as an actual position of the cursor. To be specific, in this embodiment of this application, the cursor center 406 indicates an actual position (or coordinates) corresponding to the mouse on the display interface, and the cursor 405 may highlight the position of the cursor, so that the position of the cursor is more obvious, and helps the user control the position of the cursor by using the mouse.

Still refer to (6) in FIG. 4a. For example, a perimeter of the cursor 405 is greater than a perimeter, namely, $2\pi r$, of the circle 401a shown in (1) in FIG. 4a. r is a radius of the circle 401. In addition, the cursor 405 is less than a perimeter, namely, 8r, of the square 401b shown in (1) in FIG. 4a.

Figure 4B:
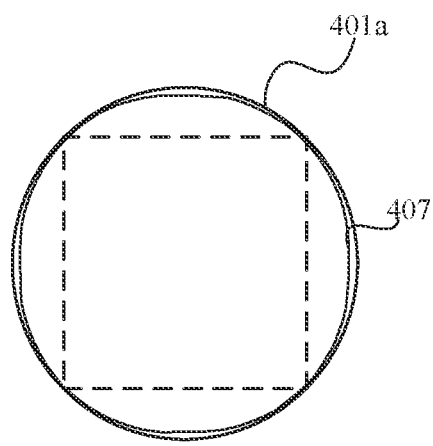
FIG. 4b is an example of a schematic diagram of cursor drawing.

In another possible implementation, refer to FIG. 4b. For example, a cursor 407 is in a rounded rectangle, and a perimeter of the cursor 407 is greater than a perimeter, namely, $4\sqrt{2}r$, of an inscribed square of the circle 401a shown in (1) in FIG. 4a. r is the radius of the circle 401. In addition, the perimeter of the cursor 407 is less than the perimeter, namely, $2\pi r$, of the circle 401a shown in (1) in FIG. 4a.

Examples are used for description. Refer to (1) in FIG. 4c. For example, optionally, a center of a cursor is black, an edge of the cursor is black, and a fill color of the cursor is white. Optionally, transparency of the cursor is 80%, edge transparency of the cursor is 60%, and center transparency of the cursor is 0. The cursor center is at a geometric center of the cursor.

Figure 4C:
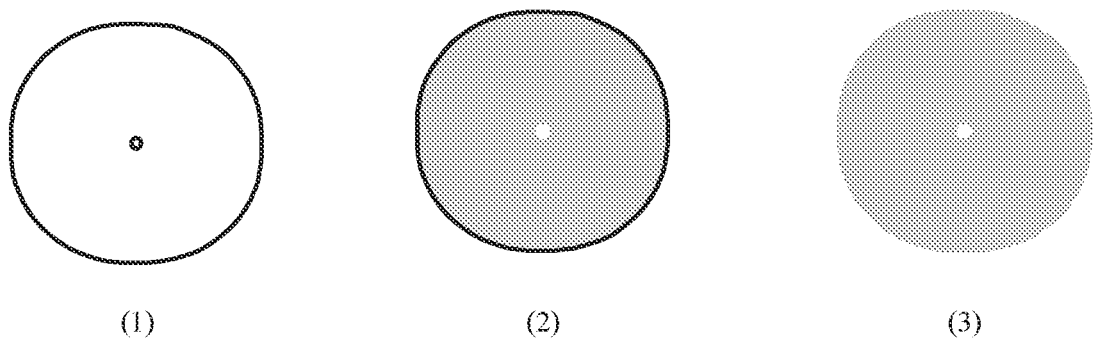
FIG. 4c is an example of a schematic diagram of a cursor appearance.

Refer to (2) in FIG. 4c. For example, optionally, a center of a cursor is white, and center transparency is 20%. A fill color of the cursor is grey, and transparency of the cursor is 60%. An edge of the cursor is black, and edge transparency of the cursor is 60%.

Refer to (3) in FIG. 4c. For example, optionally, a center of a cursor is white, and center transparency is 0. A fill color of the cursor is grey, and transparency of the cursor is 60%. An edge of the cursor is grey, and edge transparency of the cursor is 100%.

It should be noted that the cursors in FIG. 4c are merely schematic examples. Any combination of the transparency of the cursor, a color of the edge of the cursor, the edge transparency of the cursor, thickness of the edge of the cursor, a size of the cursor center 406, a shape of the cursor center 406, a color of the cursor center 406, transparency of the cursor center 406, and a position of the cursor center 406 in the cursor 405 falls within the protection scope of this application. It should be further noted that, the cursor system may display different cursors based on brightness of the display interface, an application displayed on the display interface, and/or a background color of the display interface. Examples are used for description. For example, when a notepad application is displayed on the display interface, the cursor may be shown in (1) in FIG. 4c. For example, when a game application is displayed on the display interface, the cursor may be shown in (2) in FIG. 4c. For example, when the background color of the display interface is black, the cursor may be shown in (1) in FIG. 4c. For example, when the background color of the display interface is white, the cursor may be shown in (3) in FIG. 4c.

Figure 5:
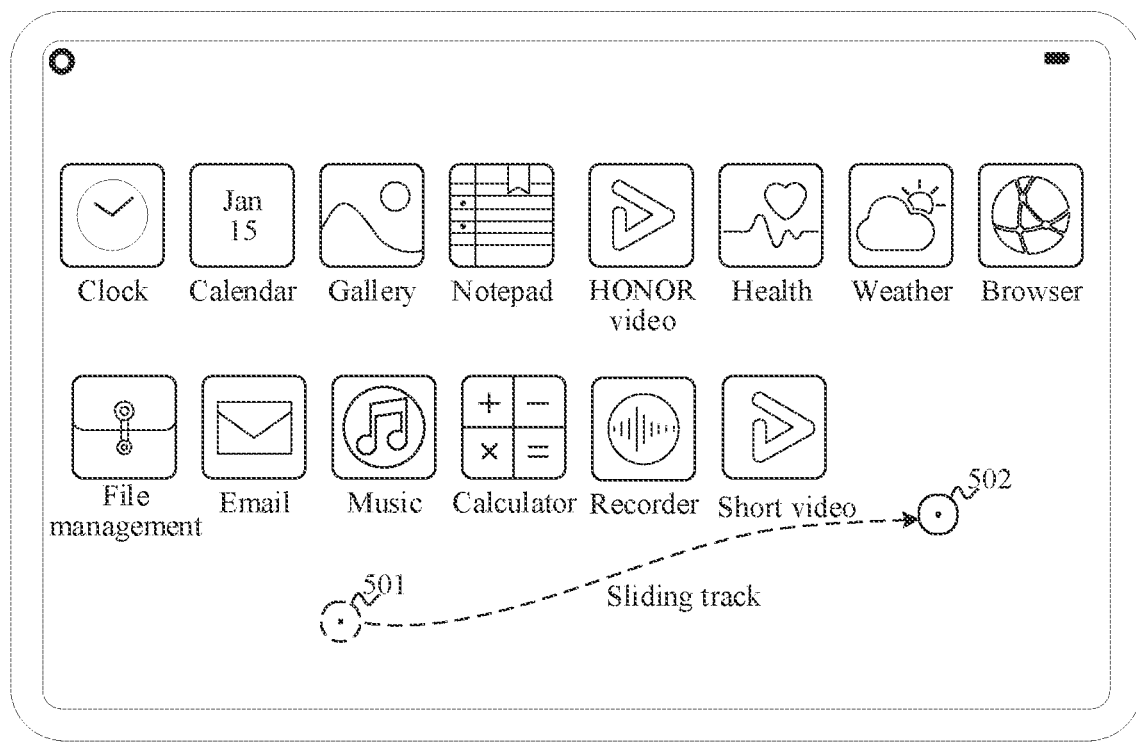
FIG. 5 is an example of a schematic diagram of cursor movement.

FIG. 5 is an example of a schematic diagram of cursor movement. Refer to FIG. 5. For example, the user may operate the mouse to move. The cursor system draws a cursor at a corresponding position on a desktop based on a sliding track of the mouse in response to a received mouse sliding operation, to achieve a cursor following effect. For example, the cursor system may move the cursor from a position 501 to a position 502 on the desktop based on the sliding track of the mouse and the mouse sliding operation. The sliding track is shown by a dashed line. It should be noted that the sliding track is merely a schematic example, and is not limited in this application. It should be further noted that, in FIG. 5, the cursor form in (1) in FIG. 4c is merely used as an example for description. This is not limited in this application.

For example, in the embodiments of this application, the cursor system may change the form of the cursor in a cursor movement process, to visually present a cursor dragging effect.

In an example, the cursor system may change the position of the cursor center in the cursor in a cursor drawing process, to achieve the cursor dragging effect. In another example, the cursor system may change a shape of the cursor in a cursor drawing process, to achieve the cursor dragging effect. In still another example, the cursor system may change the position of the cursor center in the cursor and a shape of the cursor in a cursor drawing process, to achieve the cursor dragging effect. The following describes the foregoing cursor form change process by using specific embodiments.

Figure 6:
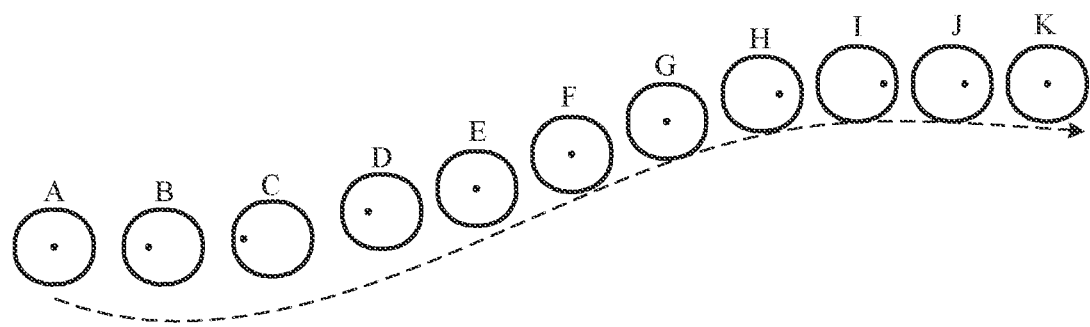
FIG. 6 is an example of a schematic diagram of a cursor form change.

FIG. 6 is an example of a schematic diagram of a cursor form change. Refer to FIG. 6. The movement track shown in FIG. 5 is used as an example. For example, the cursor system draws the cursor based on the sliding track of the mouse, to move the cursor from a point A to a point K. For example, when the cursor is at the point A, the cursor center is at the center of the cursor (namely, the geometric center of the cursor, where this is not repeated below). It should be noted that to distinguish between the cursor center and the center of the cursor, the cursor center is referred to as a cursor center point below.

For example, in a process in which the cursor system moves the cursor to the point K, the cursor center point gradually deviates from the center of the cursor (for example, from the point A to a point C). Then, the cursor center point gradually approaches the center of the cursor from a farthest deviation point (for example, the point C) (for example, from the point C to a point E) until the cursor center point overlaps the center of the cursor (for example, at the point E). After the cursor center point overlaps the center of the cursor, the cursor center point and the cursor move at a same speed, in other words, move in an overlapping state. In a process in which the cursor gradually decelerates after moving to a point G, the cursor center point deviates from the center of the cursor again (for example, from the point G to a point I), and reaches a farthest deviation point (for example, the point I). The cursor center point gradually approaches the center of the cursor from the farthest deviation point (for example, from the point I to the point K), and overlaps the center of the cursor at the point K.

It should be noted that FIG. 6 merely uses the point A to the point K as an example for description. Actually, in a process in which the cursor moves from the point A to the point K, the sliding track includes multiple point positions, and the cursor system draws a cursor at the corresponding point position based on the received mouse sliding operation. For example, a quantity of point positions included from the point A to the point K depends on a sampling rate of the tablet computer, namely, a quantity of image frames displayed per second. For example, the sampling rate is 60 fps (in other words, 60 images are displayed per second). Duration for movement from the point A to the point K is 1 s. In this case, there are 60 point positions between the point A to the point K, and the cursor system draws cursors at the 60 point positions. The point position A to the point position K displayed in FIG. 6 are merely a schematic example. The following conforms to the same meaning, and repeated descriptions are omitted.

Figure 7:
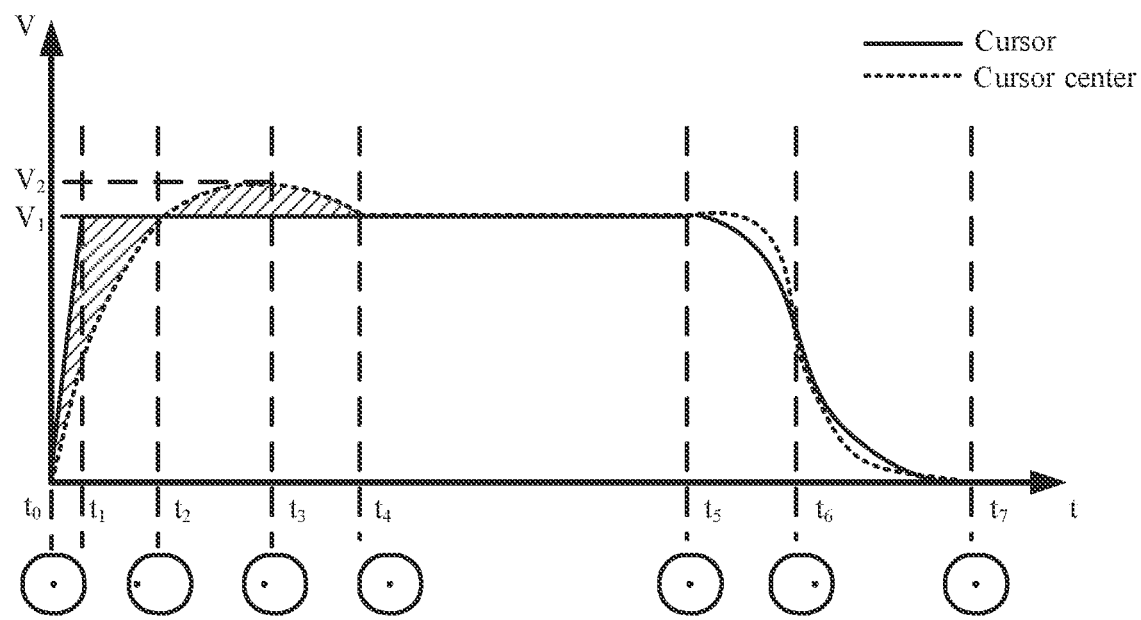
FIG. 7 is an example of a schematic diagram of a correspondence between a cursor movement status and a cursor form change.

In combination with FIG. 6, FIG. 7 is an example of a schematic diagram of a correspondence between a cursor movement status and a cursor form change. Refer to FIG. 7. For example, at a moment to, the cursor system starts to draw a cursor in response to the received mouse sliding operation. For example, as shown by a solid line in FIG. 7, the cursor accelerates from 0 to a speed V1 (at a moment t1), and uniformly moves at the speed V1.

For example, as shown by a dashed line in FIG. 7, from the moment to, a moving direction of a cursor center point is consistent with a moving direction of the cursor. The cursor center point gradually accelerates from 0 to the speed V1. For example, acceleration duration of the cursor center point is from the moment t0 to a moment t2. The moment t2 is greater than the moment t1. In other words, an acceleration of the cursor center point is less than an acceleration of the cursor. Correspondingly, because the speed of the cursor center point is less than the speed of the cursor (in other words, in FIG. 7, the dashed line is below the solid line) from the moment t0 to the moment t2, a displacement (which may also be referred to as a deviation value) between a center of the cursor and the cursor center point gradually increases, in other words, the cursor center point gradually deviates from the center of the cursor.

Still refer to FIG. 7. For example, a difference (as shown by shadows in FIG. 7) between an area enclosed by a movement curve (namely; the solid line in the figure) of the cursor and an X-axis (namely, a time axis) and an area enclosed by a movement curve (namely; the dashed line in the figure) of the cursor center point and the X-axis indicates the displacement (namely, an offset) between the center of the cursor and the cursor center point. It can be learned from FIG. 7 that from the moment t0 to the moment t2, the difference between the area enclosed by the movement curve of the cursor and the X-axis and the area enclosed by the movement curve of the cursor center point and the X-axis becomes larger. In other words, the cursor center point gradually deviates from the center of the cursor, and the offset becomes larger. For example, a direction of the displacement between the cursor center point and the center of the cursor is opposite to the moving direction of the cursor. In other words, when the cursor moves rightward, the cursor center point gradually shifts to a left side of the center of the cursor. When the cursor moves leftward, the cursor center point gradually shifts to a right side of the center of the cursor.

Figure 8:
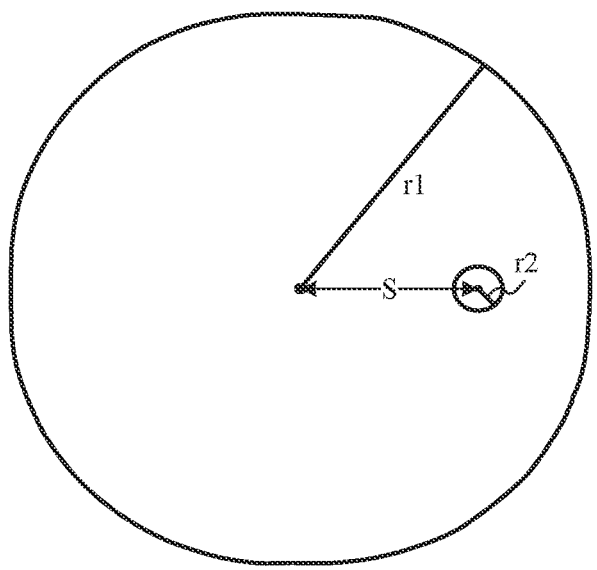
FIG. 8 is an example of a schematic diagram of an offset.

For example, refer to FIG. 8. In the embodiments of this application, the offset between the cursor center point and the center of the cursor may be represented by S. A value range of S is [0, r1−r2). r1 is a radius of the cursor, and r2 is a radius of the cursor center point. To be specific, a largest value of the offset S is smaller than a difference between the radius of the cursor and the radius of the cursor center point, to ensure that the cursor center point is always within the cursor in a cursor movement process.

Figure 9:
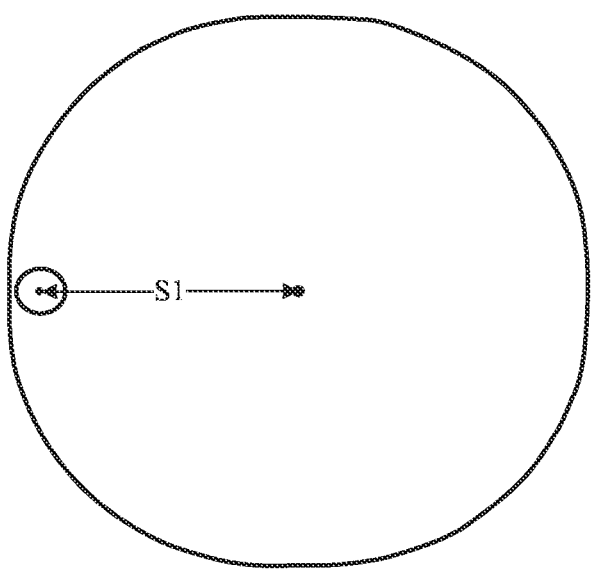
FIG. 9 is an example of a schematic diagram of an offset.

Still refer to FIG. 7. For example, at the moment t2, the speed of the cursor center point is equal to the speed of the cursor, and the offset between the cursor center point and the center of the cursor reaches the largest value. As shown in FIG. 9, for example, at the moment t2, the offset between the cursor center point and the center of the cursor reaches a largest value S1. For example, S1 is greater than 0 and less than r1−r2.

Still refer to FIG. 7. For example, the speed of the cursor center point is consistent with the speed of the cursor at the moment t2, and the cursor center point continues to accelerate to decrease the displacement (namely, the offset) from the center of the cursor. For example, from the moment t2, because the speed of the cursor center point is greater than the moving speed of the cursor, the difference between the area enclosed by the movement curve of the cursor and the X-axis and the area enclosed by the movement curve of the cursor center point and the X-axis is a negative value, in other words, mutually counteracts the area difference that is before the moment t2. This may be understood as: The offset between the cursor center and the center of the cursor gradually decreases from the moment t2. For example, at a moment t3, the offset between the cursor center point and the center of the cursor is S1, where S1 is greater than 0, and is less than S2.

For example, the cursor center starts to decelerate from the moment t3, and the speed of the cursor center is consistent with the speed of the cursor at a moment t4. Still refer to FIG. 7. For example, as described above, from the moment t2 to the moment t4, the speed of the cursor center point is greater than the moving speed of the cursor, so that the difference between the area enclosed by the movement curve of the cursor and the X-axis and the area enclosed by the movement curve of the cursor center point and the X-axis is a negative value, and may mutually counteract the difference that is between the area enclosed by the movement curve of the cursor and the X-axis and the area enclosed by the movement curve of the cursor center point and the X-axis and that is from the moment t0 to the moment t2. At the moment t4, the difference between the area enclosed by the movement curve of the cursor and the X-axis and the area enclosed by the movement curve of the cursor center point and the X-axis is completely counteracted. In other words, at the moment t4, the offset between the cursor center point and the center of the cursor is 0, and the cursor center point overlaps the center of the cursor.

It should be noted that in this embodiment of this application, the moving speed of the cursor and the moving speed of the cursor center are both schematic examples. In another embodiment, the speed and the acceleration of the cursor center point may be set based on an actual requirement when it is ensured that the value range of S is [0, r1−r2), in other words, the cursor center point is always within the cursor. An example is used for description. In another embodiment, if a speed and an acceleration of the cursor are consistent with those in FIG. 7, and an acceleration of the cursor center point from the moment to is less than the acceleration of the cursor center point shown in FIG. 7, a moment at which the speed of the cursor center point is consistent with the speed of the cursor, in other words, a moment at which the offset between the cursor center point and the center of the cursor reaches the largest value, is after the moment t2. To be specific, in this embodiment of this application, the moving speed of the cursor center is changed, so that the cursor center is shifted, to visually present the cursor dragging effect. The following conforms to the same meaning, and repeated descriptions are omitted.

Still refer to FIG. 7. For example, after the speed of the cursor center point is consistent with the speed of the center of the cursor and the position of the cursor center point overlaps a position of the center of the cursor, the cursor center point may uniformly move at the same speed as the center of the cursor. For example, from the moment t4 to a moment t5, the cursor center point overlaps the center of the cursor, and always uniformly moves at the same speed as the cursor.

Using the movement track in FIG. 5 as an example, the cursor moves to the position 502 and stops. It should be noted that the speed of the cursor gradually decreases to zero when the cursor changes from a moving state to a resting state. As shown in FIG. 7, an example in which the speed of the cursor starts to decrease at the moment t5 and becomes zero at a moment t7 is used. For example, in this embodiment of this application, in a speed decrease process of the cursor, the speed of the cursor center point also starts to decrease from the moment t5. For example, from the moment t5 to a moment t6, the speed of the cursor center point is greater than the speed of the cursor. This may be understood as: An acceleration of the cursor center point during deceleration is greater than an acceleration of the cursor. Correspondingly, because the speed of the cursor center point is greater than the speed of the cursor, so that the difference between the area enclosed by the movement curve of the cursor and the X-axis and the area enclosed by the movement curve of the cursor center point and the X-axis is less than 0. In other words, the displacement between the cursor center point and the center of the cursor gradually increases, to visually achieve an effect that the cursor center point gradually deviates from the center of the cursor. For example, in a deceleration process of the cursor, an offset direction of the cursor center point is the same as the moving direction of the cursor. For example, in a process in which the cursor moves rightward and decelerates, the cursor center point shifts to a right side of the center of the cursor. In a process in which the cursor moves leftward and decelerates, the cursor center point shifts to a left side of the cursor.

Still refer to FIG. 7. For example, at the moment t6, the speed of the cursor center point is consistent with the speed of the cursor, and an absolute value of the difference between the area enclosed by the movement curve of the cursor and the X-axis and the area enclosed by the movement curve of the cursor center point and the X-axis reaches a largest value, in other words, the offset between the cursor center point and the center of the cursor reaches the largest value. Similarly, the largest value of the offset is greater than 0 and less than r1−r2.

Optionally, in this embodiment, the offset between the cursor center point and the center of the cursor at the moment t6 is less than the offset between the cursor center point and the center of the cursor at the moment t2.

Still refer to FIG. 7. For example, from the moment t6, the speed of the cursor center point still gradually decreases, and the speed of the cursor continues to decrease. In addition, the speed of the cursor center point is less than the speed of the cursor. In other words, the difference between the area enclosed by the movement curve of the cursor and the X-axis and the area enclosed by the movement curve of the cursor center point and the X-axis is greater than 0, and mutually counteracts the area difference that is from the moment t5 to the moment t6. Correspondingly, the cursor center point gradually shifts to the center of the cursor from the moment t6. At the moment t7, the speed of the cursor and the speed of the cursor center point are consistent, for example, both decrease to 0. In this case, the cursor center point overlaps the center of the cursor.

Figure 10:
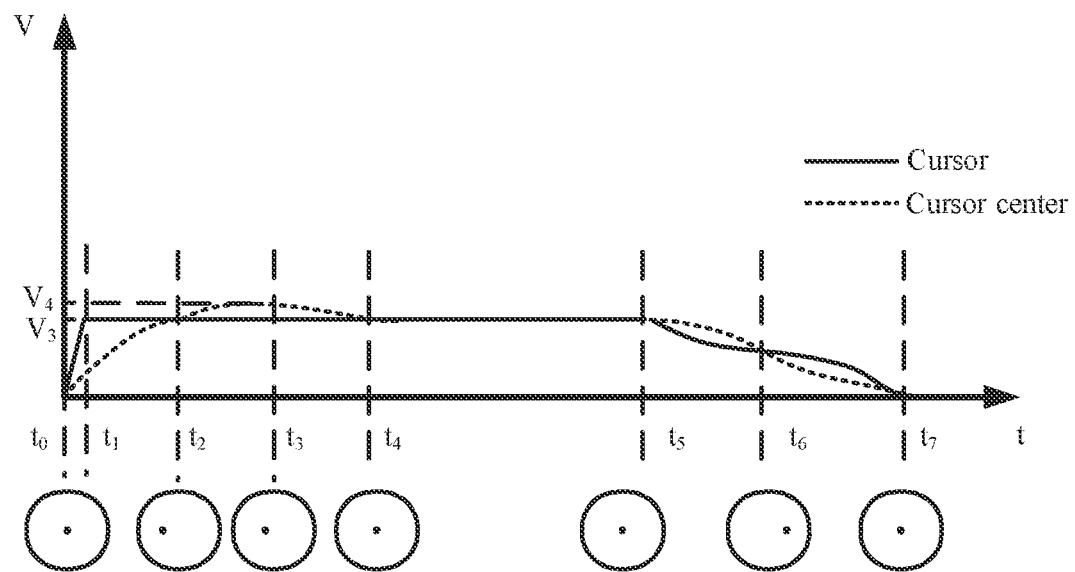
FIG. 10 is an example of a schematic diagram of a correspondence between a cursor movement status and a cursor form change.
Figure 11:
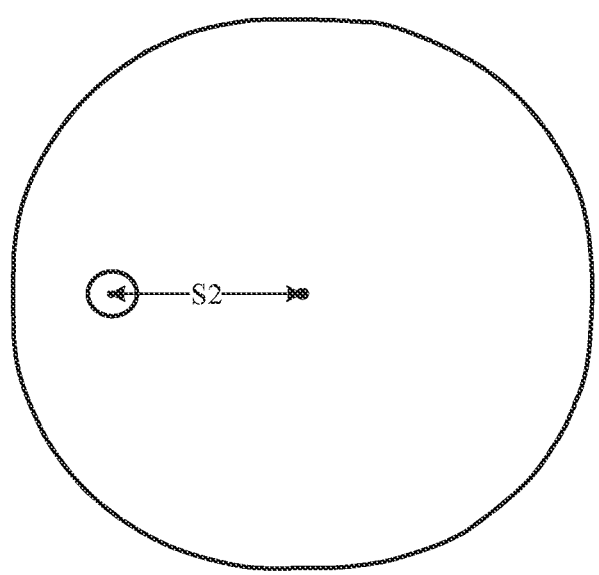
FIG. 11 is an example of a schematic diagram of an offset.

In combination with FIG. 6, FIG. 10 is an example of a schematic diagram of a correspondence between a cursor movement status and a cursor form change. Refer to FIG. 10. A difference from FIG. 7 lies in: A largest speed of a cursor is V3, where V3 is less than V1. To be specific, in a cursor movement process, a moving speed of the cursor shown in FIG. 10 is lower. Correspondingly, a moving speed of a cursor center point also becomes lower. For example, in FIG. 10, from the moment t0 to the moment t2, a difference between an area enclosed by a movement curve of the cursor and an X-axis and an area enclosed by a movement curve of the cursor center point and the X-axis is less than the difference in FIG. 7 that is between the area enclosed by the movement curve of the cursor and the X-axis and the area enclosed by the movement curve of the cursor center point and the X-axis. For example, as shown in FIG. 11, a largest value S2 of an offset of the cursor center point at the moment t2 is greater than 0 and less than S1. For other parts not described, refer to relevant descriptions in FIG. 7. Details are not described herein again.

Still refer to FIG. 10. For example, the speed of the cursor center point is consistent with the speed of the cursor at the moment t2, the cursor center point continues to accelerate, and the cursor keeps moving uniformly. In addition, the cursor center point gradually shifts to a center of the cursor from the moment t2. At a moment t4, the cursor center point overlaps the center of the cursor, and the moving speed of the cursor center point remains consistent with the moving speed of the cursor.

An example in which the speed of the cursor starts to decrease at a moment t5 and becomes zero at a moment t7 is used. For example, in this embodiment of this application, in a speed decrease process of the cursor, the speed of the cursor center point also starts to decrease from the moment t5. For example, at the moment t5 to a moment t6, the speed of the cursor center point is greater than the speed of the cursor. This may be understood as: An acceleration of the cursor center point during deceleration is greater than an acceleration of the cursor. Correspondingly, because the speed of the cursor center point is greater than the speed of the cursor, so that the difference between the area enclosed by the movement curve of the cursor and the X-axis and the area enclosed by the movement curve of the cursor center point and the X-axis is less than 0. In other words, a displacement between the cursor center point and the center of the cursor gradually increases, to visually achieve an effect that the cursor center point gradually deviates from the center of the cursor. For example, in the deceleration process of the cursor, an offset direction of the cursor center point is the same as a moving direction of the cursor. For example, in a process in which the cursor moves rightward and decelerates, the cursor center point shifts to a right side of the center of the cursor. In a process in which the cursor moves leftward and decelerates, the cursor center point shifts to a left side of the cursor.

Still refer to FIG. 10. For example, at the moment t6, the speed of the cursor center point is consistent with the speed of the cursor, and an absolute value of the difference between the area enclosed by the movement curve of the cursor and the X-axis and the area enclosed by the movement curve of the cursor center point and the X-axis reaches a largest value, in other words, the offset between the cursor center point and the center of the cursor reaches the largest value. Similarly, the largest value of the offset is greater than 0 and less than r1−r2. For example, the offset between the cursor center point and the center of the cursor at the moment t6 in FIG. 10 is optionally less than the offset between the cursor center point and the center of the cursor at the moment t6 in FIG. 7.

Still refer to FIG. 10. For example, from the moment t6, the speed of the cursor center point still gradually decreases, and the speed of the cursor continues to gradually decrease. In addition, the speed of the cursor center point is less than the speed of the cursor. In other words, the difference between the area enclosed by the movement curve of the cursor and the X-axis and the area enclosed by the movement curve of the cursor center point and the X-axis is greater than 0, and mutually counteracts the area difference that is from the moment t5 to the moment t6. Correspondingly, the cursor center point gradually shifts to the center of the cursor from the moment t6. At the moment t7, the speed of the cursor and the speed of the cursor center point are consistent, for example, both decrease to 0. In this case, the cursor center point overlaps the center of the cursor.

Figure 12:
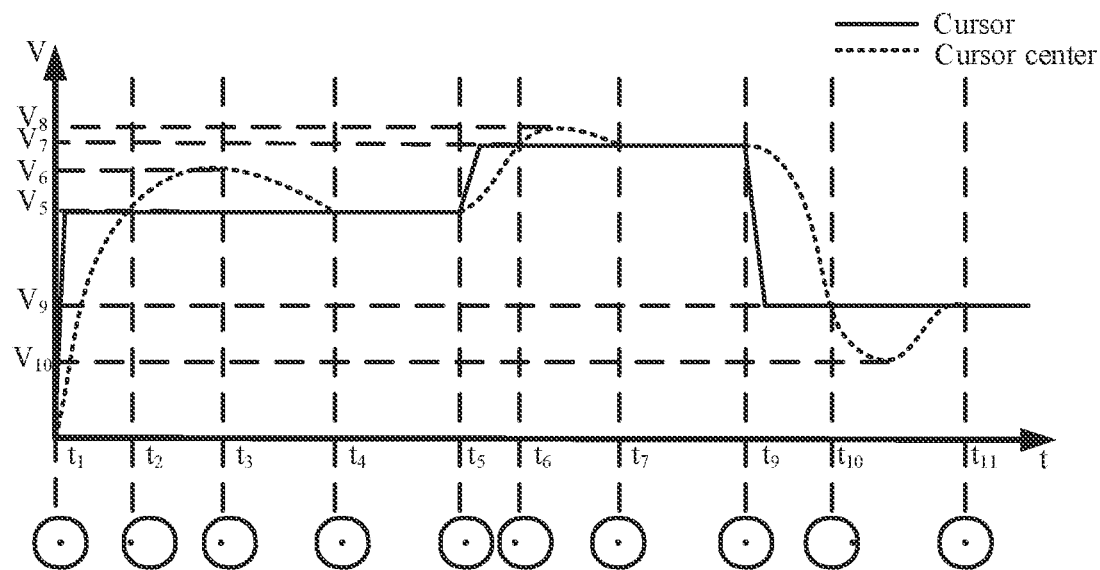
FIG. 12 is an example of a schematic diagram of a correspondence between a cursor movement status and a cursor form change.

FIG. 12 is an example of a schematic diagram of a correspondence between a cursor movement status and a cursor form change. Refer to FIG. 12. For example, a solid line in the figure represents a movement curve of a cursor, and a dashed line represents a movement curve of a cursor center. For example, the cursor system starts to draw the cursor in response to the received mouse sliding operation.

Refer to FIG. 12. For example, the cursor accelerates from 0 at a moment t1 to a speed V5, and keeps moving uniformly at the speed V5. The cursor center starts to accelerate from the moment t1, and a moving speed of the cursor center is the same as a moving speed of the cursor at a moment t2. From the moment t1 to the moment t2, the moving speed of the cursor center is less than the moving speed of the cursor. In other words, a difference between an area enclosed by the movement curve of the cursor and an X-axis and an area enclosed by the movement curve of the cursor center point and the X-axis becomes larger. The cursor center point gradually shifts from the center of the cursor along an opposite direction of a moving direction of the cursor. At the moment t2, the moving speed of the cursor center point is the same as the moving speed of the cursor, the difference between the area enclosed by the movement curve of the cursor and the X-axis and the area enclosed by the movement curve of the cursor center point and the X-axis reaches a largest value, and an offset between the cursor center point and the center of the cursor also reaches a largest value. The largest value of the offset at the moment t2 is greater than 0) and less than r1−r2.

Still refer to FIG. 12. For example, after the speed of the cursor center point reaches V5, in other words, is the same as the speed of the cursor, the cursor center point continues to accelerate to decrease a displacement between the cursor center point and the center of the cursor. For example, the cursor center point accelerates to V6 and gradually decreases until the speed of the cursor center point is the same as the speed of the cursor. From the moment t2 to a moment t4, the offset between the cursor center point and the center of the cursor gradually decreases, in other words, the cursor center point gradually shifts to the center of the cursor from a shifted position that is at the moment t2.

For example, the speed of the cursor center point is the same as the speed of the cursor at the moment t4. At this moment, the cursor center point overlaps the center of the cursor. The cursor center point uniformly moves at the same speed as the cursor.

Still refer to FIG. 12. For example, at a moment t5, the cursor accelerates again to a speed V7, and keeps moving uniformly at the speed V7. For example, the cursor center point also accelerates again, where an acceleration of the cursor center point is less than an acceleration of the cursor, in other words, the speed of the cursor center point is less than the speed of the cursor. In other words, the difference between the area enclosed by the movement curve of the cursor and the X-axis and the area enclosed by the movement curve of the cursor center point and the X-axis becomes larger. The cursor center point gradually shifts from the center of the cursor along the opposite direction of the moving direction of the cursor. At a moment t6, the speed of the cursor center is the same as the speed of the cursor, the difference between the area enclosed by the movement curve of the cursor and the X-axis and the area enclosed by the movement curve of the cursor center point and the X-axis reaches a largest value, and the offset between the cursor center point and the center of the cursor also reaches a largest value. The largest value of the offset at the moment t6 is greater than 0 and less than r1−r2. Optionally, the largest value of the offset at the moment t6 is smaller than the offset at the moment t2.

Still refer to FIG. 12. For example, after the speed of the cursor center point reaches V7, in other words, is the same as the speed of the cursor, the cursor center point continues to accelerate to decrease the displacement between the cursor center point and the center of the cursor. For example, the cursor center point accelerates to V7 and gradually decreases until the speed of the cursor center point is the same as the speed of the cursor. From the moment t6 to a moment t7, the offset between the cursor center point and the center of the cursor gradually decreases, in other words, the cursor center point gradually shifts to the center of the cursor from a shifted position that is at the moment t6.

For example, the speed of the cursor center point is the same as the speed of the cursor at the moment t7. At this moment, the cursor center point overlaps the center of the cursor. The cursor center point uniformly moves at the same speed as the cursor.

Still refer to FIG. 12. For example, the cursor starts to decelerate at a moment t9, and keeps moving uniformly after the speed is decreased to V9. For example, the cursor center point also starts to decelerate from the moment t9, and the speed of the cursor center point is greater than the speed of the cursor. In other words, the difference between the area enclosed by the movement curve of the cursor and the X-axis and the area enclosed by the movement curve of the cursor center point and the X-axis is a negative value. A displacement of the cursor center point at any moment from t9 to t10 is greater than a displacement of the cursor, in other words, the cursor center point gradually shifts from the center of the cursor along the moving direction of the cursor.

At a moment t10, the speed of the cursor center point is consistent with the speed of the cursor. In this case, an absolute value of the difference between the area enclosed by the movement curve of the cursor and the X-axis and the area enclosed by the movement curve of the cursor center point and the X-axis reaches a largest value. In other words, the offset between the cursor center point and the center of the cursor reaches a largest value. Optionally, the largest value of the offset at the moment t10 is greater than the largest value of the offset at the moment t2 and less than r1−r2.

Still refer to FIG. 12. For example, the cursor center continues to decelerate after the speed of the cursor center is consistent with the speed of the cursor at the moment t10, and accelerates after accelerating to a speed V10. From the moment t10 to a moment t11, the difference between the area enclosed by the movement curve of the cursor and the X-axis and the area enclosed by the movement curve of the cursor center point and the X-axis is a positive value, and mutually counteracts the area difference that is from the moment t9 to the moment t10. Correspondingly, the displacement between the cursor center and the center of the cursor gradually decreases, and the cursor center gradually shifts to the center of the cursor. The speed of the cursor center is consistent with the speed of the cursor at the moment t11, and the cursor center overlaps the center of the cursor. The cursor center keeps overlapping the center of the cursor and moves at the same speed as the center of the cursor.

Figure 13A:
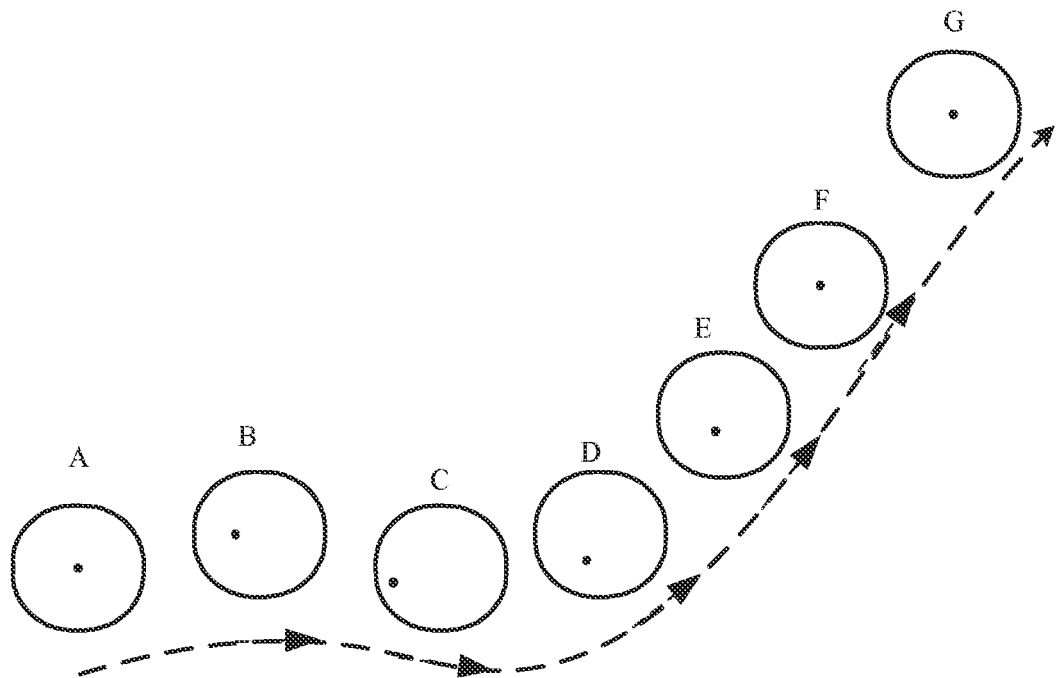
FIG. 13a is an example of a schematic diagram of a shifting direction of a cursor center point and a moving direction of a cursor.
Figure 13B:
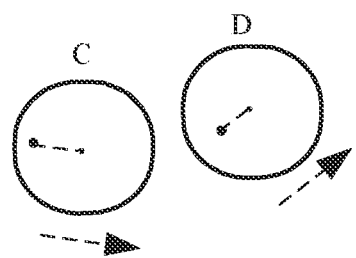
FIG. 13b is an example of a schematic diagram of a shifting direction of a cursor center point and a moving direction of a cursor.

In a possible implementation, in a process in which the cursor accelerates and keeps moving uniformly, a direction along which the cursor center point shifts relative to the center of the cursor is opposite to the moving direction of the cursor. In a process in which the cursor decelerates and keeps moving uniformly or the cursor decelerates and becomes resting, a direction along which the cursor center point shifts relative to the center of the cursor is the same as the moving direction of the cursor. FIG. 13a is an example of a schematic diagram of the shifting direction of the cursor center point and the moving direction of the cursor. Refer to FIG. 13a. For example, the cursor starts to accelerate from a point A, and keeps moving uniformly: Correspondingly, the cursor center point gradually shifts from the center of the cursor along an opposite direction of the moving direction of the cursor. As shown in FIG. 13b, a point C and a point D in FIG. 13a are used as an example. For example, at the point C, an offset between the cursor center point and the center of the cursor reaches a largest value. At the point C, the moving direction of the cursor is shown in FIG. 13b.

Correspondingly, the direction along which the cursor center point shifts relative to the center of the cursor is opposite to the moving direction of the cursor. Using the point D as another example, in a process in which the cursor center point gradually shifts to the center of the cursor, the shifting direction of the cursor center point is opposite to the moving direction of the cursor at the point D.

Figure 14:
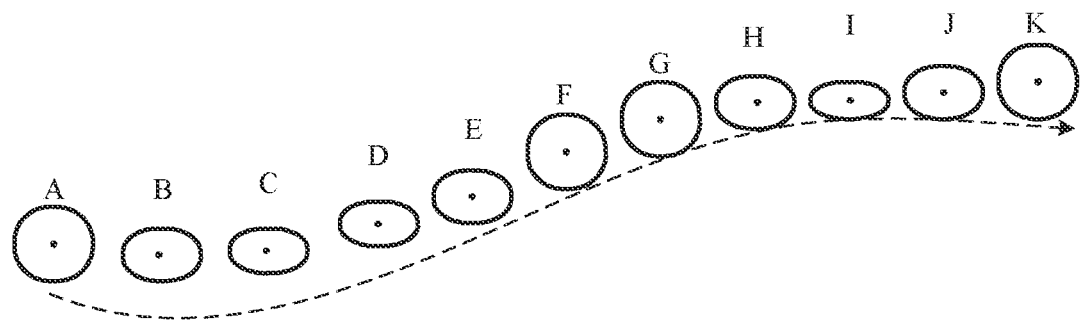
FIG. 14 is an example of a schematic diagram of a cursor form change.

In another possible implementation, movement of the cursor center point in this embodiment of this application may be based on only a moving speed of the cursor. An example is used for description. A correspondence between the moving speed and both the moving direction and the offset of the cursor center point may be set in the electronic device. For example, in an accelerated movement process of the cursor, the cursor center point gradually deviates from the center of the cursor. When the speed of the cursor reaches v11 (which may be set based on an actual requirement), the cursor center point may gradually shift to the center of the cursor. In a decelerated movement process of the cursor, the cursor center point gradually deviates from the center of the cursor. When the speed of the cursor reaches v12 (which may be set based on an actual requirement), the cursor center point may gradually shift to the center of the cursor. For the shifting direction, refer to the foregoing. Details are not described herein again. This solution is also applicable to a cursor form change manner in FIG. 14 and FIG. 16. Details are not repeated below:

In still another possible implementation, the position of the cursor center point in this embodiment of this application may change based on the movement status of the cursor. For example, during accelerated movement of the cursor, the cursor center point gradually shifts along the opposite direction of the moving direction, where a shifting speed of the cursor center point may be set based on an actual requirement. This is not limited in this application. Optionally, if the cursor still accelerates when the cursor has shifted to the farthest shifted position, the cursor center point may stay at the farthest shifted position and move with the cursor. For example, if the cursor changes from accelerated movement to uniform movement, the cursor center point may gradually shift to the center of the cursor. Correspondingly, when the cursor decelerates, the cursor gradually shifts along the moving direction. Details are similar to those for the accelerated movement, and are not described herein again. This solution is also applicable to the cursor form change manner in FIG. 14 and FIG. 16. Details are not repeated below:

FIG. 14 is an example of another schematic diagram of a cursor form change. Refer to FIG. 14. For example, in this embodiment of this application, in a cursor drawing process, the cursor system may alternatively change the shape of the cursor, to achieve the cursor dragging effect, where the shape of the cursor may also be understood as an outer shape of the cursor. The movement track shown in FIG. 5 is used as an example. In FIG. 14, the cursor system moves the cursor from a point A to a point K based on the sliding track of the mouse. For example, when the cursor is at the point A, the shape of the cursor center is a rounded rectangle, for example, the shape shown in (1) in FIG. 4c.

For example, in a process in which the cursor system moves the cursor to the point K, the shape of the cursor gradually becomes flat, for example, from the point A to a point C. Subsequently; the cursor gradually recovers to the original shape from a flat shape, for example, from the point C to a point F. The cursor moves in the original shape. In a process in which the cursor gradually decelerates after moving to a point G, the shape of the cursor gradually becomes flat, for example, from the point G to a point I.

Next, the cursor gradually recovers to the original shape, for example, from the point I to the point K. In other words, in this embodiment of this application, the cursor system may adjust flatness of the cursor in a cursor movement process, to achieve a dynamic cursor movement effect. For example, the flatness of the cursor (which may also be referred to as a flatness ratio, a flatness rate, a flatness degree, or the like of the cursor) is optionally a percentage of a height of the cursor to a largest width of the cursor. For example, larger flatness of the cursor indicates that the cursor is flatter. Smaller flatness of the cursor indicates that the cursor is rounder. In other words, when the flatness of the cursor is 0, the cursor is in the original shape.

Figure 15:
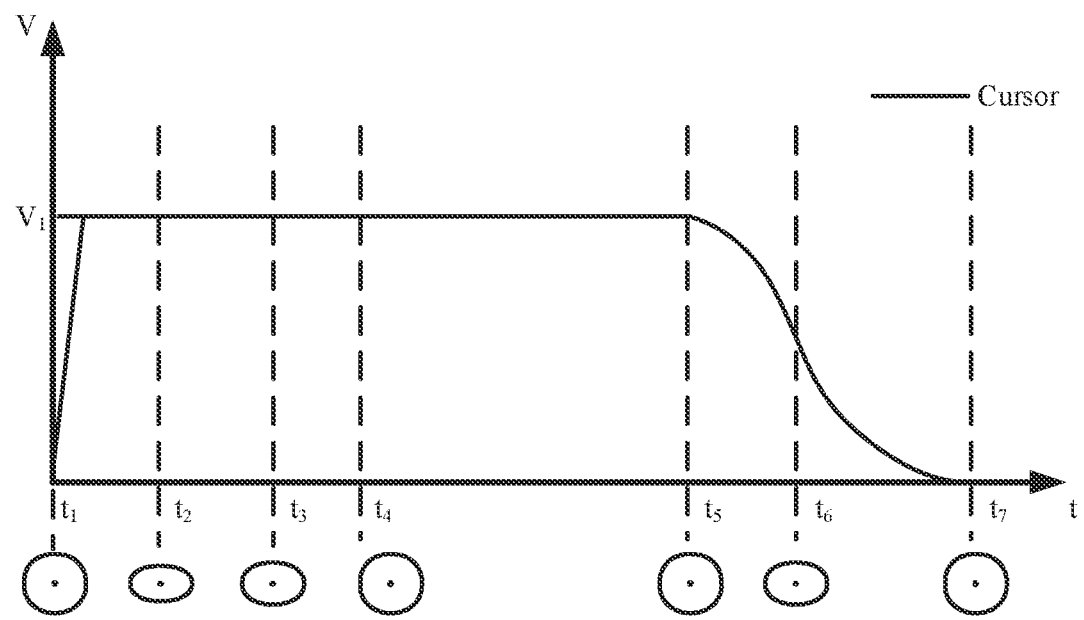
FIG. 15 is an example of a schematic diagram of a correspondence between a cursor movement status and a cursor form change.

In combination with FIG. 14, FIG. 15 is an example of a schematic diagram of a correspondence between a cursor movement status and a cursor form change. Refer to FIG. 15. For example, a solid line in the figure represents a movement curve of the cursor, and a dashed line represents a movement curve of the cursor center. For example, the cursor system starts to draw the cursor in response to the received mouse sliding operation.

For example, a form change degree of the cursor may change with the movement status of the cursor. Refer to FIG. 15. For example, the cursor accelerates from 0 at a moment t1 to a speed V1, and keeps moving uniformly at the speed V1. The cursor starts to gradually become flat from the moment t1, and becomes the flattest at a moment t2. For example, from the moment t2, the cursor gradually recovers to the original shape. For example, a flatness degree (which may also be referred to as flatness) of the cursor at a moment t3 is less than a flatness degree of the cursor at the moment t2. The cursor recovers to the original shape at a moment t4. For example, the cursor starts to decelerate at a moment t5. Correspondingly, the cursor gradually becomes flat. For example, the cursor becomes the flattest at a moment t6. Optionally, a flatness degree at the moment t6 is less than the flatness degree at the moment t2. Next, the cursor gradually recovers to the original shape from the moment t6. For example, the cursor recovers to the original shape at a moment t7.

It should be noted that the flatness degree of the cursor may be drawn based on a speed change of the cursor and an actual case. This is not limited in this application.

It should be further noted that, in this embodiment of this application, only the flatness of the cursor is used as an example for description. In another embodiment, another form may alternatively be used to achieve the cursor dragging effect. For example, in a cursor movement process, the cursor may be changed into a drop shape or an arrow shape. This is not limited in this application.

Figure 16:
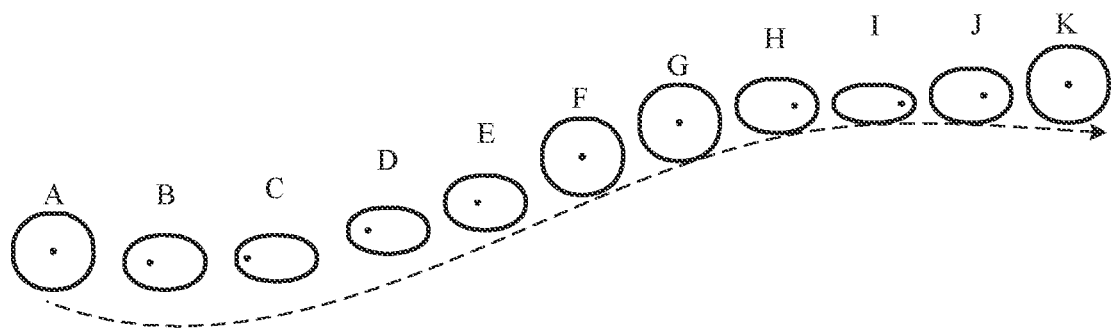
FIG. 16 is an example of a schematic diagram of a cursor form change.

FIG. 16 is an example of still another schematic diagram of a cursor form change. In this embodiment of this application, the cursor system may alternatively change the position of the cursor center in the cursor and the shape of the cursor in a cursor drawing process, to achieve the cursor dragging effect. Refer to FIG. 16. For example, when the cursor is at a point A, the cursor center point is at the center of the cursor, and the shape of the cursor is a rounded rectangle, for example, the shape shown in (1) in FIG. 4c.

For example, in a process in which the cursor system moves the cursor to the point K, the cursor center point gradually deviates from the center of the cursor, and the cursor gradually becomes flatter, for example, from the point A to a point C. Subsequently; the cursor center point gradually shifts to the center of the cursor, and the cursor gradually recovers to the original shape, for example, from the point C to a point F. In a deceleration process of the cursor, the cursor center point gradually deviates from the center of the cursor again, and the shape of the cursor gradually becomes flatter, for example, from a point G to a point I. In addition, the cursor gradually shifts to the center of the cursor from a farthest shifted position, and the cursor gradually recovers to the original shape, for example, from the point I to the point K.

Figure 17:
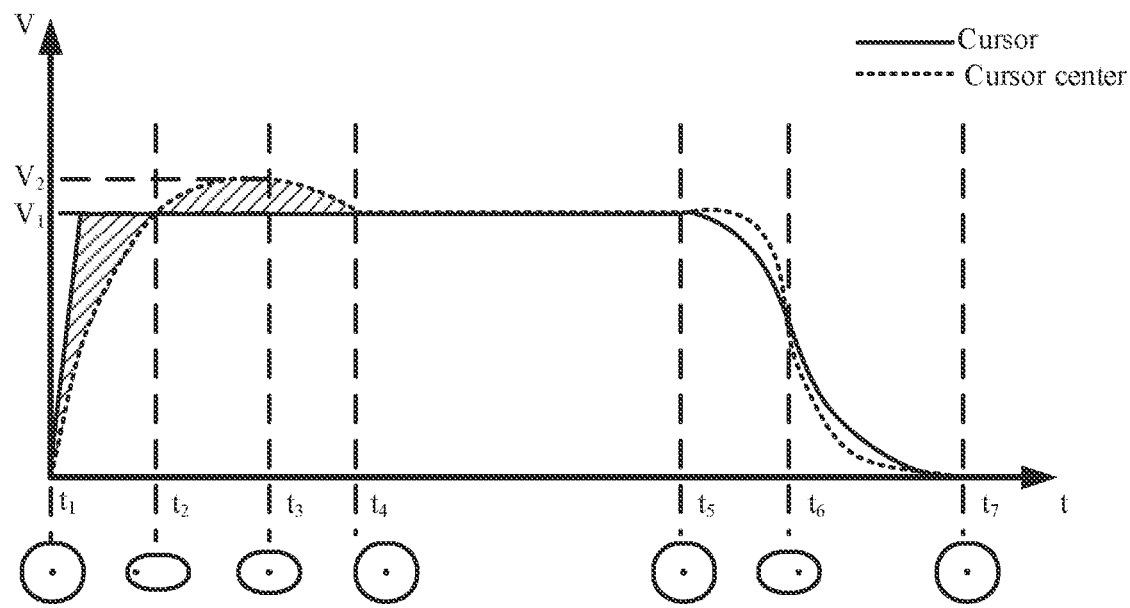
FIG. 17 is an example of a schematic diagram of a correspondence between a cursor movement status and a cursor form change.

In combination with FIG. 16, FIG. 17 is an example of a schematic diagram of a correspondence between a cursor movement status and a cursor form change. Refer to FIG. 17. For example, a solid line in the figure represents a movement curve of the cursor, and a dashed line represents a movement curve of the cursor center. For example, the cursor system starts to draw the cursor in response to the received mouse sliding operation.

Refer to FIG. 17. For example, the cursor accelerates from 0 at a moment t1 to a speed V1, and keeps moving uniformly at the speed V1. The cursor center starts to accelerate from the moment t1, and a moving speed of the cursor center is the same as a moving speed of the cursor at a moment t2. From the moment t1 to the moment t2, the moving speed of the cursor center is less than the moving speed of the cursor. In other words, a difference between an area enclosed by the movement curve of the cursor and an X-axis and an area enclosed by the movement curve of the cursor center point and the X-axis becomes larger. The cursor center point gradually shifts from the center of the cursor along an opposite direction of a moving direction of the cursor. From the moment t1 to the moment t2, the shape of the cursor gradually becomes flat while the cursor center point shifts. At the moment t2, the moving speed of the cursor center point is the same as the moving speed of the cursor, the difference between the area enclosed by the movement curve of the cursor and the X-axis and the area enclosed by the movement curve of the cursor center point and the X-axis reaches a largest value, and an offset between the cursor center point and the center of the cursor also reaches a largest value. The largest value of the offset at the moment t2 is greater than 0 and less than r1−r2. In addition, at the moment t2, the shape of the cursor is the flattest.

Still refer to FIG. 12. For example, after the speed of the cursor center point reaches V1 at the moment t2, in other words, is the same as the speed of the cursor, the cursor center point continues to accelerate to decrease a displacement between the cursor center point and the center of the cursor. In addition, the cursor gradually recovers to the original shape from the moment t2. For example, the cursor center point accelerates to V2 and gradually decreases until the speed of the cursor center point is the same as the speed of the cursor. From the moment t2 to a moment t4, the offset between the cursor center point and the center of the cursor gradually decreases, in other words, the cursor center point gradually shifts to the center of the cursor from a shifted position that is at the moment t2. In addition, the cursor gradually recovers to the original shape from the moment t2 to the moment t4.

For example, the speed of the cursor center point is the same as the speed of the cursor at the moment t4. At this moment, the cursor center point overlaps the center of the cursor. The cursor center point and the cursor uniformly move at the same speed. In addition, at the moment t2, the cursor recovers to the original shape, in other words, recovers to the rounded rectangle.

Still refer to FIG. 17. For example, at a moment t5, the cursor starts to decelerate until the cursor becomes resting (in other words, the speed becomes 0). For example, the cursor center point also starts to decelerate from the moment t5, and the speed of the cursor center point is greater than the speed of the cursor. In other words, the difference between the area enclosed by the movement curve of the cursor and the X-axis and the area enclosed by the movement curve of the cursor center point and the X-axis is a negative value. A displacement of the cursor center point at any moment from t5 to t6 is greater than a displacement of the cursor, in other words, the cursor center point gradually shifts from the center of the cursor along the moving direction of the cursor. For example, from the moment t5 to the moment t6, the cursor gradually becomes flatter while the cursor center point gradually shifts.

At the moment t6, the speed of the cursor center point is consistent with the speed of the cursor. In this case, an absolute value of the difference between the area enclosed by the movement curve of the cursor and the X-axis and the area enclosed by the movement curve of the cursor center point and the X-axis reaches a largest value. In other words, the offset between the cursor center point and the center of the cursor reaches a largest value. Optionally, the largest value of the offset at the moment t6 is smaller than the largest value of the offset at the moment t2. In addition, at the moment t6, the shape of the cursor is the flattest. Optionally, a flatness degree at the moment t6 is less than a flatness degree at the moment t2.

Still refer to FIG. 17. For example, the cursor center continues to decelerate after the speed of the cursor center is consistent with the speed of the cursor at the moment t6. From the moment t6 to a moment t7, the difference between the area enclosed by the movement curve of the cursor and the X-axis and the area enclosed by the movement curve of the cursor center point and the X-axis is a positive value, and mutually counteracts the area difference that is from the moment t6 to the moment t7. Correspondingly, the displacement between the cursor center and the center of the cursor gradually decreases, and the cursor center gradually shifts to the center of the cursor. The speed of the cursor center and the speed of the cursor are consistent at the moment t7, for example, are both 0, and the cursor center overlaps the center of the cursor. In addition, the cursor gradually recovers to the original shape from the moment t6 to the moment t7, and recovers to the original shape at the moment t7.

It may be understood that in this embodiment of this application, the form change degree of the cursor corresponds to the offset of the cursor center point. For example, a larger offset between the cursor center point and the center of the cursor indicates a larger form change degree of the cursor, and a smaller offset between the cursor center point and the center of the cursor indicates a smaller form change degree of the cursor.

Figure 18:
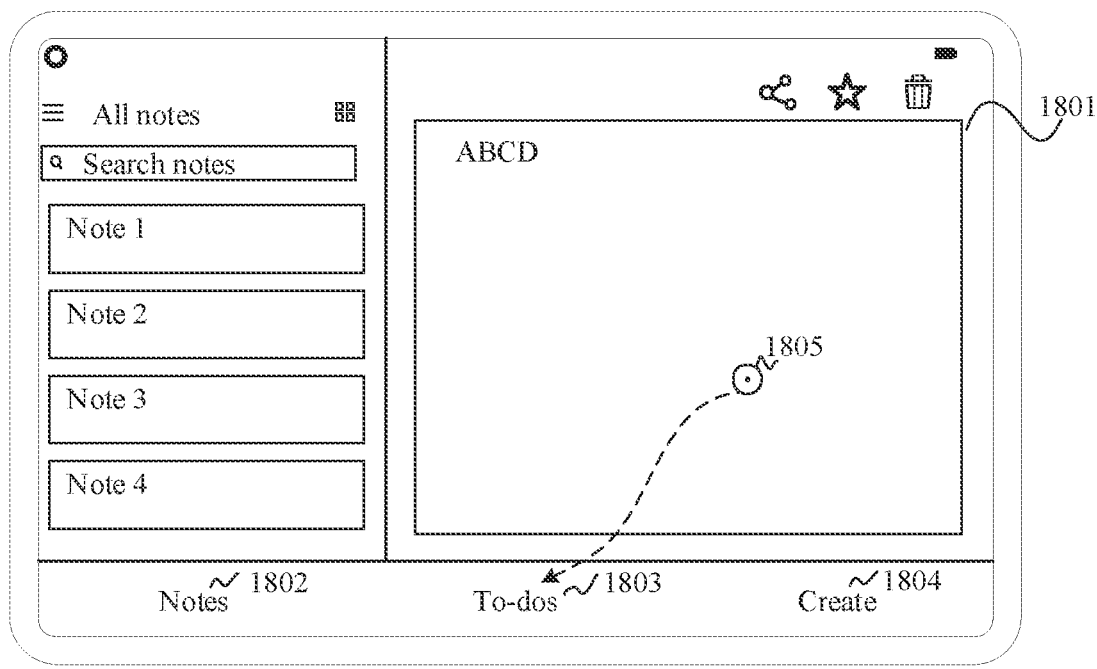
FIG. 18 is an example of a schematic diagram of cursor displaying.

With reference to specific scenarios, the following describes the cursor display manner in the embodiments of this application. FIG. 18 is an example of a schematic diagram of cursor displaying. Refer to FIG. 18. For example, a display interface 1801 of a tablet computer includes one or more controls, including but not limited to: a bottom navigation control, a top navigation control, a sidebar control, and the like. For example, the bottom navigation control includes but is not limited to: a Notes control 1802, a To-dos control 1803, and a Create control 1804. It should be noted that a quantity of controls and types of the controls in this embodiment of this application are merely schematic examples. This is not limited in this application.

With reference to the application scenario shown in FIG. 1, in this embodiment of this application, the tablet computer is connected to (in a communication connection) the mouse, and a cursor 1805 may be displayed on the display interface 1801 of the tablet computer. The tablet computer may receive, through a Bluetooth connection to the mouse, a control signal sent by the mouse, to display the cursor 1805 at a corresponding position of the display interface 1801 based on the control signal, and control the cursor 1805 to move with the mouse. For example, in this embodiment of this application, the tablet computer moves the mouse on the display interface 1801 in response to the received control signal of the mouse. A sliding track of the mouse is shown by a dashed line in FIG. 18. For example, with the mouse, the cursor 1805 moves to the To-dos control 1803 based on the sliding track shown by the dashed line.

For example, in this embodiment of this application, each control on the display interface includes a hotspot. When the cursor moves to the hotspot of the control, a view system starts to draw the cursor in the hotspot of the control to achieve a snapping effect, so that a user precisely controls the control based on the snapping effect between the cursor and the control.

Figure 19:
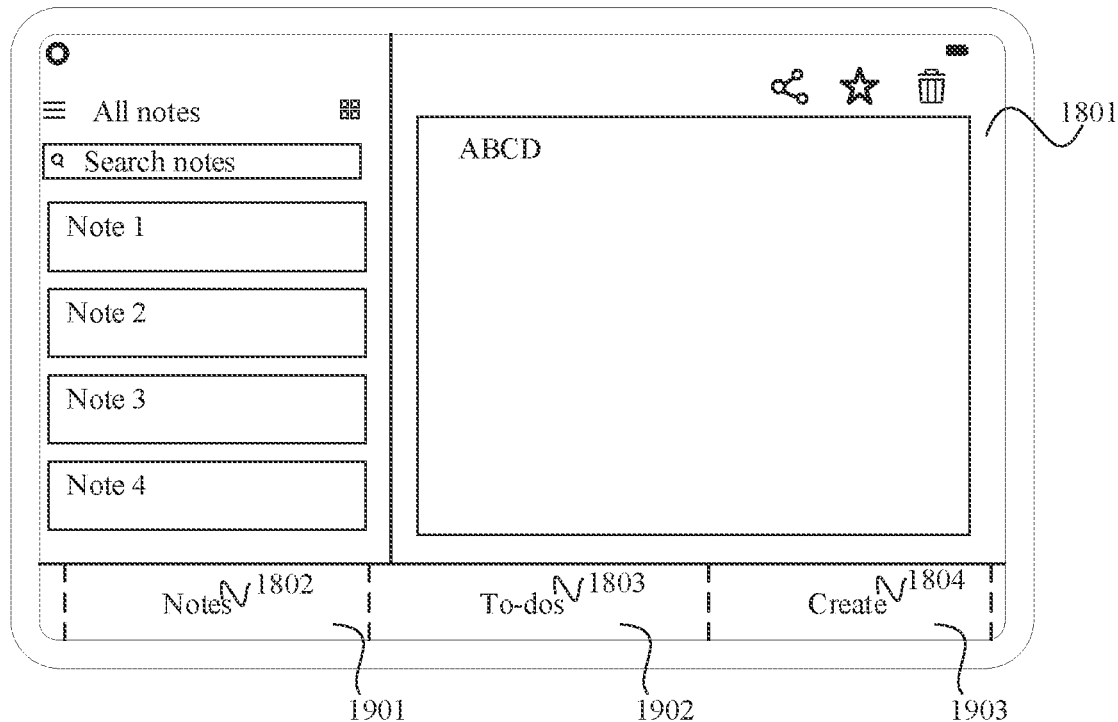
FIG. 19 is an example of a schematic diagram of a hotspot of a control.

FIG. 19 is an example of a schematic diagram of a hotspot of a control. Refer to FIG. 19. For example, the display interface 401 includes a hotspot 1901 of the Notes control 1802, a hotspot 1902 of the To-dos control 1803, and a hotspot 1903 of the Create control 1804.

It should be noted that in this embodiment, only the hotspots of the foregoing controls are used as an example for description. A drawing manner of the cursor in the hotspot in this embodiment of this application may be applied to any control on the interface. Repeated descriptions are omitted in this application.

It should be further noted that, a size and a position of the hotspot shown in FIG. 19 are only a schematic example, and are not limited in this application.

It should be further noted that, shapes and sizes of the hotspots of the controls on the display interface may be the same or different. This is not limited in this application.

It should be further noted that, the concept of the hotspot is merely schematically described in this embodiment of this application. Actually, the hotspot is invisible from a user perspective.

It should be noted that accompanying drawings of the following embodiments merely show the tablet computer, and do not show the mouse connected to the tablet computer. Actually, in the following embodiments, the user may control the cursor by using the mouse connected to the tablet computer.

In this embodiment of this application, descriptions are provided by using an example in which the user controls the mouse to move so that the cursor 1805 moves from the position shown in FIG. 18 to the hotspot of the To-dos control 1803.

For example, with reference to the embodiments shown in FIG. 6 to FIG. 17, in a process in which the cursor moves from a resting state to the hotspot 1902 of the To-dos control, the cursor system changes the form of the cursor as the cursor moves. In the following embodiments, descriptions are provided by using the form change manner in which the cursor center point shifts and the shape of the cursor changes as an example.

Figure 20A:
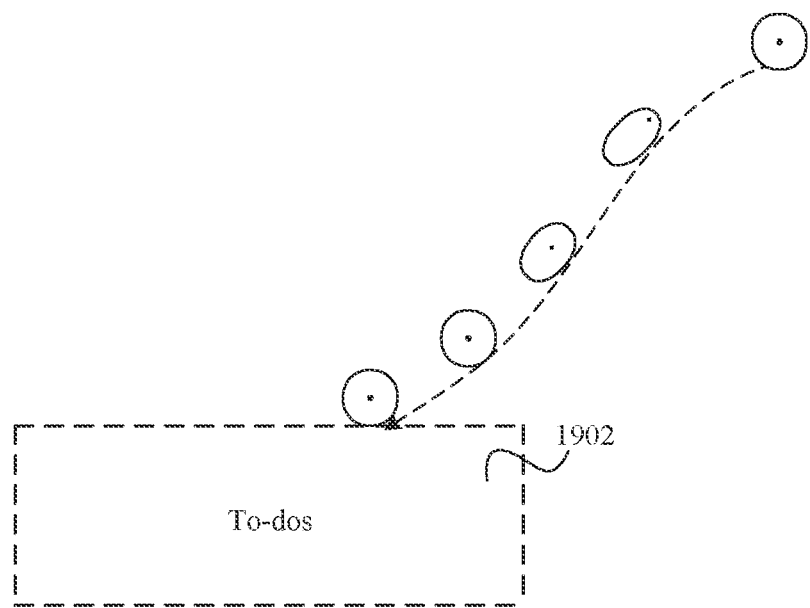
FIG. 20a is an example of a schematic diagram of cursor displaying.

In an example, before the cursor moves to the hotspot 1902 of the To-dos control, the cursor may have recovered to the original shape. As shown in FIG. 20a, in a process in which the cursor moves to the hotspot 1902 of the To-dos control, the cursor center gradually shifts from the center of the cursor, and the cursor gradually becomes flat. Subsequently, after shifting to a farthest shifted position, the cursor center gradually shifts to the center of the cursor. In addition, the cursor gradually recovers to the original shape. In other words, as shown in FIG. 20a, before the cursor moves to the hotspot 1902 of the To-dos control, the cursor center point has overlapped the center of the cursor, and the cursor has recovered to the original shape (for example, the rounded rectangle).

Figure 20B:
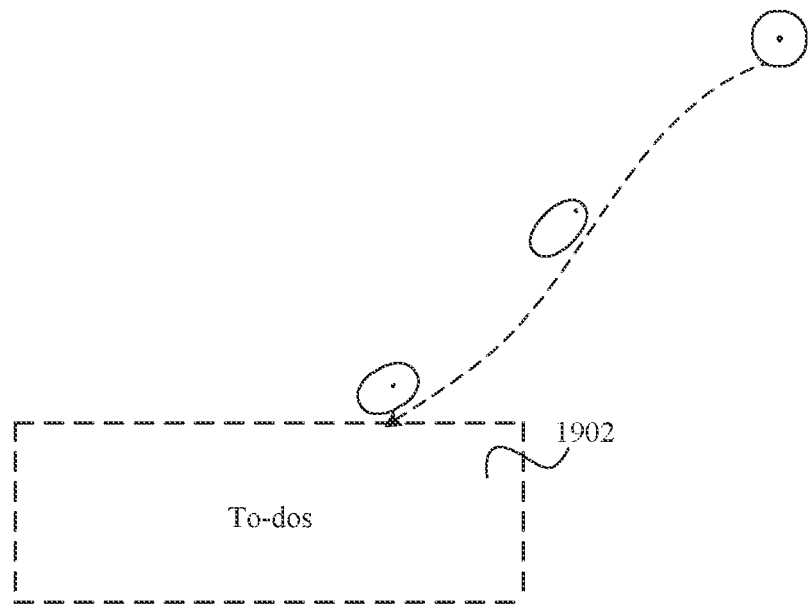
FIG. 20b is an example of a schematic diagram of cursor displaying.

In another example, before the cursor moves to the hotspot 1902 of the To-dos control, the cursor may be still in a form changed state. An example is used for description. As shown in FIG. 20b, for example, the cursor starts to move from the resting state. In a process in which the cursor moves to the hotspot 1902 of the To-dos control, the cursor center gradually shifts from the center of the cursor, and the cursor gradually becomes flat. Subsequently; the cursor center gradually shifts to the center of the cursor, and the cursor gradually recovers to the original shape. Before the cursor moves to the hotspot 1902 of the To-dos control, the cursor center point is still deviated from the center of the cursor, in other words, the cursor center point has not overlapped the center of the cursor, and the cursor has not recovered to the original shape, in other words, the cursor still remains in a flat state.

Figure 21A:
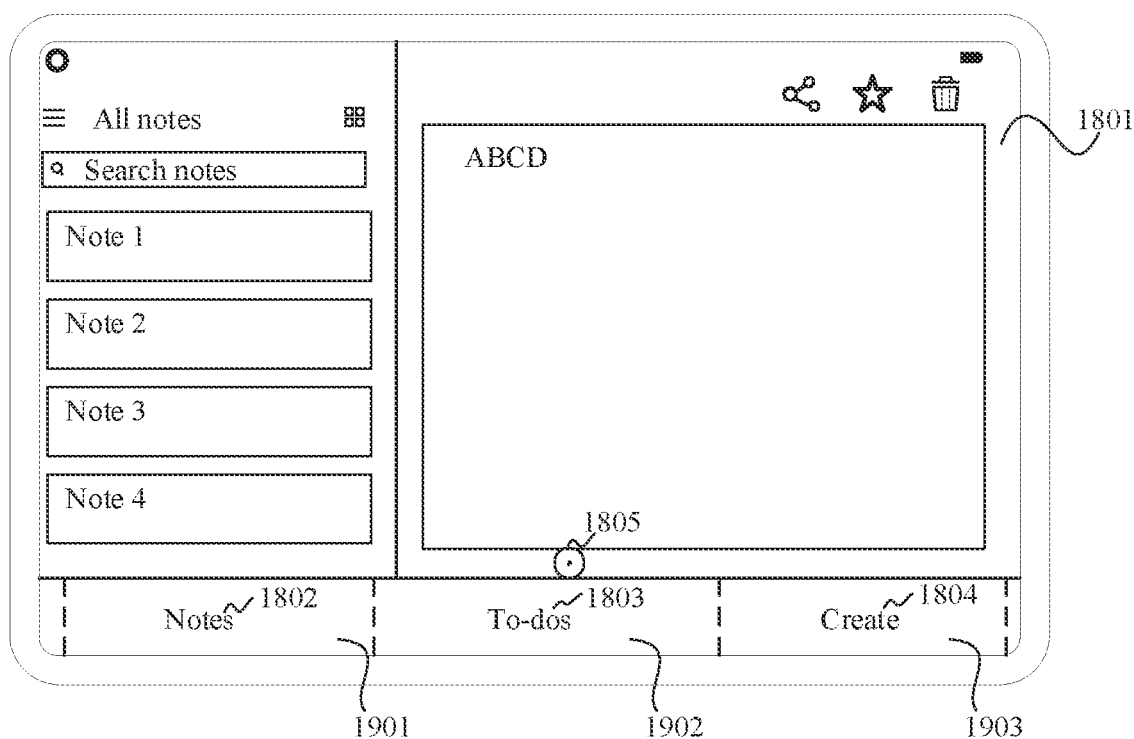
FIG. 21a is an example of a schematic diagram of cursor displaying.

The following provides descriptions with reference to the state of the cursor shown in FIG. 20a, to be specific, by using the example in which the cursor may have recovered to the original shape before the cursor moves to the hotspot 1902 of the To-dos control. Refer to FIG. 21a. For example, the cursor 1805 keeps the original shape and moves to an edge of the hotspot 1902 of the To-dos control.

Figure 21B:
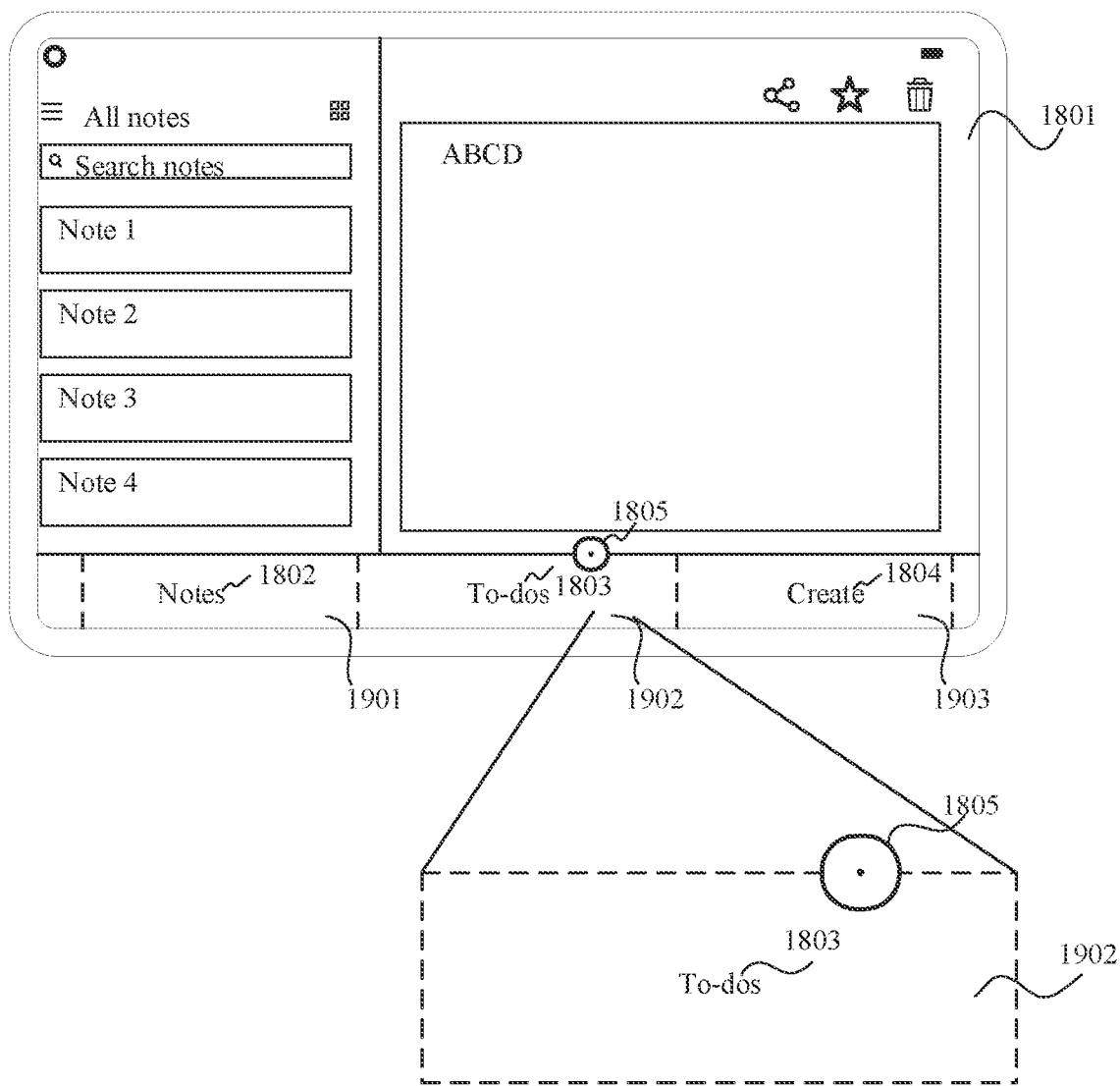
FIG. 21b is an example of a schematic diagram of cursor displaying.
Figure 21C:
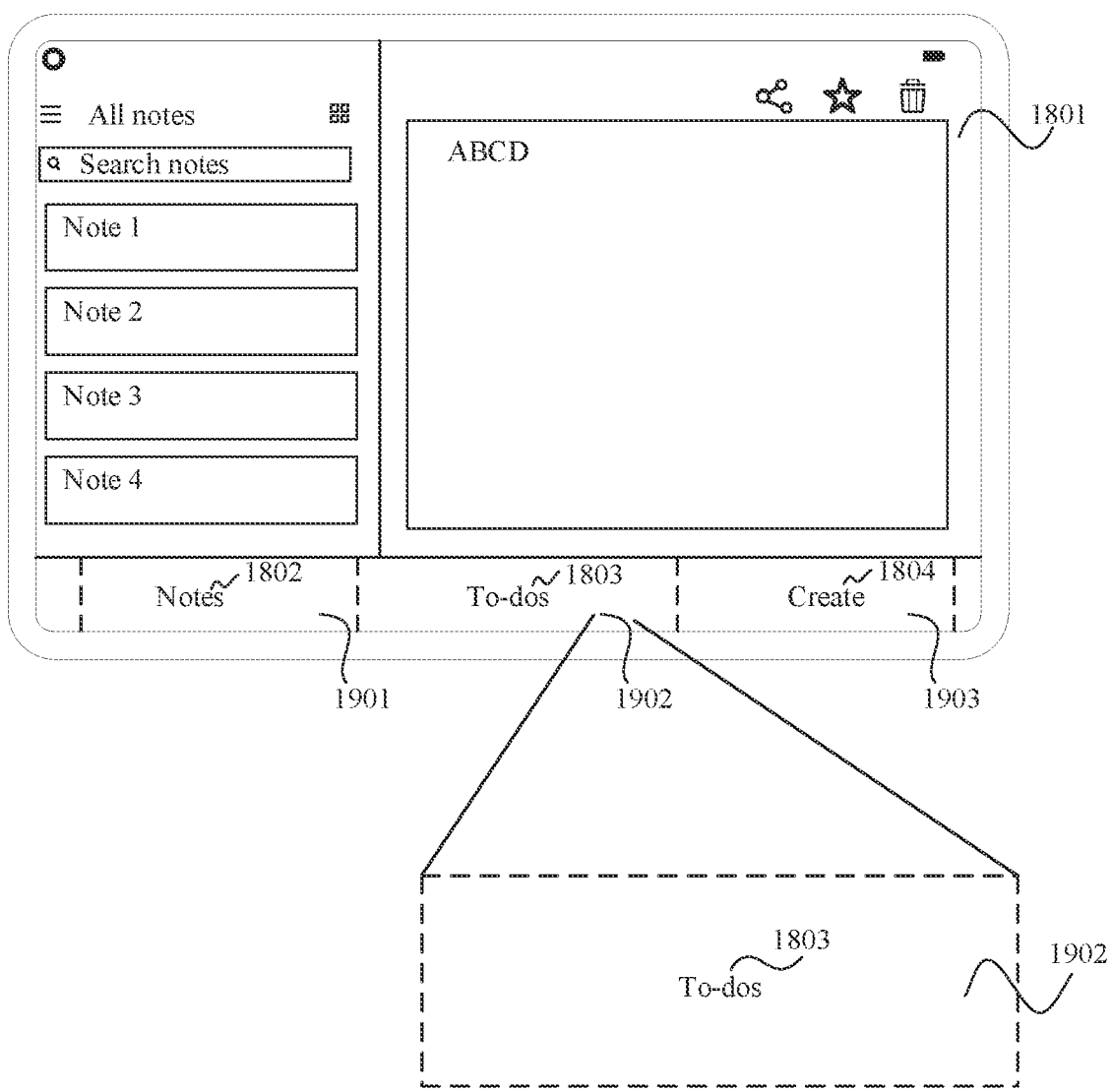
FIG. 21c is an example of a schematic diagram of cursor displaying.
Figure 21D:
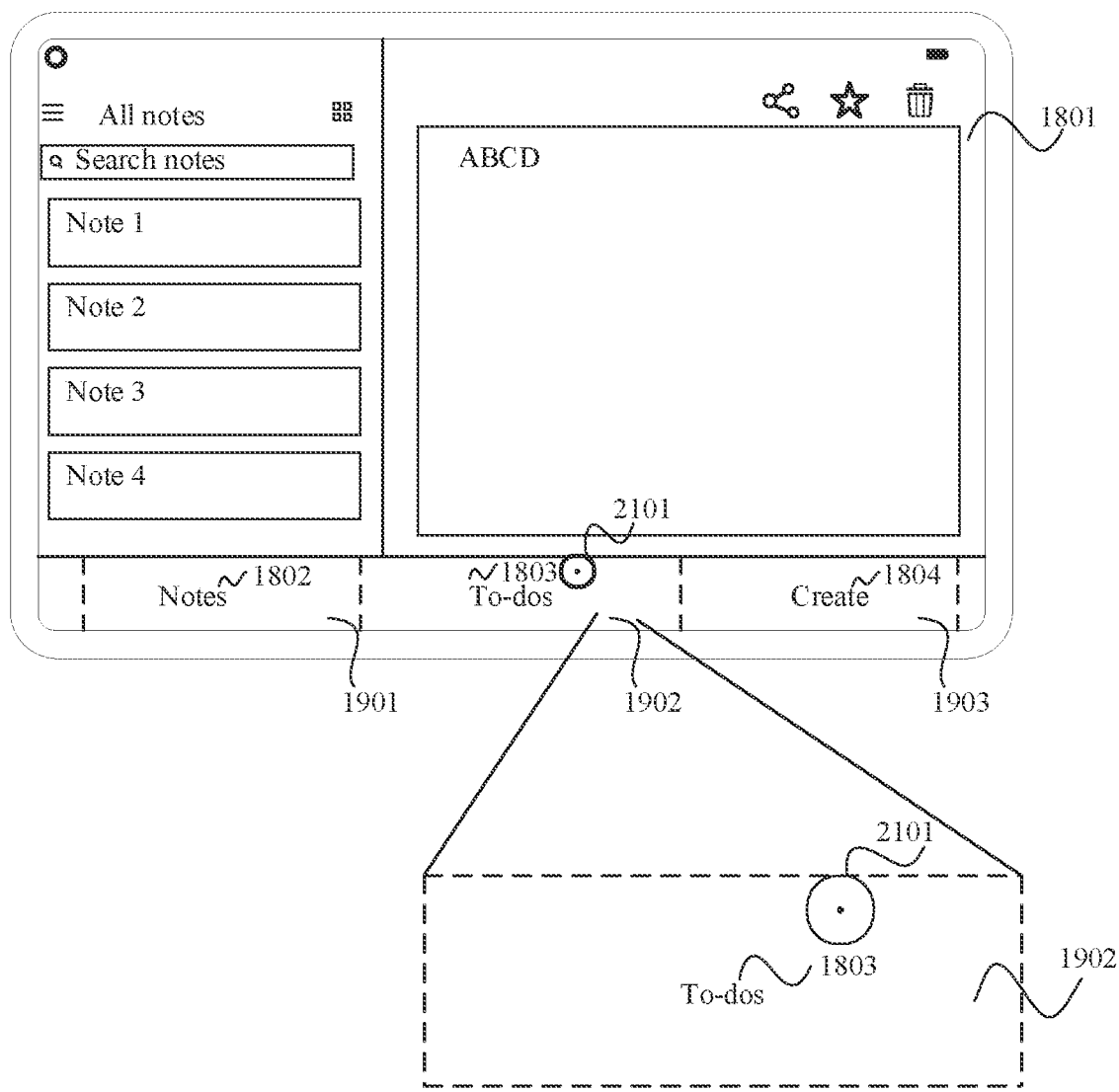
FIG. 21d is an example of a schematic diagram of cursor displaying.

For example, the user continues to move the mouse, so that the cursor 1805 moves with the mouse into the hotspot 1902 of the To-dos control 1803. Refer to FIG. 21b. For example, the cursor 1805 moves with the mouse to the edge of the hotspot 1902, where the cursor center of the cursor 1805 (which may be the center point of the cursor or a geometric center of the cursor) moves to a border of the hotspot 1902. Refer to FIG. 21c. For example, the cursor system cancels displaying the cursor 1805 after detecting that the cursor center moves to the border of the hotspot 1902. Refer to FIG. 21d. For example, after the cursor system cancels displaying the cursor 1805, the view system draws a cursor, namely, a cursor 2101 in FIG. 21d, again within the hotspot 1902. To be specific, from the user perspective, a dynamic effect viewed by the user for the cursor 1805 is that the cursor 1805 moves to the edge of the To-dos control 1803, then disappears, and subsequently jumps to the hotspot 1902 of the To-dos control for displaying. It should be noted that a shape and a size of the cursor 2101 are merely an example for description. The shape and the size of the cursor 2101 drawn in the hotspot 1902 again may be the same as or different from those of the cursor 1805. A specific example is described in detail below in the following embodiments.

For example, in this embodiment of this application, there may be multiple positions that are within the hotspot of the control (for example, the hotspot 1902 of the To-dos control) and to which the cursor 1805 jumps from the edge of the hotspot of the control. Optionally, the view system may determine, based on the moving direction of the cursor, the position that is within the hotspot and to which the cursor jumps. Optionally, the view system may determine, based on a specified direction, the position that is within the hotspot and to which the cursor jumps. Optionally; the view system may cause the cursor to jump to any position that is within the hotspot and that is close to the edge of the hotspot. This is not limited in this application.

Figure 22A:
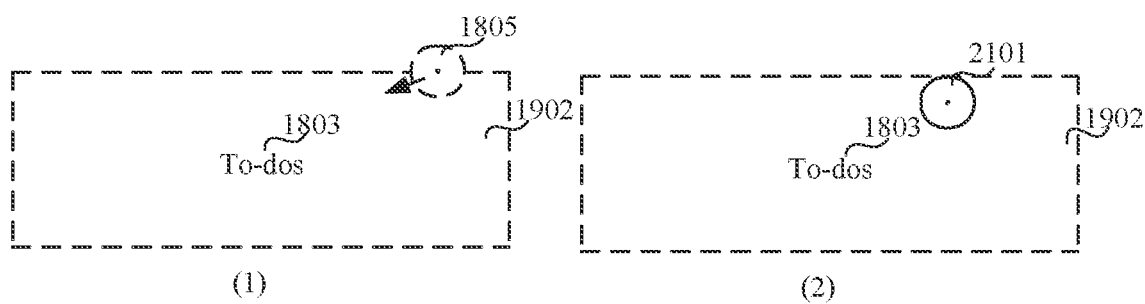
FIG. 22a is an example of a schematic diagram of a cursor jumping position.

Examples are used for description. FIG. 22a is an example of a schematic diagram of a cursor jumping position. Refer to (1) in FIG. 22a. For example, the cursor center of the cursor 1805 moves to the edge of the hotspot 1902, and the view system obtains the moving direction of the cursor 1805, as shown by an arrow in (1) in FIG. 22a. For example, as described above, the cursor 1805 disappears after moving to the edge of the hotspot. Refer to (2) in FIG. 22a. For example, the view system may determine, based on the moving direction of the cursor 1805, the position at which the cursor 1805 is displayed in the hotspot 1902, draw the cursor again in the hotspot 1902, and display the cursor 2101. In other words, in (2) in FIG. 22a, the position of the cursor 2101 that is jumped into the hotspot 1902 is determined based on the moving direction of the cursor 1805. Optionally, the position of the cursor 2101 is in the moving direction of the cursor 1805, and the cursor 2101 is at a position closest to the edge of the hotspot 1902 in the moving direction of the cursor 1805.

Figure 22B:
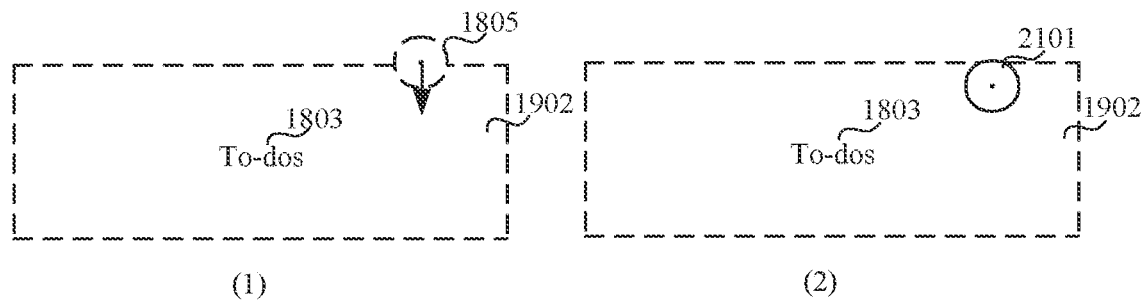
FIG. 22b is an example of a schematic diagram of a cursor jumping position.

FIG. 22b is an example of another schematic diagram of a cursor jumping position. Refer to (1) in FIG. 22b. For example, the cursor center of the cursor 1805 moves to the edge of the hotspot 1902, and the cursor 1805 disappears. Refer to (2) in FIG. 22b. For example, after the cursor 1805 disappears, the view system draws the cursor again within the hotspot 1902, and displays the drawn cursor 2101 within the hotspot 1902. For example, the position of the cursor 2101 is directly below the cursor 1805 (in other words, on an extension line of a vertical direction), and is closest to the edge of the hotspot 1902. In other words, the view system determines, based on only the specified direction (for example, that the cursor 2101 is directly below the cursor 1805) without reference to the moving direction of the cursor, the position that is within the hotspot and to which the cursor jumps. It should be noted that in this embodiment of this application, descriptions are provided merely by using an example in which the specified direction is that the cursor 2101 is directly below the cursor 1805. In another embodiment, the view system may determine, based on any specified direction (for example, the cursor 2101 is 180° obliquely below the cursor 1805, where the specified direction may be set based on an actual requirement, and is not limited in this application), the position that is within the hotspot and to which the cursor jumps. For example, if the cursor is at an upper edge or a lower edge of the control before disappearing, the specified direction may be the vertical direction. If the cursor is at a left edge or a right edge of the control before disappearing, the specified direction may be a horizontal direction. This is not limited in this application.

It should be further noted that, in this embodiment of this application, descriptions are provided by using an example in which the position that is within the hotspot and to which the cursor jumps is close to the edge of the hotspot. In another embodiment, there may be a specified distance (for example, 3 mm, where the specified distance may be set based on an actual requirement, and is not limited in this application) between the position that is within the hotspot and to which the cursor jumps and the edge of the hotspot.

Figure 23A:
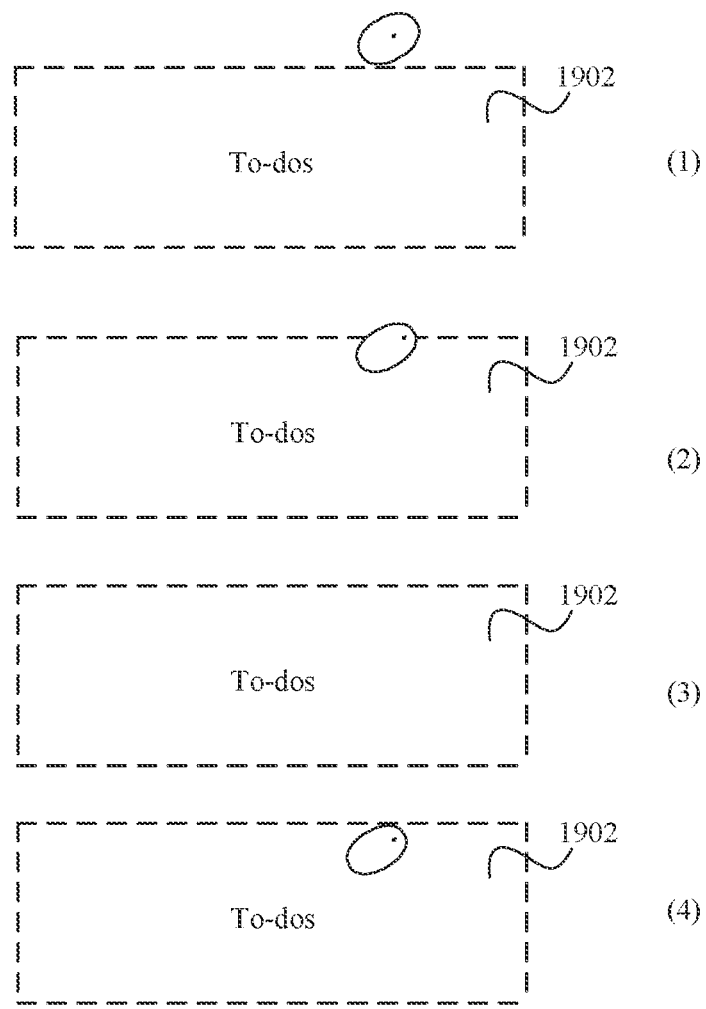
FIG. 23a is an example of a schematic diagram of cursor jumping displaying.
Figure 23B:
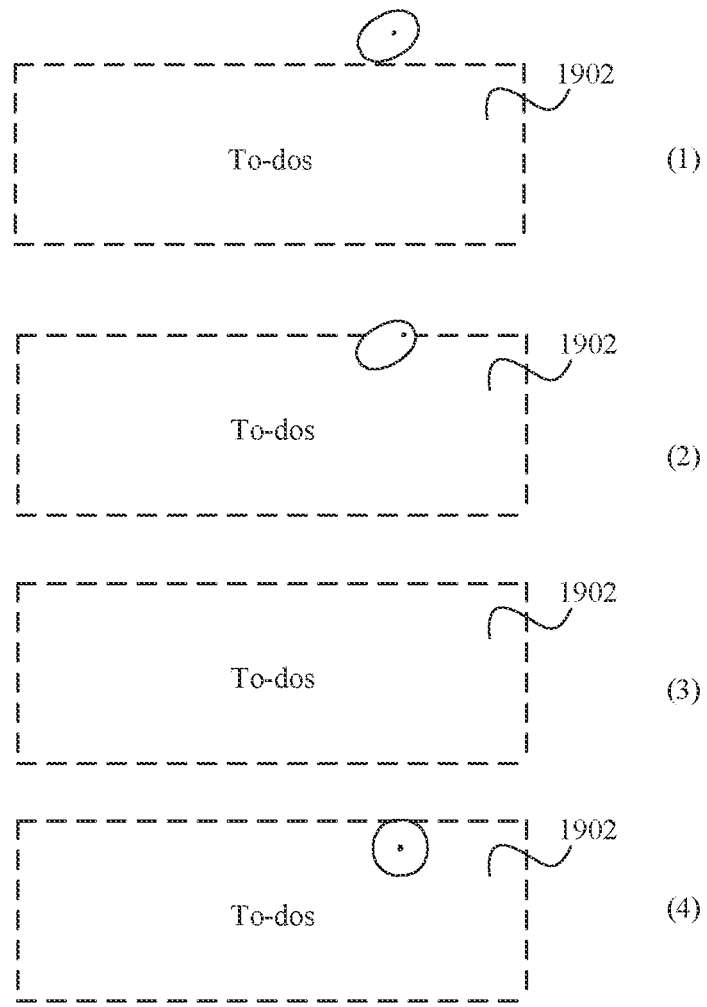
FIG. 23b is an example of a schematic diagram of cursor jumping displaying.

It should be noted that as described above, when the cursor moves to the hotspot of the To-dos control, the cursor may be still in the form changed state. In an example, as shown in (1) in FIG. 23a, the cursor moves to the edge of the hotspot 1902 of the To-dos control in the form changed state. As shown in (2) in FIG. 23a, the cursor moves to the border of the hotspot 1902. For example, the cursor system cancels displaying the cursor after detecting that the cursor center (which may be the cursor center point or the geometric center of the cursor) moves to the border of the hotspot 1902, as shown in (3) in FIG. 23*a*. Refer to (4) in FIG. 23*a*. For example, after the cursor system cancels displaying the cursor, the view system draws a cursor, namely, a cursor in the hotspot 1902 in (4) in FIG. 23*a*, again within the hotspot 1902. For example, a shape and a size of the cursor drawn by the view system within the hotspot 1902 are consistent with those of the cursor that has disappeared. In another example, as shown in (1) in FIG. 23*b*, the cursor moves to the edge of the hotspot 1902 of the To-dos control in the form changed state. As shown in (2) in FIG. 23*b*, the cursor moves to the border of the hotspot 1902. For example, the cursor system cancels displaying the cursor after detecting that the cursor center (which may be the cursor center point, or may be the geometric center of the cursor) moves to the border of the hotspot 1902, as shown in (3) in FIG. 23*b*. Refer to (4) in FIG. 23*b*. For example, after the cursor system cancels displaying the cursor, the view system draws a cursor, namely, a cursor in the hotspot 1902 shown in (4) in FIG. 23*b*, again within the hotspot 1902. For example, a shape of the cursor drawn by the view system in the hotspot 1902 is different from that of the cursor that has disappeared. Optionally, the cursor within the hotspot 1902 is in an original form of the cursor, for example, the form shown in (1) in FIG. 4*c*.

Figure 24:
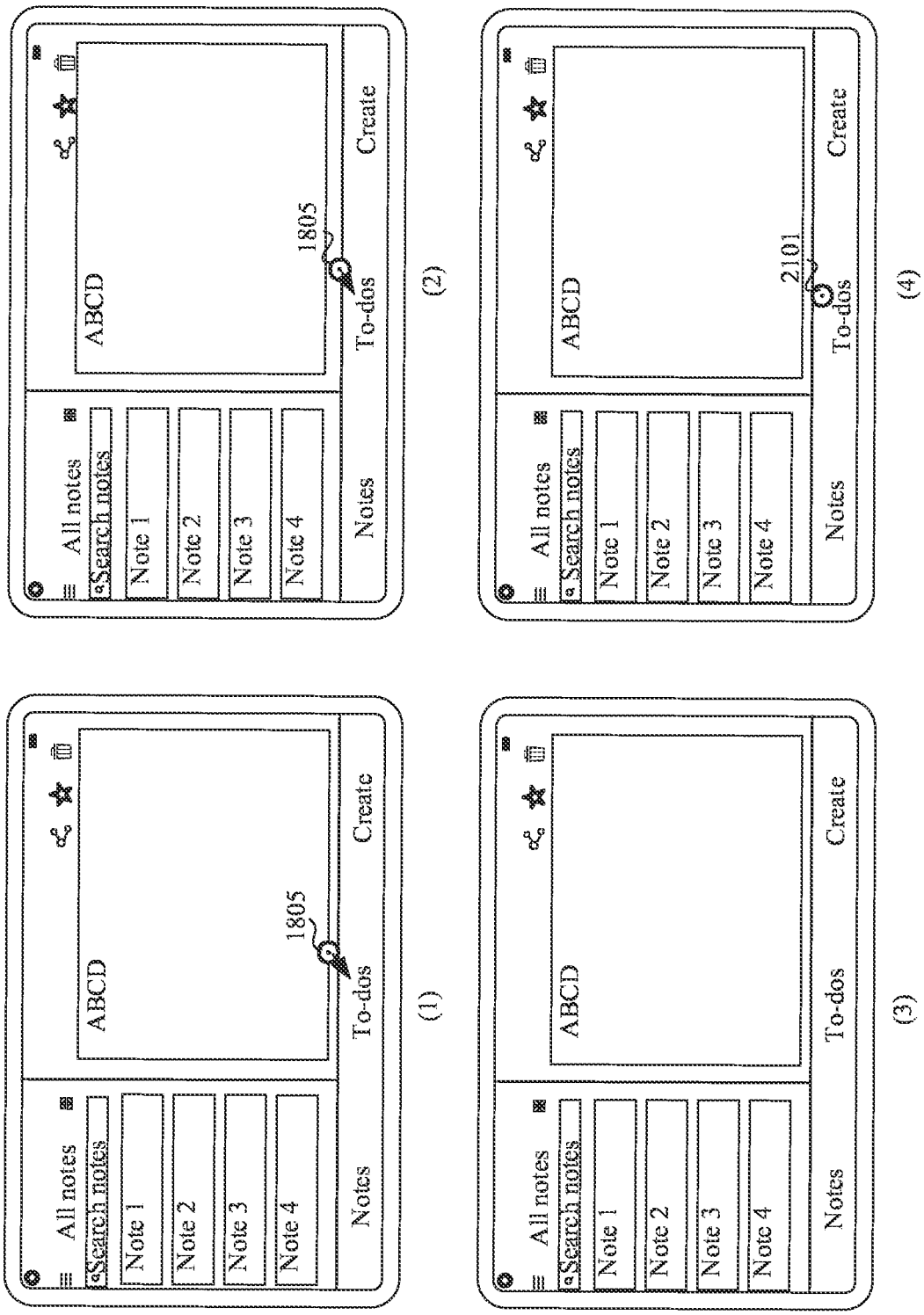
FIG. 24 is an example of a schematic diagram of a cursor jumping process.

FIG. 24 is an example of a schematic diagram of a cursor jumping process. Refer to (1) in FIG. 24. For example, the cursor 1805 moves to the To-dos control. Refer to (2) in FIG. 24. For example, the cursor center of the cursor 1805 moves to the edge of the To-dos control (namely, the edge of the hotspot of the To-dos control). Refer to (3) in FIG. 24. The cursor 1805 disappears. Refer to (3) in FIG. 4. For example, the cursor jumps to the To-dos control, in other words, a cursor 801 is displayed in the To-dos control. Optionally, a position of the cursor 2101 is in the moving direction of the cursor 1805, and is closest to the edge of the hotspot 1902 (for example, an upper border of the hotspot 1902).

For example, in this embodiment of this application, after the cursor jumps to the control hotspot, the view system may draw a cursor in the control hotspot to achieve a form change effect, so that the form-changed cursor covers the control hotspot.

Figure 25A:
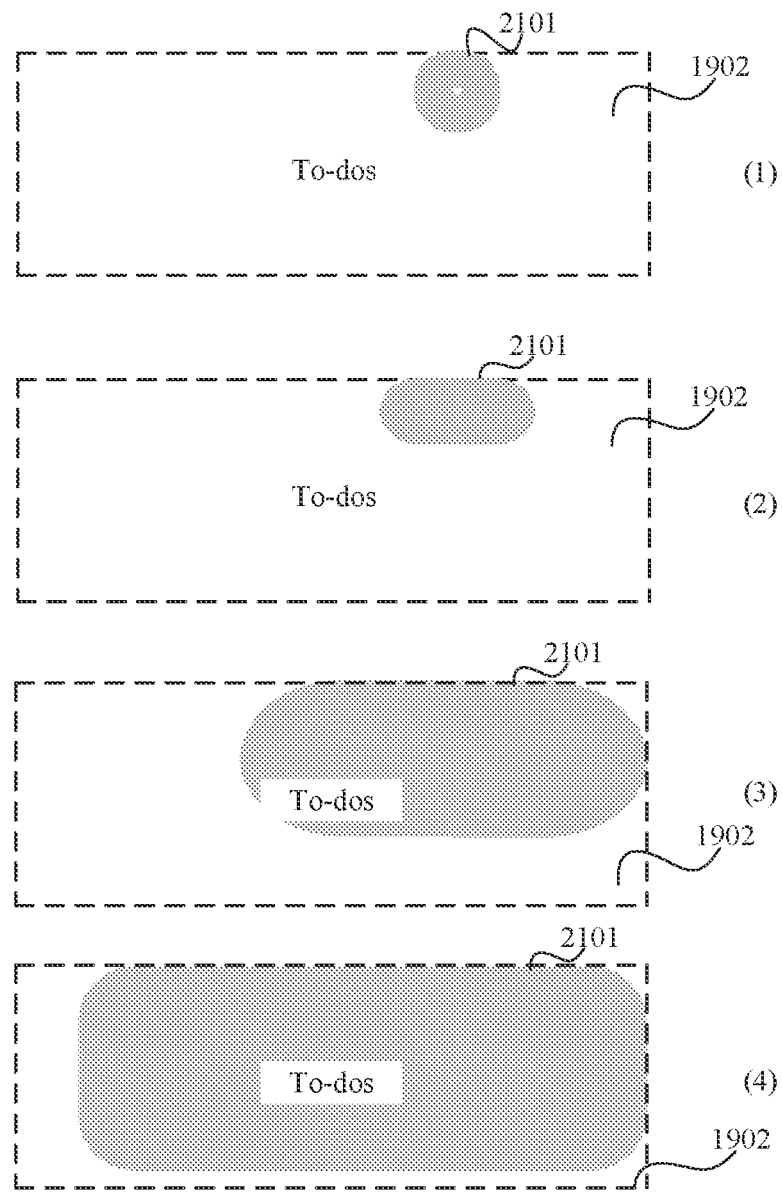
FIG. 25a is an example of a schematic diagram of a cursor form change.

Examples are used for description. FIG. 25*a* is an example of a schematic diagram of a cursor form change. Refer to (1) in FIG. 25*a*. For example, the view system draws the cursor 2101 within the hotspot. Optionally, the cursor drawn within the hotspot may also be referred to as a mask. In a cursor form change process shown in FIG. 25*a*, a shape of the cursor starts to change from an original shape. In other words, after the cursor jumps to the hotspot 1902, a size and the shape of the cursor 2101 drawn by the view system in the hotspot 1902 are the same as the original shape and size of the cursor, namely, the shape and the size of the cursor (for example, a cursor 12105) that are before the cursor jumps to the hotspot 1902.

Refer to (2) in FIG. 25*a*. For example, the view system starts to change the cursor from the cursor 2101. A cursor center (and a cursor border) disappears, and the cursor 2101 is gradually enlarged and reshaped. In this embodiment of this application, descriptions are provided by using an example in which the view system reshapes the cursor 2101 to a shape approximate to a shape (namely, a rectangle) of the hotspot 1902. In other words, the view system gradually enlarges the cursor 2101 and reshapes the cursor 2101 to the shape approximate to the shape of the hotspot 1902. Optionally, "approximate" in this embodiment of this application means: The cursor 2101 is reshaped to the rectangle (namely, the shape of the hotspot 1902), a ratio of a length to a height is the same as that of the hotspot 1902, and four vertex angles obtained through reshaping are rounded angles.

Refer to (3) in FIG. 25. For example, in a process in which the view system gradually enlarges and reshapes the cursor 2101, if any border of the cursor 2101 touches a boundary (namely; the border) of the hotspot 1902, the cursor stops expanding in this direction, and continues to expand in another direction until the cursor 2101 is enlarged to 95% (which may be set based on an actual requirement, and is not limited in this application) of an area of the hotspot 1902, as shown in (4) in FIG. 25*a*. Refer to (4) in FIG. 25*a*. For example, the shape of the cursor 2101 is approximate to the shape of the hotspot 1902 (where for a concept of "approximate", refer to the foregoing descriptions). For example, an area of the cursor 2101 occupies 95% of the area of the hotspot 1902.

Figure 25B:
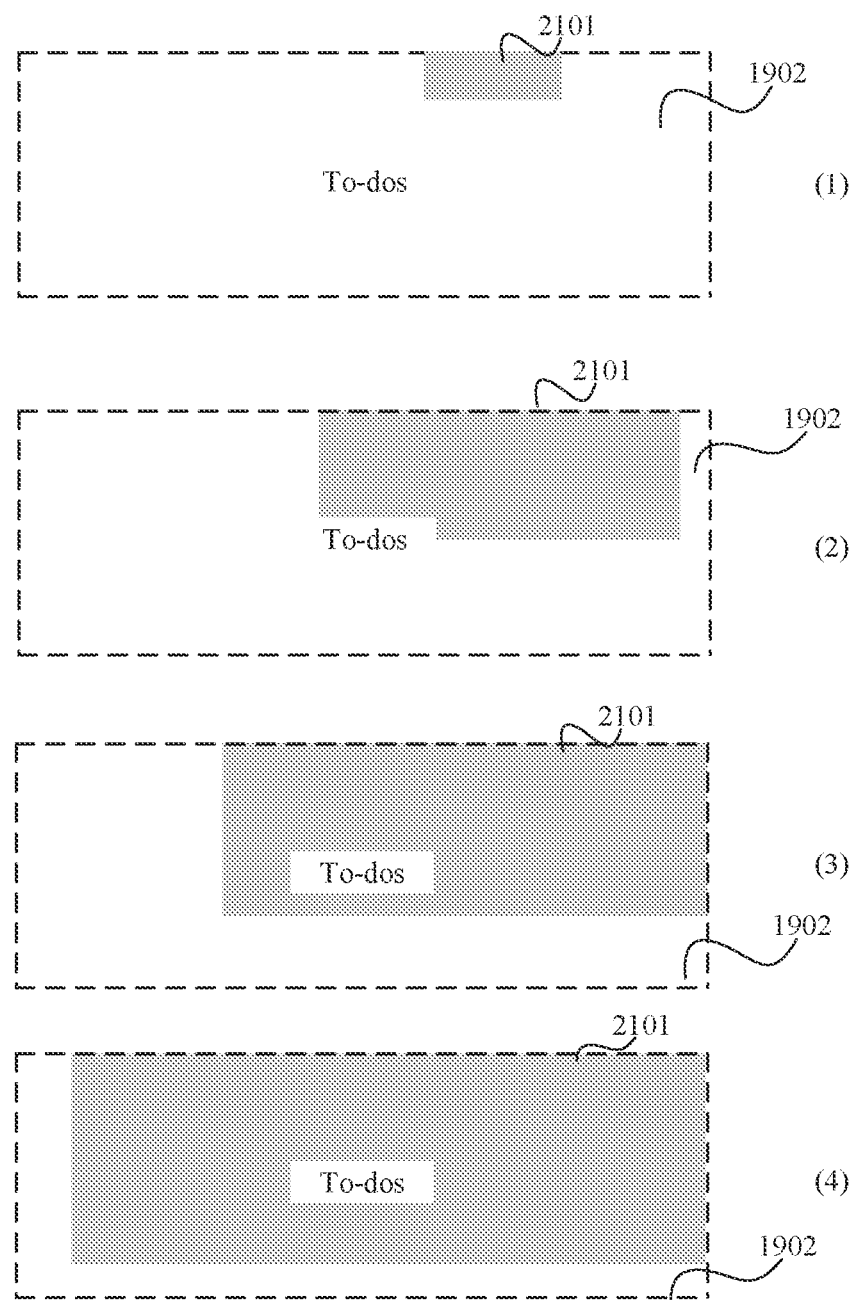
FIG. 25b is an example of a schematic diagram of a cursor form change.

FIG. 25*b* is an example of another schematic diagram of a cursor form change. Refer to (1) in FIG. 25*b*. For example, the cursor jumps to the hotspot 1902, and the view system may draw the cursor 2101 within the hotspot 1902. A shape of the cursor 2101 may be the same as that of the hotspot 1902, and for example, is also a rectangle. In other words, the view system starts to draw the cursor from the rectangle of the cursor 2101, and gradually enlarges the cursor 2101 within the hotspot 1902. It may be understood that in this embodiment, the cursor 2101 is merely gradually enlarged, and does not need to be reshaped. However, in the process shown in FIG. 25*a*, the cursor needs to be gradually enlarged from the original shape, and reshaped to a preset shape, for example, a rectangle whose four corners are rounded angles. Refer to (2) in FIG. 25*b*. As described above, the view system gradually enlarges the cursor 2101 based on the current shape, namely, the rectangle the same as the shape of the hotspot 1902. Refer to (3) in FIG. 25*b*. In an enlargement process of the cursor 2101, if any border of the cursor 2101 touches the border of the hotspot 1902, enlargement is stopped in this direction, and continues in another direction. This is similar to the foregoing descriptions. Refer to (4) in FIG. 25*b*. For example, the cursor 2101 continues to be enlarged to occupy 95% of the area of the hotspot 1902, and then stops being enlarged.

It should be noted that the shapes in FIG. 25*a* and FIG. 25*b* are merely schematic examples. In another embodiment, the cursor may be gradually enlarged and reshaped from the original shape to a circle or another polygon in the hotspot 1902. Alternatively, the cursor may be gradually enlarged and reshaped from another preset shape (such as a square or an ellipse) in the hotspot 1902 to the shape shown in (4) in FIG. 25*a* or (4) in FIG. 25*b* or to another shape. This is not limited in this application.

It should be further noted that, in the cursor form change processes shown in FIG. 25*a* and FIG. 25*b*, an example in which an actual position of the cursor remains unchanged, in other words, the cursor is always at a position of the cursor 2101 in (1) in FIG. 25*a* is used for description. In another embodiment, if the actual position of the cursor moves within the hotspot 1902 with the mouse in the form change process of the cursor 2101, the cursor 2101 shifts with the actual position of the cursor within the hotspot 1902 in the form change process. For a specific shifting manner, refer to the following cursor dragging processes shown in FIG. 13*a* and FIG. 13*b*.

Figure 26:
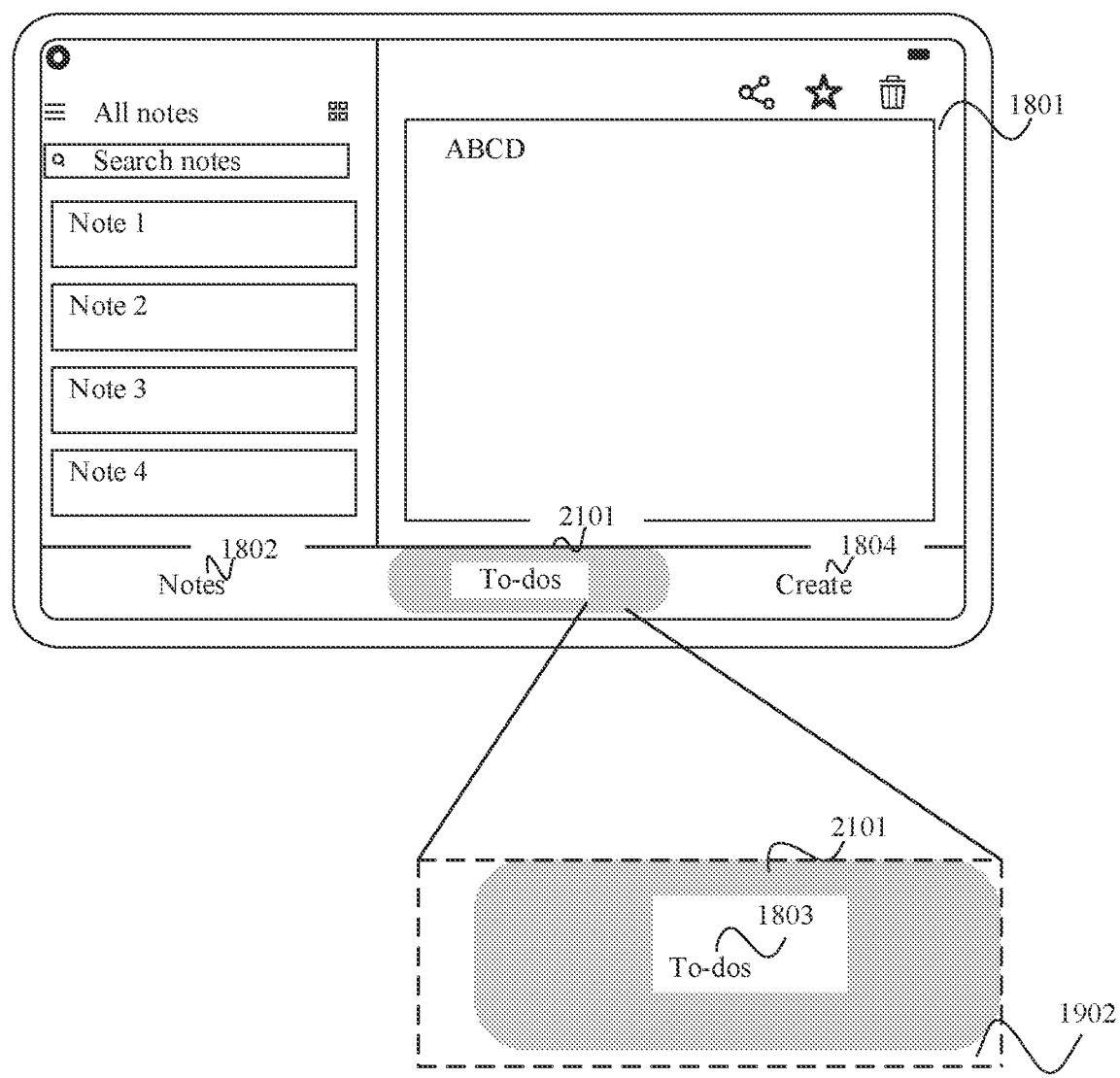
FIG. 26 is an example of a schematic diagram of a cursor form change.

FIG. 26 is an example of a schematic diagram of a cursor form change. Refer to FIG. 26. For example, from the user perspective, a shape of the cursor 2101 obtained after a form change is approximate to the shape of the hotspot 1902, and four angles are rounded angles. In addition, an area of the cursor 2101 occupies 95% of an area of the hotspot 1902.

It should be noted that a position of the cursor 2101 shown in FIG. 26 is approximate to an upper border and a right border of the hotspot 1902. The position is determined based on a position of the cursor center (which may also be referred to as the actual position of the cursor). In other words, in this embodiment of this application, although the cursor center is invisible from the user perspective, the actual position of the cursor center may be reflected by a position change of the cursor 2101. The user may determine the moving direction of the cursor based on the position change of the cursor 2101. In other words, the view system moves the cursor 2101 with the cursor center, namely, the mouse, to achieve an effect of dragging the cursor 2101. A specific dragging manner is described in detail in the following embodiments.

Figure 27:
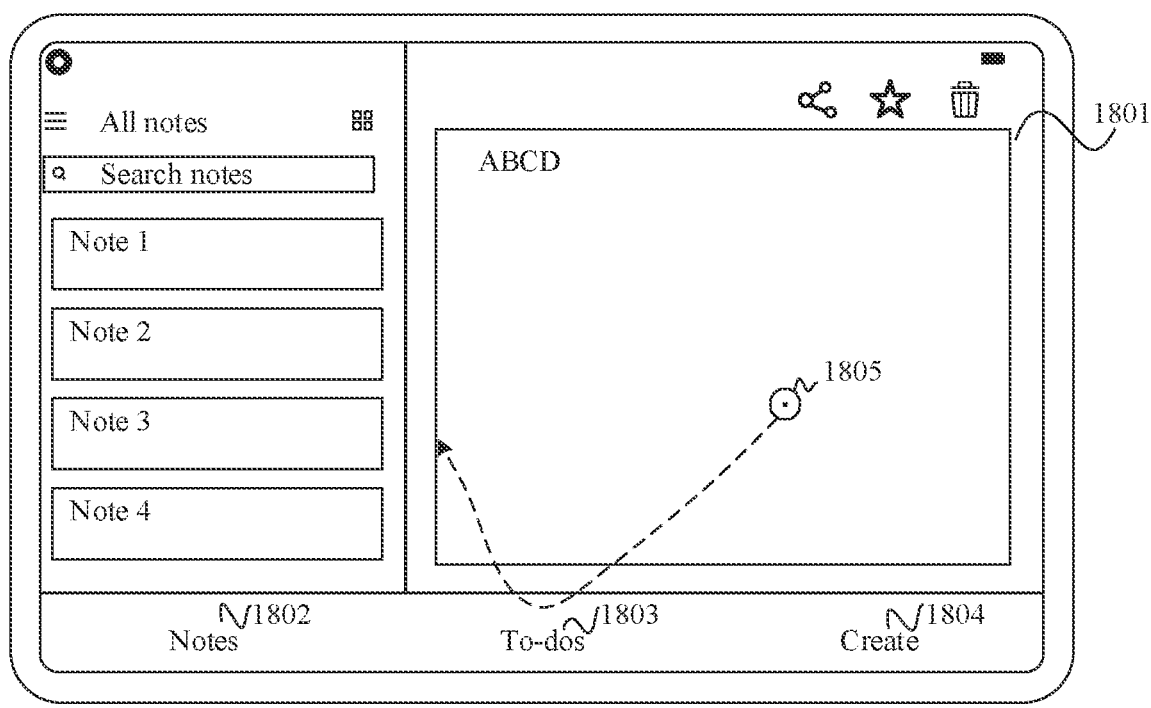
FIG. 27 is an example of a schematic diagram of cursor displaying.

For example, descriptions are provided in FIG. 26 by using an example in which the cursor becomes resting after moving to the hotspot of the To-dos control, in other example, by using a complete process in which the view system draws a dynamic cursor form change effect in the hotspot 1902 of the To-dos control as an example. In another embodiment, in the movement process, the cursor may transitorily pass through the control. Consequently, the cursor leaves the hotspot of the control before the dynamic cursor form change effect is completely presented. Examples are used for description. FIG. 27 is an example of a schematic diagram of cursor displaying. Refer to FIG. 27. For example, a movement track of the cursor 1805 is shown by a dashed line in FIG. 27. To be specific, in the movement process, the cursor 1805 moves out of the To-dos control 1803 after passing through the To-dos control 1803.

Figure 28:
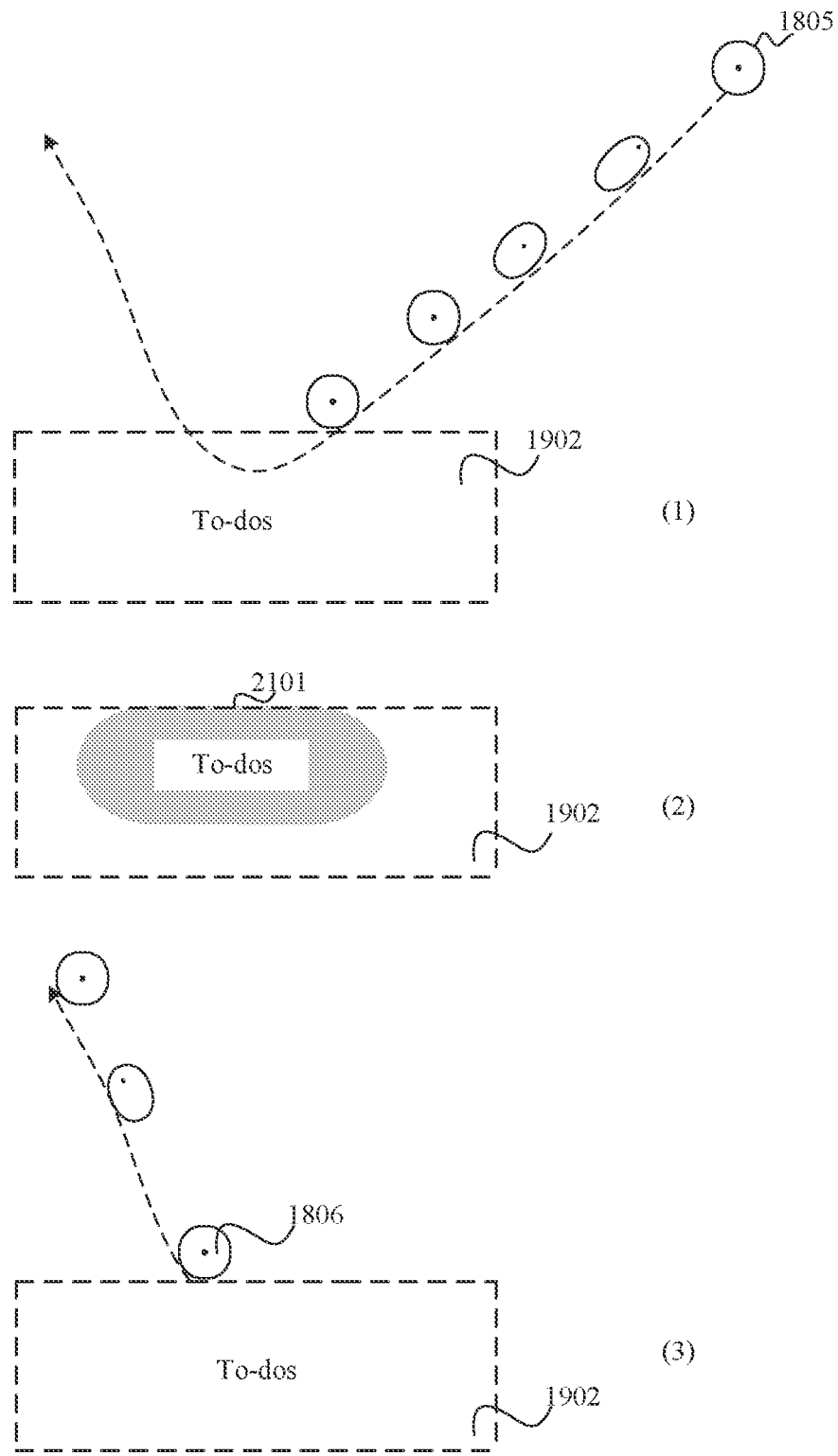
FIG. 28 is an example of a schematic diagram of cursor displaying.

With reference to FIG. 27, FIG. 28 is an example of a schematic diagram of cursor displaying. Refer to (1) in FIG. 28. For example, the cursor 1805 moves to the hotspot 1902 of the To-dos control. For a form change process during the cursor movement, refer to the foregoing. Details are not described herein again. Refer to (2) in FIG. 28. For example, after the cursor disappears and is displayed in the hotspot 1902, a form of the cursor 2101 gradually changes. Optionally, this embodiment of this application uses an example in which duration for which the cursor enters the hotspot 1902 and is reshaped to the shape shown in FIG. 26 is 500 ms (where the duration may be set based on an actual requirement, and is not limited in this application). For example, the cursor is reshaped to a shape shown in (2) in FIG. 28. For example, the cursor moves out of the hotspot when the dynamic cursor form change effect is displayed only for 200 ms, as shown in (3) in FIG. 28. The cursor system draws a cursor 1806 again. Optionally, a shape of the cursor 1806 that is drawn by the cursor system again is the original shape of the cursor, for example, the shape shown in (1) in FIG. 4c. Next, the cursor 1806 moves with the mouse. In a movement process, a form of the cursor may change in the manner described in the foregoing embodiment, to achieve a dragging effect. It should be noted that as described above, the dragging effect is also achieved in the form change process of the cursor in the hotspot 1902, in other words, the form of the cursor changes while the cursor moves with the actual position of the cursor. The following conforms to the same meaning, and repeated descriptions are omitted.

Figure 29:
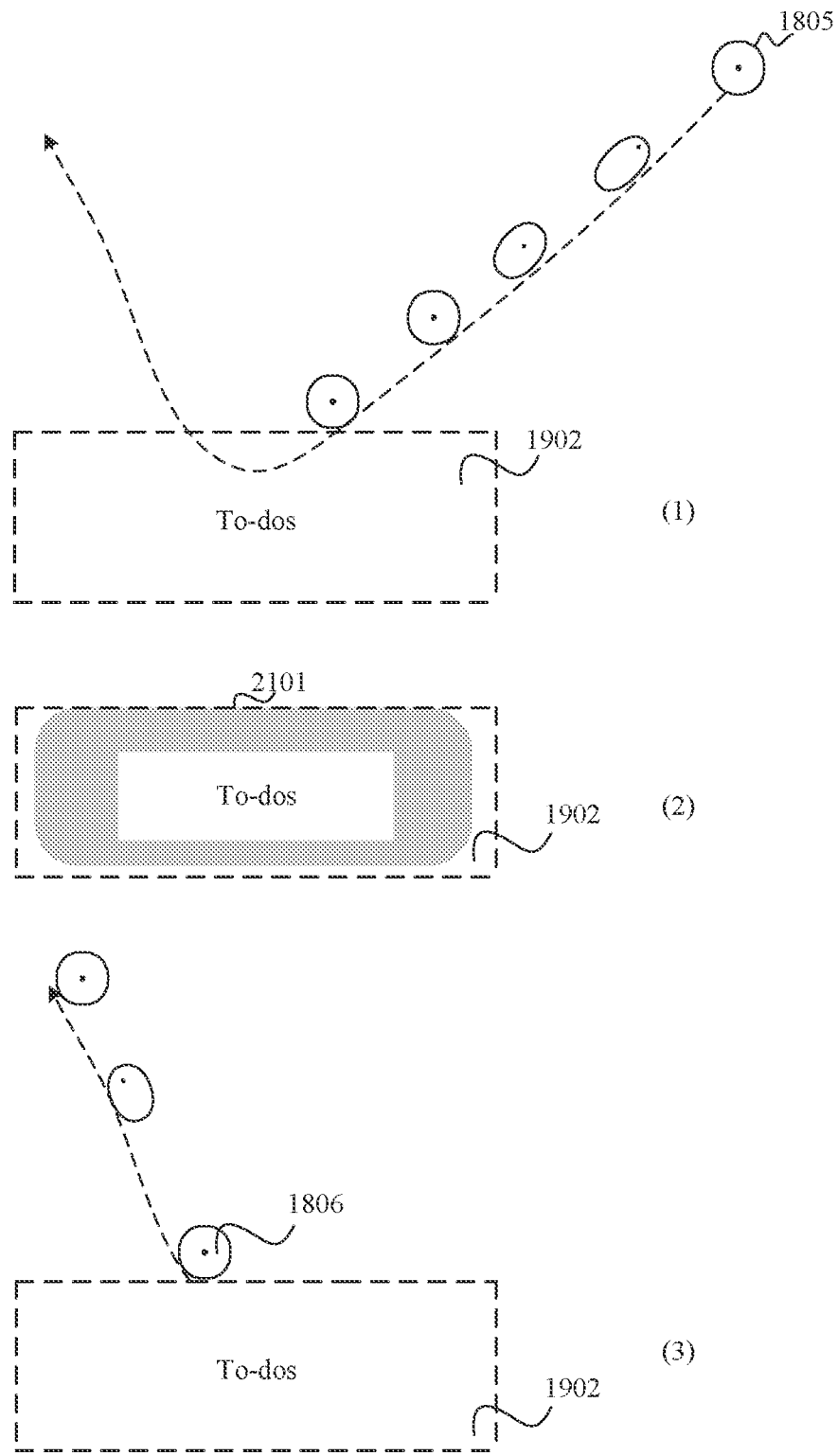
FIG. 29 is an example of a schematic diagram of cursor displaying.

With reference to FIG. 27, FIG. 29 is an example of a schematic diagram of cursor displaying. Refer to (1) in FIG. 29. For example, the cursor 1805 moves to the hotspot 1902 of the To-dos control. For a form change process during the cursor movement, refer to the foregoing. Details are not described herein again. Refer to (2) in FIG. 29. For example, after the cursor disappears and is displayed in the hotspot 1902, a form of the cursor 2101 gradually changes. Optionally, this embodiment of this application uses an example in which duration for which the cursor enters the hotspot 1902 and is reshaped to the shape shown in FIG. 26 is 500 ms (where the duration may be set based on an actual requirement, and is not limited in this application). For example, the cursor is reshaped to a shape shown in (2) in FIG. 29. For example, the cursor slowly moves in the hotspot 1902 of the To-dos control. The view system completely changes of the form of the cursor 2101 in the To-dos control 1902 and causes the cursor 2101 to move with a real position of the cursor. Subsequently, as shown in (3) in FIG. 29, the cursor moves out of the hotspot. The cursor system draws a cursor 1806 again. Optionally, a shape of the cursor 1806 that is drawn by the cursor system again is the original shape of the cursor, for example, the shape shown in (1) in FIG. 4c. Next, the cursor 1806 moves with the mouse. In a movement process, a form of the cursor may change in the manner described in the foregoing embodiment, to achieve a dragging effect.

Figure 30A:
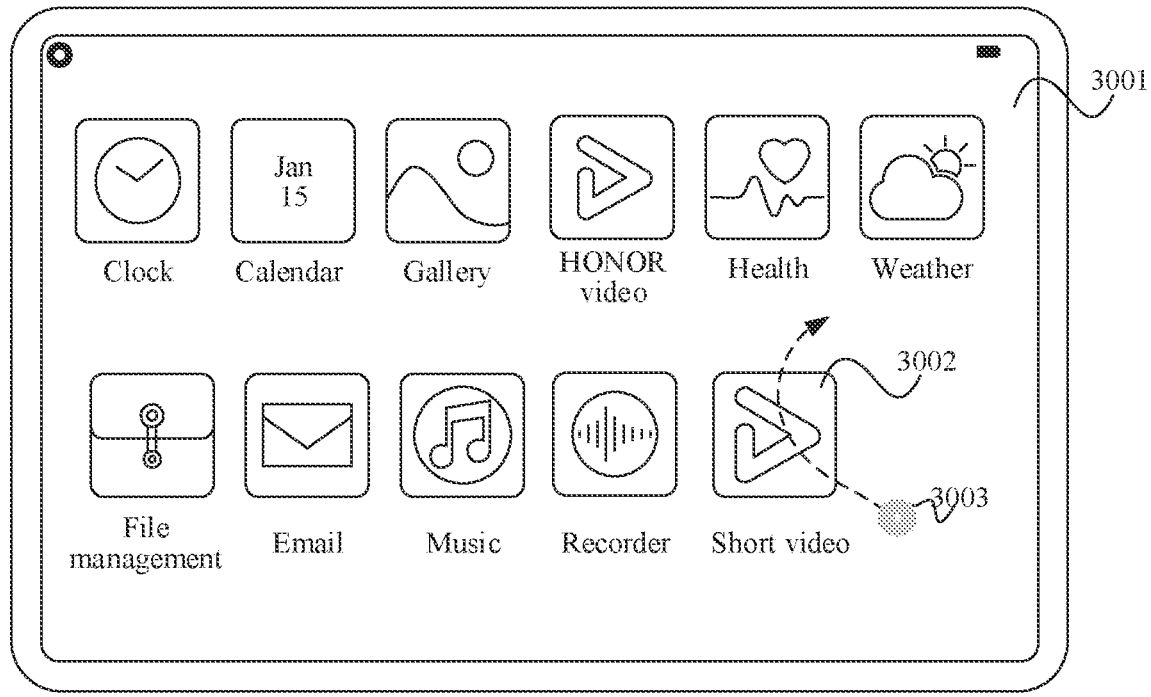
FIG. 30a to FIG. 30h each are an example of a schematic diagram of cursor displaying.
Figure 30B:
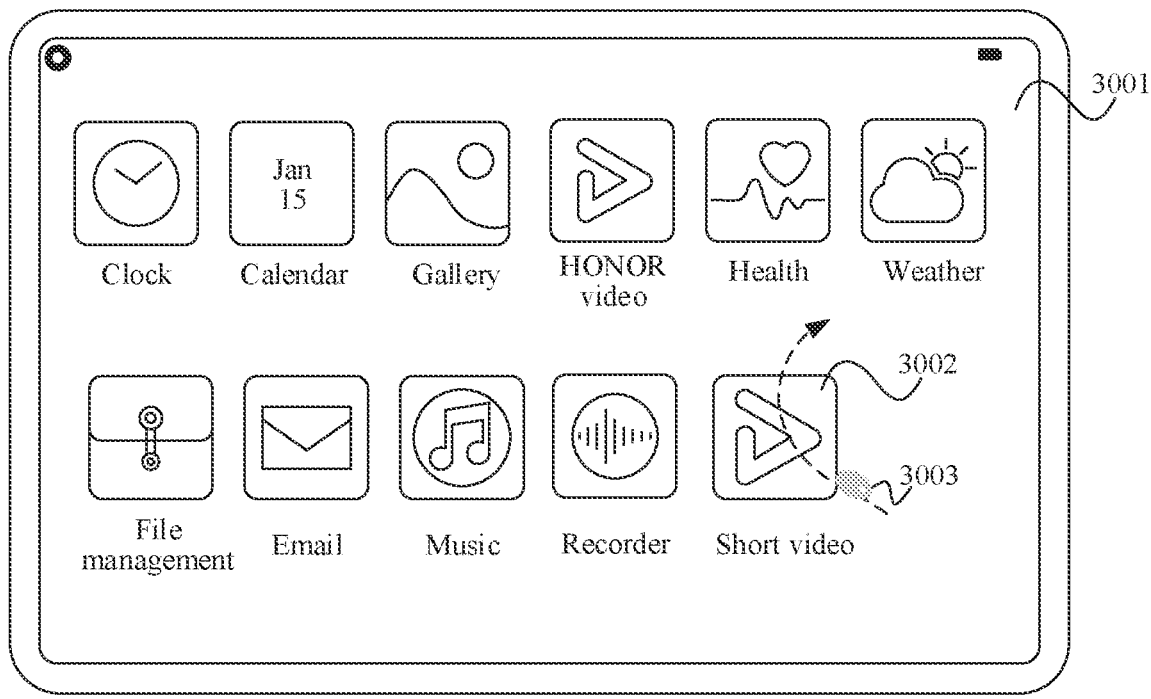

For example, the cursor display manner in the embodiments of this application may be further applied to a desktop icon. Refer to FIG. 30a. For example, a display interface 3001 includes one or more icon controls, for example, a short video icon control 3002. For example, a cursor 3003 may move to the short video icon control 3002 with the mouse. As shown in FIG. 30b, a form of the cursor gradually changes in a movement process. For specific details, refer to the descriptions in the foregoing embodiments. The details are not described herein again. For example, dashed lines in FIG. 30a and the accompanying drawings in the following embodiments represent movement tracks of the cursor. Repeated descriptions are omitted below.

Figure 30C:
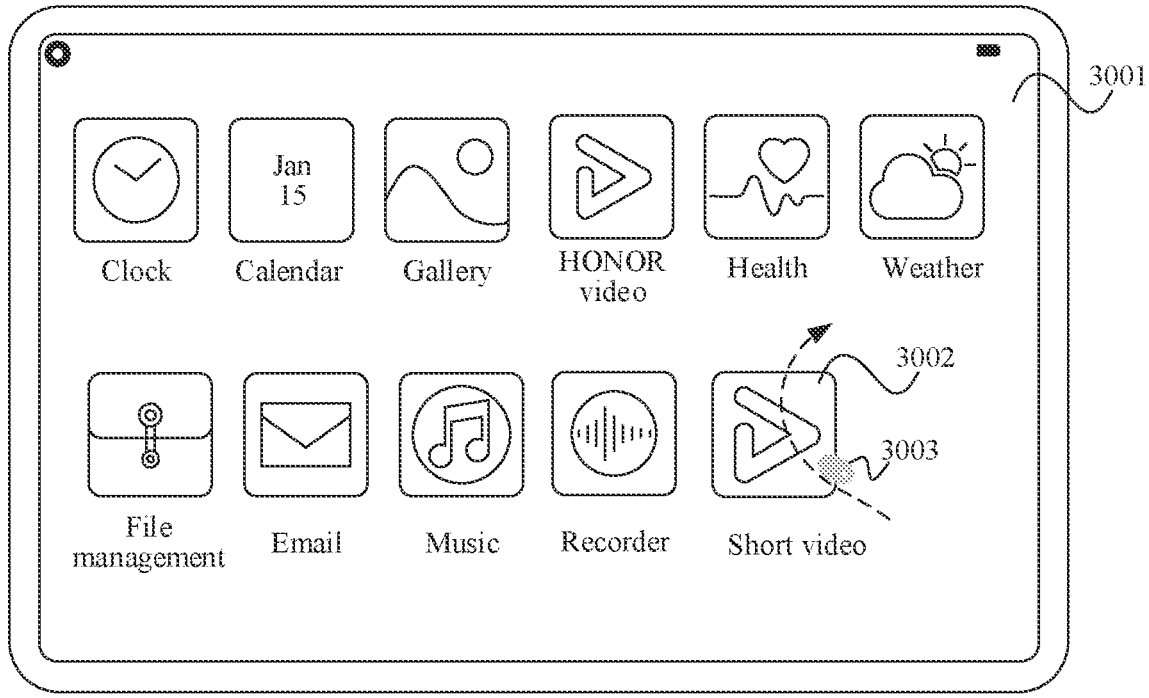

Refer to FIG. 30c. For example, the cursor 3003 moves to an edge of the short video icon control 3002 with the mouse. In other words, a cursor center of the cursor 3003 is at a right edge of the short video icon control 3002. For example, the cursor 3002 disappears, and the view system draws a cursor in the short video icon control 3002.

Figure 30D:
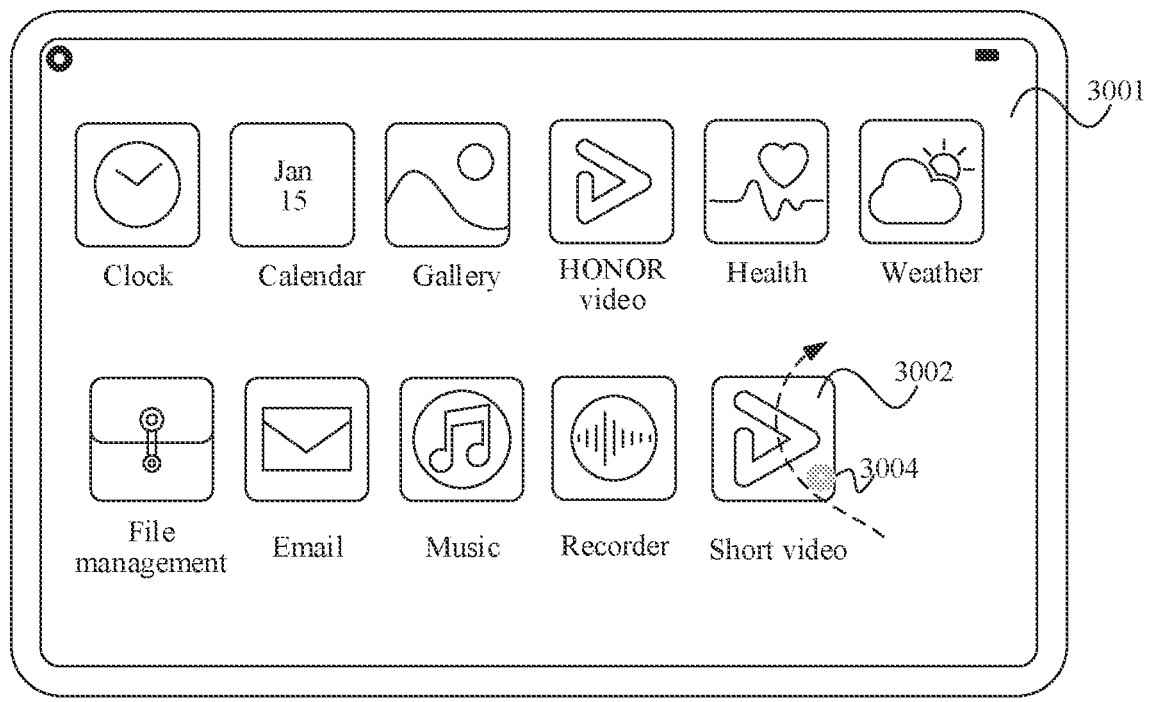

Refer to FIG. 30d. For example, after the cursor disappears, the view system draws a cursor 3004 in the short video icon control 3002. For example, for a drawing manner and a position of the cursor 3004, refer to the foregoing. Details are not described herein again.

Figure 30E:
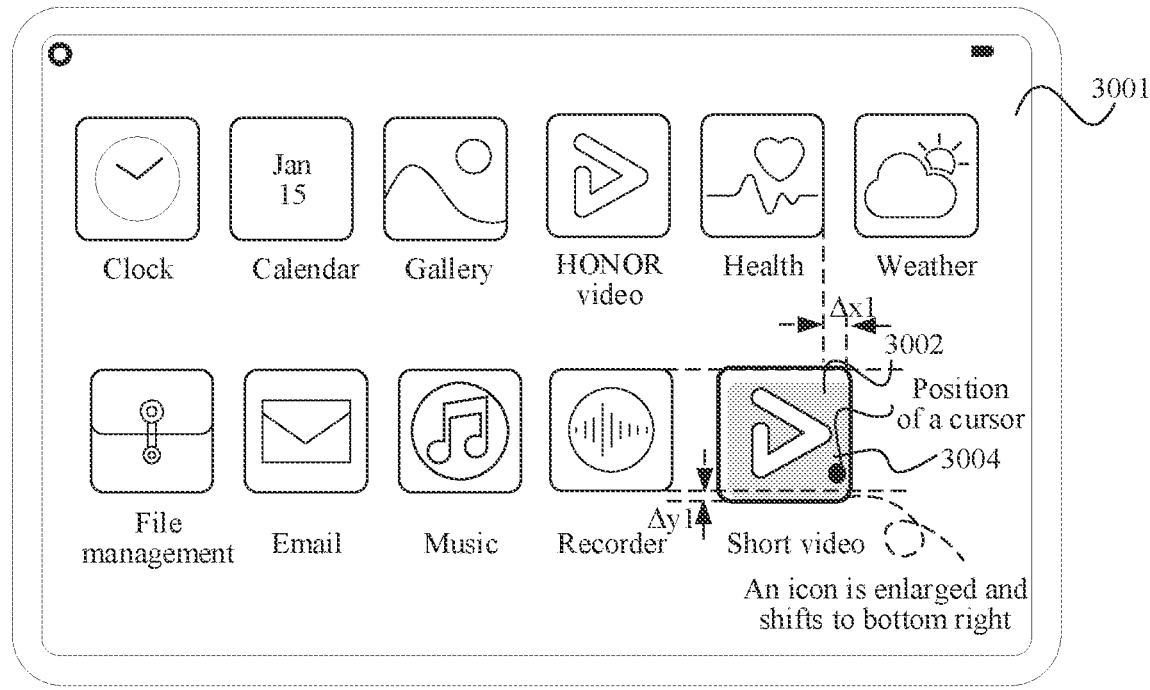

Refer to FIG. 30e. For example, the cursor 3004 is gradually enlarged and reshaped to a same shape and size as the short video icon control 3002. In the process in which the cursor 3004 is gradually enlarged and reshaped, transparency of the cursor 3004 gradually increases until the cursor 3004 is completely transparent.

Still refer to FIG. 30e. For example, a position of the cursor 3004 optionally corresponds to an actual position of the cursor. For example, the actual position of the cursor is located at bottom right of the short video icon control 3002. Correspondingly, the cursor 3004 is also gradually enlarged and reshaped from the bottom right. For example, in this embodiment of this application, for an icon control, in a form change process of the cursor 3004, the icon control is also gradually enlarged and is dragged to a corresponding position with the actual position of the cursor.

An example is used for description. Still refer to FIG. 30e. For example, the actual position of the cursor is located at the bottom right of the short video icon control 3002. In the process in which the cursor 3004 is gradually enlarged and reshaped, the short video icon control 3002 is gradually enlarged and shifts to the bottom right. Optionally, a largest value of an offset of the icon control may be set in the view system. In addition, the offset of the icon control corresponds to an offset of the actual position of the cursor. It may be understood that a dragging manner of the icon control is similar to the foregoing dragging manner of the cursor. For example, the short video icon control 3002 is enlarged and gradually shifts to the bottom right. For example, when the cursor 3002 is enlarged and reshaped to the shape shown in FIG. 30d, the short video icon control 3002 shifts rightward by $\Delta x1$ and downward by $\Delta y1$.

Figure 30F:
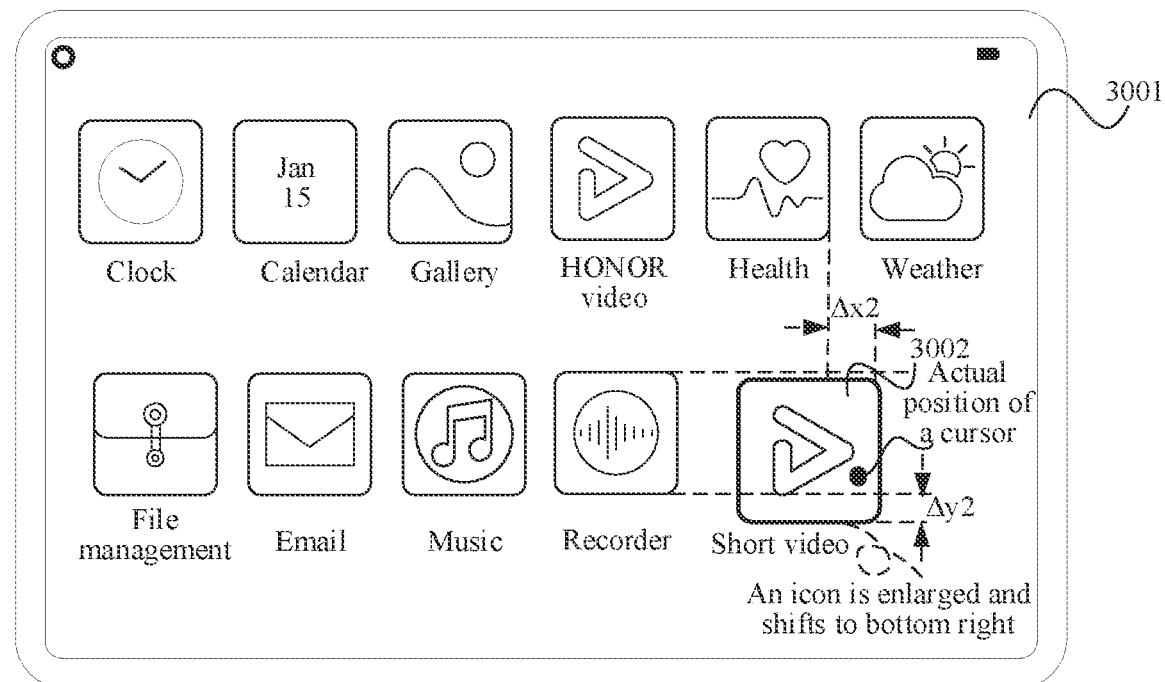

For example, as described above, in the form change process of the cursor 3004, the transparency of the cursor 3004 gradually becomes larger. As shown in FIG. 30f, for example, the transparency of the cursor 3004 is of a largest value, in other words, the cursor 3004 is completely transparent. In addition, because the actual position of the cursor is at a rightmost side of the short video icon control 3002, correspondingly, the short video icon control 3002 is gradually enlarged and shifts rightward by a largest value (which may be set based on an actual requirement, and is not limited in this application). It should be noted that a largest size to which the short video icon control 3002 is enlarged may be the same as or smaller than a size of the short video icon control 3002. The largest size may be specifically set based on an actual requirement, and is not limited in this application.

Still refer to FIG. 30f. For example, based on a position, of the actual position of the cursor, in the short video icon control 3002, a rightward offset of the short video icon control may reach a largest value, namely, $\Delta x2$, of an offset in a horizontal direction, and a downward offset of the short video icon control is $\Delta y2$ in a vertical direction. Optionally, based on offsets between the actual position of the cursor and an origin of the short video icon control 3002 (to be specific, the offset in the vertical direction is less than the offset in the horizontal direction), correspondingly, the offset $\Delta y2$ of the short video icon control in the vertical direction is less than the offset $\Delta x2$ in the horizontal direction. For parts not described, refer to the foregoing content relevant to the dragging of the cursor and the actual position of the cursor. Details are not described herein again.

For example, in this embodiment of this application, the actual position of the cursor may move in the short video icon control with the mouse. Correspondingly, the short video icon control 3002 maintains the current size (namely, the enlarged size) and moves with the actual position of the cursor, to achieve the dragging effect on the short video icon control 3002. It should be noted that because the cursor is currently completely transparent, actually, the current shape and size of the cursor are exactly the same as those of the short video icon control. Correspondingly, the cursor is also dragged together with the short video icon control. This is applicable to the following, and repeated descriptions are omitted.

Figure 30G:
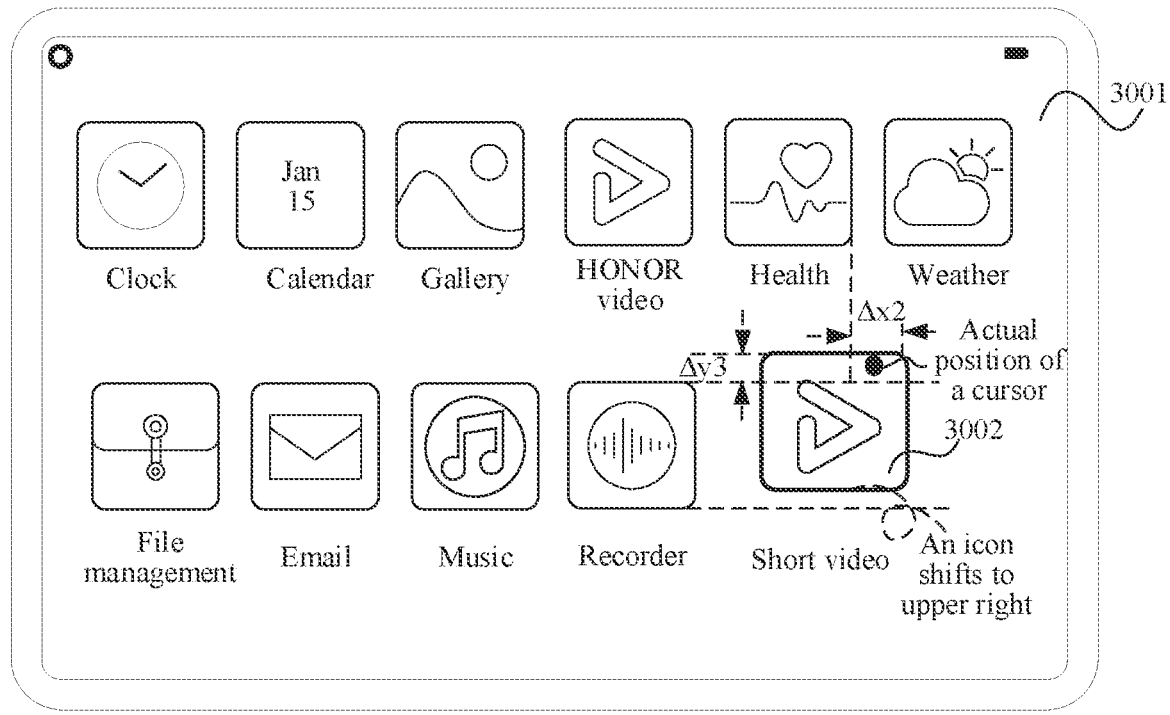

An example is used for description. Refer to FIG. 30g. For example, the actual position of the cursor moves to upper right of the short video icon control 3002 with the mouse. Correspondingly, the short video icon control 3002 maintains the current size, and moves to the upper right. For example, a current offset of the short video icon control on an X-axis is $\Delta x2$, and a current offset of the short video icon control on a Y-axis is $\Delta y3$. It should be noted that the foregoing offset of the short video icon control is relative to an original position of the short video icon control.

Figure 30H:
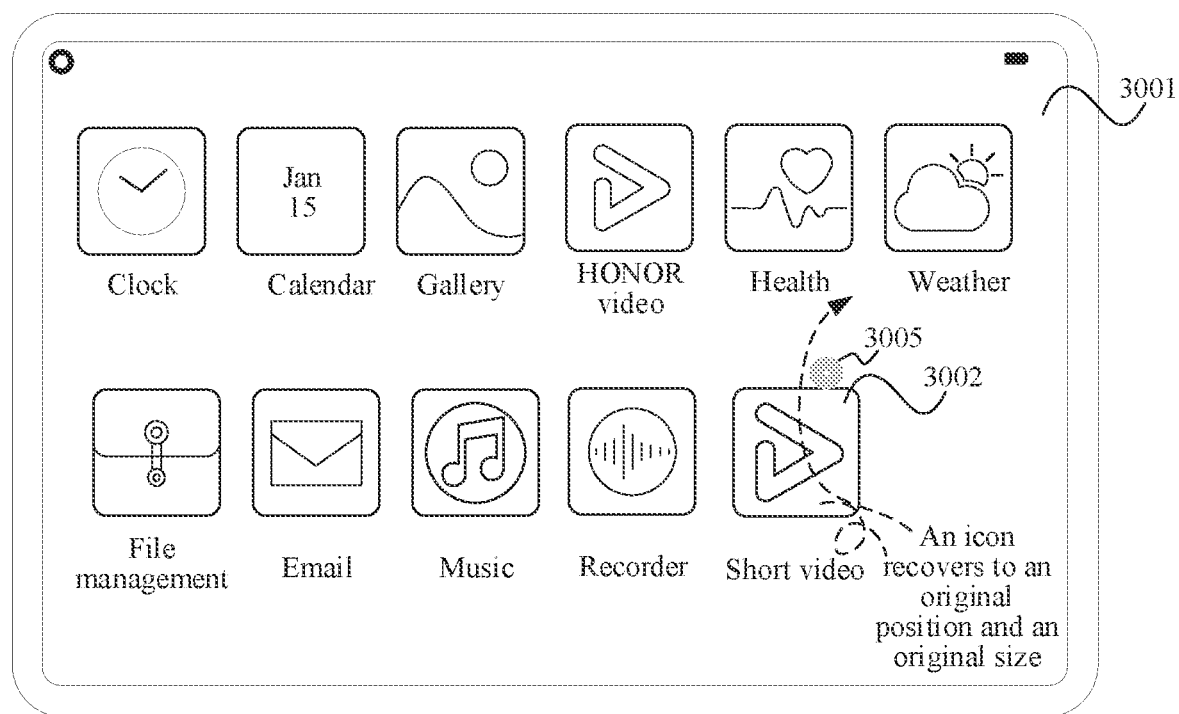

Refer to FIG. 30h. The cursor moves out of the short video icon control 3002 with the mouse, and the cursor system draws a cursor 3005 on the display interface 3001. For example, after the cursor moves out of the short video icon control 3002, the short video icon control 3002 gradually recovers to the original size and the original position.

It should be noted that when the cursor moves to the desktop icon, duration for presenting dynamic form change effects of the cursor and the icon may be set based on an actual requirement, and for example, may be set to 500 ms. This is similar to the descriptions in FIG. 28 and FIG. 29. If duration for which the cursor stays in the icon is less than 500 ms, only dynamic effects of the cursor and the icon in the staying duration are presented. For a principle thereof, refer to the descriptions in FIG. 28. Details are not described herein again.

It may be understood that to implement the foregoing functions, the electronic device includes corresponding hardware structures and/or software modules for performing the functions. Algorithm steps in the examples described with reference to the embodiments disclosed in this specification can be implemented by hardware or a combination of hardware and computer software in this application. Whether a function is performed by hardware or computer software driving hardware depends on particular applications and design constraints of the technical solutions. A person skilled in the art may use different methods to implement the described functions with reference to embodiments for each particular application, but it should not be considered that the implementation goes beyond the scope of this application.

Figure 31:
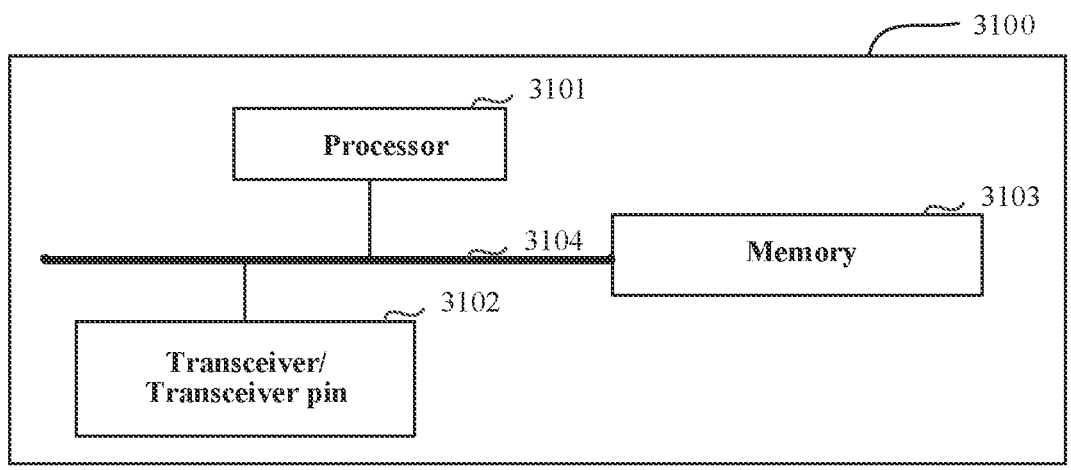
FIG. 31 is an example of a schematic structural diagram of an apparatus.

In an example, FIG. 31 is a schematic block diagram of an apparatus 3100 according to an embodiment of this application. The apparatus 3100 may include a processor 3101 and a transceiver/transceiver pin 3102, and optionally, further include a memory 3103.

The components of the apparatus 3100 are coupled together via a bus 3104. The bus 3104 further includes a power bus, a control bus, and a status signal bus in addition to a data bus. However, for the purpose of clear description, various buses are all referred to as the bus 3104 in the figure.

Optionally, the memory 3103 may be used for instructions in the foregoing method embodiments. The processor 3101 may be configured to execute the instructions in the memory 3103, control a receive pin to receive a signal, and control a transmit pin to send a signal.

The apparatus 3100 may be the electronic device in the foregoing method embodiments or a chip of the electronic device.

All related content of the steps in the foregoing method embodiments may be referenced to function descriptions of corresponding functional modules. Details are not described herein again.

An embodiment further provides a computer storage medium. The computer storage medium stores computer instructions. The computer instructions, when run on an electronic device, cause the electronic device to perform steps of the foregoing relevant methods to implement the cursor display method in the foregoing embodiments.

An embodiment further provides a computer program product. When the computer program product runs on a computer, the computer is caused to perform the relevant steps, to implement the display method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory; to cause the chip to perform the cursor display method in the foregoing method embodiments.

The electronic device, the computer storage medium, the computer program product, or the chip provided in the embodiments is configured to perform the corresponding method provided above. Therefore, for beneficial effects that can be achieved, refer to the beneficial effects of the corresponding method provided above. Details are not described herein again.

Based on the descriptions of the foregoing implementations, a person skilled in the art may clearly understand that, for the purpose of convenient and brief description, division into the foregoing functional modules is taken as an example for illustration. In actual application, the foregoing functions may be allocated to different functional modules for implementation according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the division into modules or units is merely a logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or other forms.

The units described as separate parts may or may not be physically separate, and parts displayed as units may be one or more physical units, in other words, may be located in one place, or may be distributed in multiple different places. Some or all of the units may be selected according to actual needs to achieve the objectives of the solutions of the embodiments.

In addition, functional units in the embodiments of this application may be integrated into one processing unit, each of the units may exist alone physically, or two or more units may be integrated into one unit. The integrated unit may be implemented in a form of hardware, or may be implemented in a form of a software functional unit.

Any content of embodiments of this application and any content of a same embodiment may be freely combined. Any combination of the foregoing content is within the scope of this application.

If the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The storage medium includes: any medium that can store program code, such as a USB flash drive, a removable hard disk, a read-only memory (read-only memory; ROM), a random access memory (random access memory, RAM), a magnetic disk, or a compact disc.

Although the embodiments of this application are described above with reference to the accompanying drawings, this application is not limited to the specific implementations described above, and the specific implementations described above are merely examples and not limitations. A person of ordinary skill in the art may make various variations under the teaching of this application without departing from the spirit of this application and the protection scope of the claims, and such variations shall all fall within the protection scope of this application.

Steps of the methods or algorithms described with reference to the content disclosed in the embodiments of this application may be implemented by hardware, or may be implemented by a processor executing software instructions. The software instructions may include a corresponding software module. The software module may be stored in a random access memory (Random Access Memory, RAM), a flash memory, a read-only memory (Read-Only Memory, ROM), an erasable programmable read-only memory (Erasable Programmable ROM, EPROM), an electrically erasable programmable read-only memory (Electrically EPROM, EEPROM), a register, a hard disk, a mobile hard disk, a compact disc read-only memory (CD-ROM), or a storage medium in any other forms well-known in the art. For example, a storage medium is coupled to a processor, so that the processor can read information from the storage medium or write information into the storage medium. Certainly; the storage medium may be a component of the processor. The processor and the storage medium may be located in an ASIC.

A person skilled in the art should be aware that in the foregoing one or more examples, functions described in the embodiments of this application may be implemented by hardware, software, firmware, or any combination thereof. When implemented by software, the functions may be stored in a computer-readable medium or used as one or more instructions or code in a computer-readable medium for transferring. The computer-readable medium includes a computer storage medium and a communication medium, where the communication medium includes any medium that enables a computer program to be transmitted from one place to another. The storage medium may be any available medium accessible to a general-purpose or special-purpose computer.

Although the embodiments of this application are described above with reference to the accompanying drawings, this application is not limited to the specific implementations described above, and the specific implementations described above are merely examples and not limitations. A person of ordinary skill in the art may make various variations under the teaching of this application without departing from the spirit of this application and the protection scope of the claims, and such variations shall all fall within the protection scope of this application.

What is claimed is:

1. An electronic device, comprising:
   one or more processors; and
   a memory coupled to the one or more processors, wherein the memory is configured to store instructions that, when executed by the one or more processors, cause the electronic device to be configured to:

display a cursor on a display interface, wherein the cursor comprises a cursor center point, and the cursor center point is at a geometric center of the cursor;

move the cursor from a first position to a second position on the display interface in response to a received user operation; and gradually shift, while the cursor accelerates to the second position at a first acceleration, the cursor center point from the geometric center of the cursor along an opposite direction of a moving direction of the cursor to a third position within an edge of the cursor while the cursor moves to the second position.

2. The electronic device of claim 1, wherein the instructions, when executed by the one or more processors, further cause the electronic device to be configured to gradually shift, while the cursor moves from the second position to a fourth position on the display interface, the cursor center point from the third position to the geometric center of the cursor until the cursor center point overlaps the geometric center of the cursor, wherein the cursor continuously moves from the first position to the fourth position.

3. The electronic device of claim 2, wherein the instructions, when executed by the one or more processors, further cause the electronic device to be configured to gradually shift, while the cursor moves to the fourth position by changing from accelerated movement to a first uniform movement, the cursor center point from the third position to the geometric center of the cursor until the cursor center point overlaps the geometric center of the cursor.

4. The electronic device of claim 3, wherein a speed of the first uniform movement is a first speed.

5. The electronic device of claim 2, wherein the instructions, when executed by the one or more processors, further cause the electronic device to be configured to gradually shift, after a speed of the cursor becomes a second speed, the cursor center point from the third position to the geometric center of the cursor until the cursor center point overlaps the geometric center of the cursor.

6. The electronic device of claim 2, wherein the instructions, when executed by the one or more processors, further cause the electronic device to be configured to gradually shift, while the cursor moves from the fourth position to a fifth position on the display interface, the cursor center point from the geometric center of the cursor along the moving direction of the cursor to a sixth position within the edge of the cursor, wherein the cursor continuously moves from the first position to the fifth position, and wherein an offset between the sixth position and the geometric center of the cursor is different from an offset between the third position and the geometric center of the cursor.

7. The electronic device of claim 1, wherein an offset between the cursor center point and the geometric center of the cursor is less than a preset value, the cursor is in a rounded rectangle, the cursor center point is in a circle, and the preset value is a difference between a radius of the cursor and a radius of the cursor center point.

8. A method, comprising:

displaying a cursor on a display interface, wherein the cursor comprises a cursor center point, and the cursor center point is at a geometric center of the cursor;

moving the cursor from a first position to a second position on the display interface in response to a received user operation; and gradually shifting, while the cursor accelerates to the second position at a first acceleration, the cursor center point from the geometric center of the cursor along an opposite direction of a moving direction of the cursor to a third position within an edge of the cursor while the cursor moves to the second position.

9. The method of claim 8, further comprising gradually shifting, while the cursor moves from the second position to a fourth position on the display interface, the cursor center point from the third position to the geometric center of the cursor until the cursor center point overlaps the geometric center of the cursor, wherein the cursor continuously moves from the first position to the fourth position.

10. The method of claim 9, wherein gradually shifting the cursor center point from the third position to the geometric center of the cursor until the cursor center point overlaps the geometric center of the cursor comprises gradually shifting, while the cursor moves to the fourth position by changing from accelerated movement to a first uniform movement, the cursor center point from the third position to the geometric center of the cursor until the cursor center point overlaps the geometric center of the cursor.

11. The method of claim 10, wherein a speed of the first uniform movement is a first speed.

12. The method of claim 9, wherein gradually shifting the cursor center point from the third position to the geometric center of the cursor until the cursor center point overlaps the geometric center of the cursor comprises gradually shifting, after a speed of the cursor becomes a second speed, the cursor center point from the third position to the geometric center of the cursor until the cursor center point overlaps the geometric center of the cursor.

13. The method of claim 9, further comprising gradually shifting, while the cursor moves from the fourth position to a fifth position on the display interface, the cursor center point from the geometric center of the cursor along the moving direction of the cursor to a sixth position within the edge of the cursor, wherein the cursor continuously moves from the first position to the fifth position, and wherein an offset between the sixth position and the geometric center of the cursor is different from an offset between the third position and the geometric center of the cursor.

14. The method of claim 13, wherein gradually shifting the cursor center point from the geometric center of the cursor along the moving direction of the cursor to the sixth position within the edge of the cursor comprises gradually shifting, while the cursor decelerates to the fifth position, the cursor center point from the geometric center of the cursor along the moving direction of the cursor to the sixth position.

15. The method of claim 14, further comprising gradually shifting, while the cursor moves from the fifth position to a seventh position on the display interface, the cursor center point from the sixth position to the geometric center of the cursor until the cursor center point overlaps the geometric center of the cursor, wherein the cursor continuously moves from the first position to the seventh position.

16. The method of claim 15, wherein gradually shifting the cursor center point from the sixth position to the geometric center of the cursor until the cursor center point overlaps the geometric center of the cursor comprises gradually shifting, while the cursor decelerates to the seventh position, the cursor center point from the sixth position to the geometric center of the cursor until the cursor center point overlaps the geometric center of the cursor.

17. The method of claim 15, wherein gradually shifting the cursor center point from the sixth position to the geometric center of the cursor until the cursor center point overlaps the geometric center of the cursor comprises gradually shifting, after a speed of the cursor becomes a third speed, the cursor center point from the sixth position to the geometric center of the cursor until the cursor center point overlaps the geometric center of the cursor.

18. The method of claim 9, further comprising gradually shifting, while the cursor accelerates from the fourth position at a second acceleration, the cursor center point from the geometric center of the cursor along the opposite direction of the moving direction of the cursor to an eighth position within the edge of the cursor, wherein the second acceleration is greater than the first acceleration, and an offset between the eighth position and the geometric center of the cursor is greater than an offset between the third position and the geometric center of the cursor.

19. The method of claim 8, wherein an offset between the cursor center point and the geometric center of the cursor is less than a preset value, the cursor is in a rounded rectangle, the cursor center point is in a circle, and the preset value is a difference between a radius of the cursor and a radius of the cursor center point.

20. A non-transitory computer-readable medium storing instructions that, when executed by one or more processors of an electronic device, cause the electronic device to be configured to:

display a cursor on a display interface, wherein the cursor comprises a cursor center point, and the cursor center point is at a geometric center of the cursor;

move the cursor from a first position to a second position on the display interface in response to a received user operation; and gradually shift, while the cursor accelerates to the second position at a first acceleration, the cursor center point from the geometric center of the cursor along an opposite direction of a moving direction of the cursor to a third position within an edge of the cursor while the cursor moves to the second position.

* * * * *